US012775889B2

(12) United States Patent
Presant et al.

(10) Patent No.: US 12,775,889 B2
(45) **Date of Patent: *Oct. 27, 2026**

(54) USING A GAZE AT REAL-WORLD OBJECTS TO SUGGEST AN INPUT USING A DIFFERENT INPUT MODALITY FOR A HEAD-WEARABLE DEVICE

(71) Applicant: Meta Platforms Technologies, LLC, Menlo Park, CA (US)

(72) Inventors: William Crosby Presant, Seattle, WA (US); Francislav P. Penov, Kirkland, WA (US); Anuj Kumar, Santa Clara, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/500,825

(22) Filed: Nov. 2, 2023

(65) Prior Publication Data

US 2024/0062536 A1 Feb. 22, 2024

Related U.S. Application Data

(63) Continuation of application No. 18/150,737, filed on Jan. 5, 2023, now Pat. No. 11,869,231, which is a (Continued)

(51) Int. Cl.

*G06V 10/82* (2022.01)
*G06F 3/01* (2006.01)

(Continued)

(52) U.S. Cl.

CPC ............. *G06Q 10/00* (2013.01); *G06F 3/011* (2013.01); *G06F 3/013* (2013.01); *G06F 3/017* (2013.01);

(Continued)

(58) Field of Classification Search

CPC ...... G06V 10/82; G06V 10/764; G06V 20/10; G06V 40/28; G06F 3/11; G06F 3/13;

(Continued)

(56) References Cited

U.S. PATENT DOCUMENTS

| | | | |
|---|---|---|---|
| 1,544,305 | A | 6/1925 | Fisher |
| 5,721,827 | A | 2/1998 | Logan et al. |

(Continued)

FOREIGN PATENT DOCUMENTS

| | | | |
|---|---|---|---|
| AU | 2017203668 | A1 | 1/2018 |
| CN | 101292282 | A | 10/2008 |

(Continued)

OTHER PUBLICATIONS

US 11,531,820 B2, 12/2022, Liu et al. (withdrawn)

(Continued)

*Primary Examiner* — Prabodh M Dharia
(74) *Attorney, Agent, or Firm* — McDermott Will & Schulte LLP

(57) ABSTRACT

A method described herein includes receiving an initial input of a first input modality from a user at a head-wearable device. The first input modality comprises a gaze at a real-world object. In accordance with a determination that the gaze remains at the real-world object for a threshold amount of time, the method includes generating, based on the real-world object, one or more suggested inputs of a second input modality, distinct from the first input modality, associated with an operation at the head-wearable device and outputting an indication to perform the one or more suggested inputs to cause the operation at the head-wearable device. Furthermore, in accordance with a determination that the gaze no longer remains at the real-world object, the method includes ceasing to output the indication to perform the one or more suggested inputs.

20 Claims, 14 Drawing Sheets

Related U.S. Application Data continuation of application No. 17/512,490, filed on Oct. 27, 2021, now Pat. No. 11,694,429, which is a continuation of application No. 17/010,750, filed on Sep. 2, 2020, now Pat. No. 11,249,773, which is a continuation of application No. 16/389,708, filed on Apr. 19, 2019, now Pat. No. 10,795,703.

(60) Provisional application No. 62/660,876, filed on Apr. 20, 2018.

(51) Int. Cl.

| | |
|---|---|
| ***G06F 3/16*** | (2006.01) |
| ***G06F 7/14*** | (2006.01) |
| ***G06F 9/451*** | (2018.01) |
| ***G06F 16/176*** | (2019.01) |
| ***G06F 16/22*** | (2019.01) |
| ***G06F 16/23*** | (2019.01) |
| ***G06F 16/242*** | (2019.01) |
| ***G06F 16/2455*** | (2019.01) |
| ***G06F 16/2457*** | (2019.01) |
| ***G06F 16/248*** | (2019.01) |
| ***G06F 16/332*** | (2025.01) |
| ***G06F 16/3329*** | (2025.01) |
| ***G06F 16/334*** | (2025.01) |
| ***G06F 16/338*** | (2019.01) |
| ***G06F 16/903*** | (2019.01) |
| ***G06F 16/9032*** | (2019.01) |
| ***G06F 16/9038*** | (2019.01) |
| ***G06F 16/904*** | (2019.01) |
| ***G06F 16/951*** | (2019.01) |
| ***G06F 16/9535*** | (2019.01) |
| ***G06F 18/2411*** | (2023.01) |
| ***G06F 21/62*** | (2013.01) |
| ***G06F 40/205*** | (2020.01) |
| ***G06F 40/295*** | (2020.01) |
| ***G06F 40/30*** | (2020.01) |
| ***G06F 40/40*** | (2020.01) |
| ***G06N 3/006*** | (2023.01) |
| ***G06N 7/01*** | (2023.01) |
| ***G06N 20/00*** | (2019.01) |
| ***G06Q 10/00*** | (2023.01) |
| ***G06Q 10/40*** | (2026.01) |
| ***G06Q 10/42*** | (2026.01) |
| ***G06Q 10/48*** | (2026.01) |
| ***G06V 10/764*** | (2022.01) |
| ***G06V 20/10*** | (2022.01) |
| ***G06V 40/20*** | (2022.01) |
| ***G10L 15/02*** | (2006.01) |
| ***G10L 15/06*** | (2013.01) |
| ***G10L 15/07*** | (2013.01) |
| ***G10L 15/16*** | (2006.01) |
| ***G10L 15/18*** | (2013.01) |
| ***G10L 15/183*** | (2013.01) |
| ***G10L 15/187*** | (2013.01) |
| ***G10L 15/22*** | (2006.01) |
| ***G10L 15/26*** | (2006.01) |
| ***G10L 17/06*** | (2013.01) |
| ***G10L 17/22*** | (2013.01) |
| ***H04L 5/02*** | (2006.01) |
| ***H04L 12/28*** | (2006.01) |
| ***H04L 41/00*** | (2022.01) |
| ***H04L 41/22*** | (2022.01) |
| ***H04L 43/0882*** | (2022.01) |
| ***H04L 43/0894*** | (2022.01) |
| ***H04L 51/02*** | (2022.01) |
| ***H04L 51/18*** | (2022.01) |
| ***H04L 51/216*** | (2022.01) |
| ***H04L 51/52*** | (2022.01) |
| ***H04L 67/306*** | (2022.01) |
| ***H04L 67/50*** | (2022.01) |
| ***H04L 67/5651*** | (2022.01) |
| ***H04L 67/75*** | (2022.01) |
| ***H04W 12/08*** | (2021.01) |
| *G10L 13/00* | (2006.01) |
| *G10L 13/04* | (2013.01) |
| *H04L 51/046* | (2022.01) |
| *H04L 67/10* | (2022.01) |
| *H04L 67/53* | (2022.01) |

(52) U.S. Cl.

CPC ................ *G06F 3/167* (2013.01); *G06F 7/14* (2013.01); *G06F 9/453* (2018.02); *G06F 16/176* (2019.01); *G06F 16/2255* (2019.01); *G06F 16/2365* (2019.01); *G06F 16/243* (2019.01); *G06F 16/24552* (2019.01); *G06F 16/24575* (2019.01); *G06F 16/24578* (2019.01); *G06F 16/248* (2019.01); *G06F 16/3323* (2019.01); *G06F 16/3329* (2019.01); *G06F 16/3344* (2019.01); *G06F 16/338* (2019.01); *G06F 16/90332* (2019.01); *G06F 16/90335* (2019.01); *G06F 16/9038* (2019.01); *G06F 16/904* (2019.01); *G06F 16/951* (2019.01); *G06F 16/9535* (2019.01); *G06F 18/2411* (2023.01); *G06F 21/6245* (2013.01); *G06F 40/205* (2020.01); *G06F 40/295* (2020.01); *G06F 40/30* (2020.01); *G06F 40/40* (2020.01); *G06N 3/006* (2013.01); *G06N 7/01* (2023.01); *G06N 20/00* (2019.01); *G06Q 10/40* (2026.01); *G06Q 10/42* (2026.01); *G06Q 10/48* (2026.01); *G06V 10/764* (2022.01); *G06V 10/82* (2022.01); *G06V 20/10* (2022.01); *G06V 40/28* (2022.01); *G10L 15/02* (2013.01); *G10L 15/063* (2013.01); *G10L 15/07* (2013.01); *G10L 15/16* (2013.01); *G10L 15/1815* (2013.01); *G10L 15/1822* (2013.01); *G10L 15/183* (2013.01); *G10L 15/187* (2013.01); *G10L 15/22* (2013.01); *G10L 15/26* (2013.01); *G10L 17/06* (2013.01); *G10L 17/22* (2013.01); *H04L 5/02* (2013.01); *H04L 12/2816* (2013.01); *H04L 41/20* (2013.01); *H04L 41/22* (2013.01); *H04L 43/0882* (2013.01); *H04L 43/0894* (2013.01); *H04L 51/02* (2013.01); *H04L 51/18* (2013.01); *H04L 51/216* (2022.05); *H04L 51/52* (2022.05); *H04L 67/306* (2013.01); *H04L 67/535* (2022.05); *H04L 67/5651* (2022.05); *H04L 67/75* (2022.05); *H04W 12/08* (2013.01); *G06F 2216/13* (2013.01); *G10L 13/00* (2013.01); *G10L 13/04* (2013.01); *G10L 2015/223* (2013.01); *G10L 2015/225* (2013.01); *H04L 51/046* (2013.01); *H04L 67/10* (2013.01); *H04L 67/53* (2022.05)

(58) Field of Classification Search

CPC ...... G06F 3/17; G06F 16/176; G06F 16/2255; G06F 16/2365; G06F 16/243; G06F 16/24552; G06F 16/24575; G06F 16/24578; G06F 16/248; G06F 16/3323; G06F 16/3329; G06F 16/3344; G06F 16/338; G06F 16/90332; G06F 16/90335;

G06F 16/9038; G06F 16/904; G06F 16/951; G06F 16/9535; G06F 16/3322; G06F 16/9532; G06F 18/2411; G06F 21/6245; G06F 40/205; G06F 40/295; G06F 40/30; G06F 40/40; G06F 40/275; G06F 8/31; G06N 3/06; G06N 3/08; G06N 3/045; G06N 7/01; G06N 20/00; G06N 5/027; G06N 5/022; G06Q 50/01; G06Q 10/00; G10L 15/02; G10L 15/63; G10L 15/07; G10L 15/16; G10L 15/1815; G10L 15/1822; G10L 15/183; G10L 15/187; G10L 15/22; G10L 15/26; G10L 17/06; G10L 17/22; G10L 17/00; H04L 5/02; H04L 12/2816; H04L 41/20; H04L 41/22; H04L 43/0882; H04L 67/5651; H04L 67/75; H04L 67/10; H04L 67/53; H04L 63/102; H04W 12/08

USPC .......................... 345/156; 715/52; 704/21.01

See application file for complete search history.

(56) References Cited

U.S. PATENT DOCUMENTS 5,872,850 A 2/1999 Klein et al.
6,026,424 A 2/2000 Circenis
6,115,458 A 9/2000 Taskett
6,233,575 B1 5/2001 Agrawal et al.
6,243,761 B1 6/2001 Mogul et al.
6,345,111 B1 * 2/2002 Yamaguchi ...... H04N 21/42201 382/118
6,484,136 B1 11/2002 Kanevsky et al.
6,510,451 B2 1/2003 Wu et al.
6,578,025 B1 6/2003 Pollack et al.
6,665,640 B1 12/2003 Bennett et al.
6,901,364 B2 5/2005 Nguyen et al.
6,968,333 B2 11/2005 Abbott et al.
6,990,513 B2 1/2006 Belfiore et al.
7,069,215 B1 6/2006 Bangalore et al.
7,080,004 B2 7/2006 Wang et al.
7,124,123 B1 10/2006 Roskind et al.
7,158,678 B2 1/2007 Nagel et al.
7,397,912 B2 7/2008 Aasman et al.
7,406,408 B1 7/2008 Lackey et al.
7,426,537 B2 9/2008 Lee et al.
7,467,087 B1 12/2008 Gillick et al.
7,624,007 B2 11/2009 Bennett
7,702,508 B2 4/2010 Bennett
8,019,748 B1 9/2011 Wu et al.
8,027,451 B2 9/2011 Arendsen et al.
8,112,275 B2 2/2012 Kennewick et al.
8,190,627 B2 5/2012 Platt et al.
8,195,468 B2 6/2012 Weider et al.
8,478,581 B2 7/2013 Chen
8,504,349 B2 8/2013 Manu et al.
8,560,564 B1 10/2013 Hoelzle et al.
8,601,019 B1 12/2013 Weininger et al.
8,619,767 B2 12/2013 Ohashi
8,677,377 B2 3/2014 Cheyer et al.
8,713,042 B1 4/2014 Zinenko et al.
8,817,951 B2 8/2014 Goffin et al.
8,868,592 B1 10/2014 Weininger et al.
8,935,192 B1 1/2015 Ventilla et al.
8,938,394 B1 1/2015 Faaborg et al.
8,949,250 B1 2/2015 Garg et al.
8,983,383 B1 3/2015 Haskin
8,995,981 B1 3/2015 Aginsky et al.
9,026,145 B1 5/2015 Duleba et al.
9,098,575 B2 8/2015 Ilyas et al.
9,154,739 B1 10/2015 Nicolaou et al.
9,171,341 B1 10/2015 Trandal et al.
9,177,291 B2 11/2015 Martinazzi et al.
9,195,436 B2 11/2015 Mytkowicz et al.
9,251,471 B2 2/2016 Pinckney et al.
9,299,059 B1 3/2016 Marra et al.
9,304,736 B1 4/2016 Whiteley et al.
9,338,242 B1 5/2016 Suchland et al.
9,338,493 B2 5/2016 Van Os et al.
9,344,338 B2 5/2016 Quillen et al.
9,354,709 B1 5/2016 Heller et al.
9,367,806 B1 6/2016 Cosic
9,390,724 B2 7/2016 List
9,406,103 B1 8/2016 Gray et al.
9,418,658 B1 8/2016 David et al.
9,424,840 B1 8/2016 Hart et al.
9,443,527 B1 9/2016 Watanabe et al.
9,472,206 B2 10/2016 Ady
9,479,931 B2 10/2016 Ortiz, Jr. et al.
9,507,417 B2 * 11/2016 Dal Mutto ............ G06F 3/0482
9,508,341 B1 11/2016 Parlikar et al.
9,536,522 B1 1/2017 Hall et al.
9,576,574 B2 2/2017 Van Os
9,639,608 B2 5/2017 Freeman
9,659,577 B1 5/2017 Langhammer
9,660,950 B2 5/2017 Archibong et al.
9,686,577 B2 6/2017 Tseng et al.
9,720,955 B1 8/2017 Cao et al.
9,747,895 B1 8/2017 Jansche et al.
9,767,309 B1 9/2017 Patel et al.
9,785,717 B1 10/2017 Deluca
9,792,281 B2 10/2017 Sarikaya
9,824,321 B2 11/2017 Raghunathan et al.
9,858,925 B2 1/2018 Gruber et al.
9,865,260 B1 1/2018 Vuskovic et al.
9,875,233 B1 1/2018 Tomkins et al.
9,875,741 B2 1/2018 Gelfenbeyn et al.
9,881,077 B1 1/2018 Alfonseca et al.
9,886,953 B2 2/2018 Lemay et al.
9,916,753 B2 3/2018 Aginsky et al.
9,959,328 B2 5/2018 Jain et al.
9,986,394 B1 5/2018 Taylor et al.
9,990,591 B2 6/2018 Gelfenbeyn et al.
10,042,032 B2 8/2018 Scott et al.
10,088,908 B1 10/2018 Poupyrev et al.
10,108,707 B1 10/2018 Chu et al.
10,109,273 B1 10/2018 Rajasekaram et al.
10,127,220 B2 11/2018 Bellegarda et al.
10,127,227 B1 11/2018 Badr et al.
10,133,613 B2 11/2018 Surti et al.
10,134,388 B1 11/2018 Lilly
10,134,395 B2 11/2018 Typrin
10,162,886 B2 12/2018 Wang et al.
10,199,051 B2 2/2019 Binder et al.
10,220,303 B1 3/2019 Schmidt et al.
10,229,680 B1 3/2019 Gillespie et al.
10,241,752 B2 3/2019 Lemay et al.
10,255,365 B2 4/2019 Campbell et al.
10,262,062 B2 4/2019 Chang et al.
10,276,170 B2 4/2019 Gruber et al.
10,336,856 B2 7/2019 Stache et al.
10,348,658 B2 7/2019 Rodriguez et al.
10,354,307 B2 7/2019 Ye et al.
10,387,464 B2 8/2019 Weston et al.
10,409,818 B1 9/2019 Hayes et al.
10,412,026 B2 9/2019 Sherrets et al.
10,418,032 B1 9/2019 Mohajer et al.
10,462,422 B1 10/2019 Harrison et al.
10,467,282 B2 11/2019 Shorman et al.
10,482,182 B1 11/2019 Jankowski, Jr.
D868,793 S 12/2019 Germe
10,504,513 B1 12/2019 Gray et al.
10,511,808 B2 12/2019 Harrison et al.
10,515,625 B1 12/2019 Metallinou et al.
10,574,613 B2 2/2020 Leiba et al.
10,579,688 B2 3/2020 Green
10,594,757 B1 * 3/2020 Shevchenko .......... H04N 7/148
10,600,406 B1 3/2020 Shapiro et al.
D881,883 S 4/2020 Germe
D882,567 S 4/2020 Parfitt
D882,570 S 4/2020 Germe
10,649,985 B1 5/2020 Cornell, Jr. et al.
10,679,008 B2 6/2020 Dubey et al.
10,719,786 B1 7/2020 Treseler et al.
10,761,866 B2 9/2020 Liu et al.

(56) References Cited

U.S. PATENT DOCUMENTS

| | | | |
|---|---|---|---|
| 10,762,903 | B1 | 9/2020 | Kahan et al. |
| 10,782,986 | B2 | 9/2020 | Martin |
| 10,810,256 | B1 | 10/2020 | Goldberg et al. |
| 10,839,098 | B2 | 11/2020 | Borup et al. |
| 10,841,249 | B2 | 11/2020 | Lim et al. |
| 10,854,206 | B1 | 12/2020 | Liu et al. |
| 10,855,485 | B1 | 12/2020 | Zhou et al. |
| 10,867,256 | B2 | 12/2020 | Bugay et al. |
| 10,878,337 | B2 | 12/2020 | Katsuki et al. |
| 10,896,295 | B1 | 1/2021 | Shenoy |
| 10,936,346 | B2 | 3/2021 | Natarajan et al. |
| 10,949,616 | B1 | 3/2021 | Shenoy et al. |
| 10,957,329 | B1 | 3/2021 | Liu et al. |
| 10,958,599 | B1 | 3/2021 | Penov et al. |
| 10,963,273 | B2 | 3/2021 | Peng et al. |
| 10,977,258 | B1 | 4/2021 | Liu et al. |
| 10,977,711 | B1 | 4/2021 | Verma et al. |
| 10,978,056 | B1 | 4/2021 | Challa et al. |
| 11,009,961 | B2 | 5/2021 | Moscarillo |
| 11,010,436 | B1 | 5/2021 | Peng et al. |
| 11,038,974 | B1 | 6/2021 | Koukoumidis et al. |
| 11,042,554 | B1 | 6/2021 | Balakrishnan et al. |
| 11,068,659 | B2 | 7/2021 | Cutting et al. |
| 11,086,858 | B1 | 8/2021 | Koukoumidis et al. |
| 11,087,756 | B1 | 8/2021 | Presant et al. |
| 11,120,158 | B2 | 9/2021 | Hockey et al. |
| 11,159,767 | B1 | 10/2021 | Kamisetty et al. |
| 11,245,646 | B1 | 2/2022 | Koukoumidis et al. |
| 11,308,169 | B1 | 4/2022 | Koukoumidis et al. |
| 11,334,165 | B1 | 5/2022 | Clements |
| 11,436,300 | B1 | 9/2022 | Felt et al. |
| 11,443,358 | B2 | 9/2022 | Chow |
| 11,636,438 | B1 | 4/2023 | Huang et al. |
| 11,727,677 | B2 | 8/2023 | Liu et al. |
| 11,966,701 | B2 | 4/2024 | Pu et al. |
| 12,118,790 | B2 | 10/2024 | Wang et al. |
| 2001/0036297 | A1 | 11/2001 | Ikegami et al. |
| 2002/0015480 | A1 | 2/2002 | Daswani et al. |
| 2002/0111917 | A1 | 8/2002 | Hoffman et al. |
| 2002/0141621 | A1 | 10/2002 | Lane |
| 2002/0152067 | A1 | 10/2002 | Mikki et al. |
| 2002/0165912 | A1 | 11/2002 | Wenocur et al. |
| 2003/0005174 | A1 | 1/2003 | Coffman et al. |
| 2003/0046083 | A1 | 3/2003 | Devinney et al. |
| 2003/0126330 | A1 | 7/2003 | Balasuriya |
| 2003/0182125 | A1 | 9/2003 | Phillips et al. |
| 2003/0220095 | A1 | 11/2003 | Engelhart |
| 2004/0019487 | A1 | 1/2004 | Kleindienst et al. |
| 2004/0019489 | A1 | 1/2004 | Funk et al. |
| 2004/0044516 | A1 | 3/2004 | Kennewick et al. |
| 2004/0075690 | A1 | 4/2004 | Cirne |
| 2004/0085162 | A1 | 5/2004 | Agarwal et al. |
| 2004/0098253 | A1 | 5/2004 | Balentine et al. |
| 2004/0186819 | A1 | 9/2004 | Baker |
| 2004/0230572 | A1 | 11/2004 | Omoigui |
| 2004/0236580 | A1 | 11/2004 | Bennett |
| 2005/0004907 | A1 | 1/2005 | Bruno et al. |
| 2005/0010393 | A1 | 1/2005 | Danieli et al. |
| 2005/0135595 | A1 | 6/2005 | Bushey et al. |
| 2005/0144284 | A1 | 6/2005 | Ludwig et al. |
| 2005/0149327 | A1 | 7/2005 | Roth et al. |
| 2006/0047617 | A1 | 3/2006 | Bacioiu et al. |
| 2006/0294546 | A1 | 12/2006 | Ro et al. |
| 2007/0028264 | A1 | 2/2007 | Lowe |
| 2007/0073678 | A1 | 3/2007 | Scott et al. |
| 2007/0073745 | A1 | 3/2007 | Scott et al. |
| 2007/0124147 | A1 | 5/2007 | Gopinath et al. |
| 2007/0124263 | A1 | 5/2007 | Katariya et al. |
| 2007/0136058 | A1 | 6/2007 | Jeong et al. |
| 2007/0185712 | A1 | 8/2007 | Jeong et al. |
| 2007/0239454 | A1 | 10/2007 | Paek et al. |
| 2007/0270126 | A1 | 11/2007 | Forbes et al. |
| 2007/0300224 | A1 | 12/2007 | Aggarwal et al. |
| 2008/0015864 | A1 | 1/2008 | Ross et al. |
| 2008/0028036 | A1 | 1/2008 | Slawson et al. |
| 2008/0095187 | A1 | 4/2008 | Jung et al. |
| 2008/0107255 | A1 | 5/2008 | Geva et al. |
| 2008/0178126 | A1 | 7/2008 | Beeck et al. |
| 2008/0189269 | A1 | 8/2008 | Olsen |
| 2008/0209577 | A1 | 8/2008 | Vrielink et al. |
| 2008/0222142 | A1 | 9/2008 | O'Donnell |
| 2008/0240379 | A1 | 10/2008 | Maislos et al. |
| 2008/0243885 | A1 | 10/2008 | Harger et al. |
| 2008/0300884 | A1 | 12/2008 | Smith |
| 2008/0313162 | A1 | 12/2008 | Bahrami et al. |
| 2009/0007127 | A1 | 1/2009 | Roberts et al. |
| 2009/0070113 | A1 | 3/2009 | Gupta et al. |
| 2009/0119581 | A1 | 5/2009 | Velusamy |
| 2009/0150153 | A1 | 6/2009 | Li et al. |
| 2009/0150322 | A1 | 6/2009 | Bower et al. |
| 2009/0191521 | A1 | 7/2009 | Paul et al. |
| 2009/0228439 | A1 | 9/2009 | Manolescu et al. |
| 2009/0265299 | A1 | 10/2009 | Hadad et al. |
| 2009/0282033 | A1 | 11/2009 | Alshawi |
| 2009/0300525 | A1 | 12/2009 | Jolliff et al. |
| 2009/0326945 | A1 | 12/2009 | Tian |
| 2010/0064345 | A1 | 3/2010 | Bentley et al. |
| 2010/0125456 | A1 | 5/2010 | Weng et al. |
| 2010/0138215 | A1 | 6/2010 | Williams |
| 2010/0138224 | A1 | 6/2010 | Bedingfield, Sr. |
| 2010/0199320 | A1 | 8/2010 | Ramanathan et al. |
| 2010/0217794 | A1 | 8/2010 | Strandell et al. |
| 2010/0217837 | A1 | 8/2010 | Ansari et al. |
| 2010/0241431 | A1 | 9/2010 | Weng et al. |
| 2010/0241639 | A1 | 9/2010 | Kifer et al. |
| 2010/0299329 | A1 | 11/2010 | Emanuel et al. |
| 2010/0306191 | A1 | 12/2010 | Lebeau et al. |
| 2010/0306249 | A1 | 12/2010 | Hill et al. |
| 2011/0010675 | A1 | 1/2011 | Hamilton, II et al. |
| 2011/0040751 | A1 | 2/2011 | Chandrasekar et al. |
| 2011/0078615 | A1 | 3/2011 | Bier |
| 2011/0093820 | A1 | 4/2011 | Zhang et al. |
| 2011/0119216 | A1 | 5/2011 | Wigdor |
| 2011/0137918 | A1 | 6/2011 | Yasrebi et al. |
| 2011/0153324 | A1 | 6/2011 | Ballinger et al. |
| 2011/0153423 | A1 | 6/2011 | Elvekrog et al. |
| 2011/0153863 | A1 | 6/2011 | Khan et al. |
| 2011/0161348 | A1 | 6/2011 | Oron |
| 2011/0169726 | A1 | 7/2011 | Holmdahl et al. |
| 2011/0173204 | A1 | 7/2011 | Murillo et al. |
| 2011/0182485 | A1 | 7/2011 | Shochat et al. |
| 2011/0184718 | A1 | 7/2011 | Chen |
| 2011/0184768 | A1 | 7/2011 | Norton et al. |
| 2011/0238754 | A1 | 9/2011 | Dasilva et al. |
| 2011/0246383 | A1 | 10/2011 | Gibson et al. |
| 2011/0264522 | A1 | 10/2011 | Chan et al. |
| 2012/0016678 | A1 | 1/2012 | Gruber et al. |
| 2012/0019446 | A1 | 1/2012 | Wu et al. |
| 2012/0022872 | A1 | 1/2012 | Gruber et al. |
| 2012/0023120 | A1 | 1/2012 | Kanefsky |
| 2012/0030301 | A1 | 2/2012 | Herold et al. |
| 2012/0041907 | A1 | 2/2012 | Wang et al. |
| 2012/0053945 | A1 | 3/2012 | Gupta et al. |
| 2012/0069131 | A1 | 3/2012 | Abelow |
| 2012/0078889 | A1 | 3/2012 | Chu-Carroll et al. |
| 2012/0078891 | A1 | 3/2012 | Brown et al. |
| 2012/0081303 | A1 | 4/2012 | Cassar |
| 2012/0101806 | A1 | 4/2012 | Davis et al. |
| 2012/0101865 | A1 | 4/2012 | Zhakov |
| 2012/0109858 | A1 | 5/2012 | Makadia et al. |
| 2012/0117051 | A1 | 5/2012 | Liu et al. |
| 2012/0159507 | A1 | 6/2012 | Kwon et al. |
| 2012/0159635 | A1 | 6/2012 | He et al. |
| 2012/0163224 | A1 | 6/2012 | Long |
| 2012/0179453 | A1 | 7/2012 | Ghani et al. |
| 2012/0179481 | A1 | 7/2012 | Patel et al. |
| 2012/0179633 | A1 | 7/2012 | Ghani et al. |
| 2012/0179694 | A1 | 7/2012 | Sciacca et al. |
| 2012/0190386 | A1 | 7/2012 | Anderson |
| 2012/0205436 | A1 | 8/2012 | Thomas et al. |
| 2012/0232885 | A1 | 9/2012 | Barbosa et al. |
| 2012/0233188 | A1 | 9/2012 | Majumdar |
| 2012/0245944 | A1 | 9/2012 | Gruber et al. |
| 2012/0246191 | A1 | 9/2012 | Xiong |

(56) References Cited

U.S. PATENT DOCUMENTS

2012/0254188 A1 10/2012 Koperski et al.
2012/0265528 A1 10/2012 Gruber et al.
2012/0265787 A1 10/2012 Hsu et al.
2012/0278164 A1 11/2012 Spivack et al.
2012/0290950 A1 11/2012 Rapaport et al.
2012/0294477 A1 11/2012 Yang et al.
2012/0297294 A1 11/2012 Scott et al.
2012/0303356 A1 11/2012 Boyle et al.
2012/0311035 A1 12/2012 Guha et al.
2012/0311126 A1 12/2012 Jadallah et al.
2013/0035930 A1 2/2013 Ferrucci et al.
2013/0046544 A1 2/2013 Kay et al.
2013/0054631 A1 2/2013 Govani et al.
2013/0073387 A1 3/2013 Heath
2013/0073389 A1 3/2013 Heath
2013/0073400 A1 3/2013 Heath
2013/0073473 A1 3/2013 Heath
2013/0096910 A1 4/2013 Stan et al.
2013/0117832 A1 5/2013 Gandhi et al.
2013/0124538 A1 5/2013 Lee et al.
2013/0191250 A1 7/2013 Bradley et al.
2013/0191416 A1 7/2013 Lee et al.
2013/0191790 A1 7/2013 Kawalkar
2013/0194193 A1 8/2013 Kawalkar
2013/0204813 A1 8/2013 Master et al.
2013/0204894 A1 8/2013 Faith et al.
2013/0226892 A1 8/2013 Ehsani et al.
2013/0238332 A1 9/2013 Chen
2013/0246521 A1 9/2013 Schacht et al.
2013/0254139 A1 9/2013 Lei
2013/0262752 A1 10/2013 Talagala et al.
2013/0265218 A1 10/2013 Moscarillo
2013/0268624 A1 10/2013 Yagiura
2013/0268839 A1 10/2013 Lefebvre et al.
2013/0275138 A1 10/2013 Gruber et al.
2013/0275164 A1 10/2013 Gruber et al.
2013/0275441 A1 10/2013 Agrawal et al.
2013/0277564 A1 10/2013 Teshima et al.
2013/0282811 A1 10/2013 Lessin et al.
2013/0289999 A1 10/2013 Hymel
2013/0290205 A1 10/2013 Bonmassar et al.
2013/0296057 A1 11/2013 Gagner et al.
2013/0317858 A1 11/2013 Hasan et al.
2013/0346077 A1 12/2013 Mengibar et al.
2013/0346877 A1 12/2013 Borovoy et al.
2014/0012926 A1 1/2014 Narayanan et al.
2014/0019459 A1 1/2014 Gradin et al.
2014/0025702 A1 1/2014 Curtiss et al.
2014/0032659 A1 1/2014 Marini et al.
2014/0039895 A1 2/2014 Aravamudan et al.
2014/0040748 A1 2/2014 Lemay et al.
2014/0074483 A1 3/2014 Van Os
2014/0074934 A1 3/2014 Van Hoff et al.
2014/0094307 A1 4/2014 Doolittle et al.
2014/0104177 A1 4/2014 Ouyang et al.
2014/0108307 A1 4/2014 Raghunathan et al.
2014/0108453 A1 4/2014 Venkataraman et al.
2014/0108562 A1 4/2014 Panzer
2014/0108989 A1 4/2014 Bi et al.
2014/0115410 A1 4/2014 Kealy et al.
2014/0122622 A1 5/2014 Castera et al.
2014/0129266 A1 5/2014 Perl et al.
2014/0143879 A1 5/2014 Milman et al.
2014/0164506 A1 6/2014 Tesch et al.
2014/0176603 A1* 6/2014 Kumar .................... G06F 3/011 345/633
2014/0195371 A1 7/2014 Kageyama et al.
2014/0207860 A1 7/2014 Wang et al.
2014/0222415 A1 8/2014 Legat
2014/0222422 A1 8/2014 Sarikaya et al.
2014/0236591 A1 8/2014 Yue et al.
2014/0244712 A1 8/2014 Walters et al.
2014/0255887 A1 9/2014 Xu et al.
2014/0258191 A1 9/2014 Gubin et al.
2014/0278786 A1 9/2014 Liu-Qiu-Yan
2014/0280001 A1 9/2014 Stein
2014/0280017 A1 9/2014 Indarapu et al.
2014/0282153 A1 9/2014 Christiansen et al.
2014/0282276 A1 9/2014 Drucker et al.
2014/0282956 A1 9/2014 Kennedy et al.
2014/0297284 A1 10/2014 Gruber et al.
2014/0310470 A1 10/2014 Rash et al.
2014/0310614 A1 10/2014 Jones
2014/0310788 A1 10/2014 Ricci
2014/0314283 A1 10/2014 Harding
2014/0330832 A1 11/2014 Mau
2014/0354539 A1 12/2014 Skogöet al.
2014/0358539 A1 12/2014 Rao et al.
2014/0358890 A1 12/2014 Chen et al.
2014/0365209 A1 12/2014 Evermann
2014/0365216 A1 12/2014 Gruber et al.
2014/0365919 A1 12/2014 Shaw et al.
2014/0379340 A1 12/2014 Timem et al.
2015/0006286 A1 1/2015 Liu et al.
2015/0012345 A1 1/2015 Bhagat et al.
2015/0012524 A1 1/2015 Heymans et al.
2015/0019227 A1 1/2015 Anandarajah
2015/0032504 A1 1/2015 Elango et al.
2015/0046841 A1 2/2015 Sharon et al.
2015/0058720 A1 2/2015 Smadja et al.
2015/0067502 A1 3/2015 Yang et al.
2015/0073907 A1 3/2015 Purves et al.
2015/0078613 A1 3/2015 Forutanpour et al.
2015/0079554 A1 3/2015 Lee et al.
2015/0081321 A1 3/2015 Jain
2015/0081674 A1 3/2015 Ali et al.
2015/0082229 A1 3/2015 Ouyang et al.
2015/0088593 A1 3/2015 Raghunathan et al.
2015/0088665 A1 3/2015 Karlsson
2015/0095033 A1 4/2015 Boies et al.
2015/0100524 A1 4/2015 Pantel et al.
2015/0142420 A1 5/2015 Sarikaya et al.
2015/0142447 A1 5/2015 Kennewick et al.
2015/0142704 A1 5/2015 London
2015/0149182 A1 5/2015 Kalns et al.
2015/0154001 A1 6/2015 Knox et al.
2015/0169284 A1 6/2015 Quast et al.
2015/0169744 A1 6/2015 Walkingshaw et al.
2015/0170050 A1 6/2015 Price
2015/0179168 A1 6/2015 Hakkani-Tur et al.
2015/0185827 A1 7/2015 Sayed
2015/0186156 A1 7/2015 Brown et al.
2015/0199333 A1 7/2015 Nekhay
2015/0199715 A1 7/2015 Caron et al.
2015/0207765 A1 7/2015 Brantingham et al.
2015/0220777 A1 8/2015 Kauffmann et al.
2015/0220888 A1 8/2015 Iyer
2015/0227519 A1 8/2015 Clark et al.
2015/0228275 A1 8/2015 Watanabe et al.
2015/0242525 A1 8/2015 Perlegos
2015/0242787 A1 8/2015 Bernstein et al.
2015/0248476 A1 9/2015 Weissinger et al.
2015/0256636 A1 9/2015 Spivack et al.
2015/0278691 A1 10/2015 Xia et al.
2015/0278922 A1 10/2015 Isaacson et al.
2015/0279389 A1 10/2015 Lebeau et al.
2015/0286709 A1 10/2015 Sathish et al.
2015/0286747 A1 10/2015 Anastasakos et al.
2015/0293597 A1 10/2015 Mishra et al.
2015/0293602 A1* 10/2015 Kay .................... G06F 3/04883 715/752
2015/0293995 A1 10/2015 Chen et al.
2015/0317302 A1 11/2015 Liu et al.
2015/0331853 A1 11/2015 Palmonari et al.
2015/0332670 A1 11/2015 Akbacak et al.
2015/0332672 A1 11/2015 Akbacak et al.
2015/0339303 A1 11/2015 Perlegos
2015/0347375 A1 12/2015 Tremblay et al.
2015/0347572 A1 12/2015 Yang et al.
2015/0348543 A1 12/2015 Zhao et al.
2015/0348551 A1 12/2015 Gruber et al.
2015/0356784 A1* 12/2015 Miller .................... G06F 3/011 345/633
2015/0363393 A1 12/2015 Williams et al.

(56) References Cited

U.S. PATENT DOCUMENTS

2015/0370798 A1 12/2015 Ju et al.
2015/0373565 A1 12/2015 Safavi
2015/0379426 A1 12/2015 Steele et al.
2015/0379568 A1 12/2015 Balasubramanian et al.
2015/0379981 A1 12/2015 Balasubramanian et al.
2016/0004862 A1 1/2016 Almehmadi et al.
2016/0019290 A1 1/2016 Ratnaparkhi et al.
2016/0021179 A1 1/2016 James et al.
2016/0026720 A1 1/2016 Lehrer et al.
2016/0037311 A1 2/2016 Cho
2016/0042069 A1 2/2016 Lee-Goldman et al.
2016/0042249 A1 2/2016 Babenko et al.
2016/0048527 A1 2/2016 Li
2016/0063118 A1 3/2016 Campbell et al.
2016/0063553 A1 3/2016 Pesochinsky
2016/0070449 A1 3/2016 Christiansen et al.
2016/0080485 A1 3/2016 Hamedi
2016/0092160 A1 3/2016 Graff et al.
2016/0092598 A1 3/2016 Mishra
2016/0093298 A1 3/2016 Naik et al.
2016/0093304 A1 3/2016 Kim et al.
2016/0098482 A1 4/2016 Moon et al.
2016/0110381 A1 4/2016 Chen et al.
2016/0116995 A1* 4/2016 Wilson .................... A63F 13/42 345/157
2016/0117360 A1 4/2016 Kunc et al.
2016/0156574 A1 6/2016 Hum et al.
2016/0156584 A1 6/2016 Hum et al.
2016/0163311 A1 6/2016 Crook et al.
2016/0170989 A1 6/2016 Bishop et al.
2016/0173568 A1 6/2016 Penilla et al.
2016/0173578 A1 6/2016 Sharma et al.
2016/0188565 A1 6/2016 Robichaud et al.
2016/0188671 A1 6/2016 Gupta et al.
2016/0188727 A1 6/2016 Waibel et al.
2016/0188730 A1 6/2016 Delli Santi et al.
2016/0196491 A1 7/2016 Chandrasekaran et al.
2016/0203002 A1 7/2016 Kannan et al.
2016/0203238 A1 7/2016 Cherniavskii et al.
2016/0210363 A1 7/2016 Rambhia et al.
2016/0210963 A1 7/2016 Kim et al.
2016/0217124 A1 7/2016 Sarikaya et al.
2016/0219078 A1 7/2016 Porras et al.
2016/0225370 A1 8/2016 Kannan et al.
2016/0239751 A1 8/2016 Mosterman et al.
2016/0253630 A1 9/2016 Oliveri et al.
2016/0255082 A1 9/2016 Rathod
2016/0259717 A1 9/2016 Nychis et al.
2016/0261545 A1 9/2016 Bastide et al.
2016/0269472 A1 9/2016 Byron et al.
2016/0283016 A1 9/2016 Zaitsev et al.
2016/0292582 A1 10/2016 Kozloski et al.
2016/0306505 A1 10/2016 Mgneras et al.
2016/0307571 A1 10/2016 Mizumoto et al.
2016/0308799 A1 10/2016 Schubert et al.
2016/0320853 A1 11/2016 Lien et al.
2016/0328096 A1 11/2016 Tran et al.
2016/0336006 A1 11/2016 Levit et al.
2016/0336008 A1 11/2016 Menezes et al.
2016/0364382 A1 12/2016 Sarikaya
2016/0371378 A1 12/2016 Fan et al.
2016/0372116 A1 12/2016 Summerfield
2016/0378849 A1 12/2016 Myslinski
2016/0378861 A1 12/2016 Eledath et al.
2016/0379213 A1 12/2016 Isaacson et al.
2016/0381220 A1 12/2016 Kurganov
2017/0005803 A1 1/2017 Brownewell et al.
2017/0019362 A1 1/2017 Kim et al.
2017/0025117 A1 1/2017 Hong
2017/0026318 A1 1/2017 Daniel et al.
2017/0034112 A1 2/2017 Perlegos
2017/0061294 A1 3/2017 Weston et al.
2017/0061956 A1 3/2017 Sarikaya et al.
2017/0063887 A1 3/2017 Muddu et al.
2017/0078621 A1 3/2017 Sahay et al.
2017/0091168 A1 3/2017 Bellegarda et al.
2017/0091171 A1 3/2017 Perez
2017/0092008 A1* 3/2017 Djorgovski ........... G06T 11/206
2017/0092264 A1 3/2017 Hakkani-Tur et al.
2017/0098236 A1 4/2017 Lee et al.
2017/0125012 A1 5/2017 Kanthak et al.
2017/0132019 A1 5/2017 Karashchuk et al.
2017/0132688 A1 5/2017 Freund et al.
2017/0139938 A1 5/2017 Balasubramanian et al.
2017/0147582 A1 5/2017 Michels et al.
2017/0147676 A1 5/2017 Jaidka et al.
2017/0147696 A1 5/2017 Evnine
2017/0148073 A1 5/2017 Nomula et al.
2017/0161018 A1 6/2017 Lemay et al.
2017/0169013 A1 6/2017 Sarikaya et al.
2017/0169354 A1 6/2017 Diamanti et al.
2017/0177715 A1 6/2017 Chang et al.
2017/0178626 A1 6/2017 Gruber et al.
2017/0180276 A1 6/2017 Gershony et al.
2017/0185375 A1 6/2017 Martel et al.
2017/0188101 A1 6/2017 Srinivasaraghavan
2017/0193390 A1 7/2017 Weston et al.
2017/0206271 A1 7/2017 Jain
2017/0206405 A1 7/2017 Molchanov et al.
2017/0220426 A1 8/2017 Sankar et al.
2017/0221475 A1 8/2017 Bruguier et al.
2017/0228240 A1 8/2017 Khan et al.
2017/0228366 A1 8/2017 Bui et al.
2017/0235360 A1* 8/2017 George-Svahn ..... G02B 27/017 345/173
2017/0235726 A1 8/2017 Wang et al.
2017/0235740 A1 8/2017 Seth et al.
2017/0235848 A1 8/2017 Van Dusen et al.
2017/0242847 A1 8/2017 Li et al.
2017/0243107 A1 8/2017 Jolley et al.
2017/0244774 A1 8/2017 Trombetta et al.
2017/0249059 A1* 8/2017 Houseworth ........... G10L 15/26
2017/0255272 A1 9/2017 Flagg et al.
2017/0255536 A1 9/2017 Weissinger et al.
2017/0263242 A1 9/2017 Nagao
2017/0270180 A1 9/2017 State
2017/0270919 A1 9/2017 Parthasarathi et al.
2017/0270929 A1 9/2017 Aleksic et al.
2017/0278514 A1 9/2017 Mathias et al.
2017/0286401 A1 10/2017 He et al.
2017/0287474 A1 10/2017 Maergner et al.
2017/0290077 A1 10/2017 Nilsson et al.
2017/0293834 A1 10/2017 Raison et al.
2017/0295114 A1 10/2017 Goldberg et al.
2017/0300831 A1 10/2017 Gelfenbeyn et al.
2017/0308589 A1 10/2017 Liu et al.
2017/0316159 A1 11/2017 Hooker
2017/0344645 A1 11/2017 Appel et al.
2017/0351786 A1 12/2017 Quattoni et al.
2017/0351969 A1 12/2017 Parmar et al.
2017/0353469 A1 12/2017 Selekman et al.
2017/0357637 A1 12/2017 Nell et al.
2017/0357661 A1 12/2017 Hornkvist et al.
2017/0358293 A1 12/2017 Chua et al.
2017/0358304 A1 12/2017 Castillo Sanchez et al.
2017/0359707 A1 12/2017 Diaconu et al.
2017/0364563 A1 12/2017 Gao et al.
2017/0366479 A1 12/2017 Ladha et al.
2017/0373999 A1 12/2017 Abou Mahmoud et al.
2018/0013699 A1 1/2018 Sapoznik et al.
2018/0018562 A1 1/2018 Jung
2018/0018987 A1 1/2018 Zass
2018/0020285 A1 1/2018 Zass
2018/0040020 A1 2/2018 Kurian et al.
2018/0047091 A1 2/2018 Ogden et al.
2018/0052824 A1 2/2018 Ferrydiansyah et al.
2018/0052842 A1 2/2018 Hewavitharana et al.
2018/0054523 A1 2/2018 Zhang et al.
2018/0060029 A1 3/2018 Kogan et al.
2018/0060439 A1 3/2018 Kula et al.
2018/0061401 A1 3/2018 Sarikaya et al.
2018/0061419 A1 3/2018 Melendo Casado et al.
2018/0062862 A1 3/2018 Lu et al.
2018/0067638 A1 3/2018 Klein et al.

(56) References Cited

U.S. PATENT DOCUMENTS

2018/0068019 A1 3/2018 Novikoff et al.
2018/0068661 A1 3/2018 Printz
2018/0075844 A1 3/2018 Kim et al.
2018/0075847 A1 3/2018 Lee et al.
2018/0082191 A1 3/2018 Pearmain et al.
2018/0083894 A1 3/2018 Fung et al.
2018/0088663 A1 3/2018 Zhang et al.
2018/0088677 A1 3/2018 Zhang et al.
2018/0089164 A1 3/2018 Iida et al.
2018/0089541 A1 3/2018 Stoop et al.
2018/0096071 A1 4/2018 Green
2018/0096072 A1 4/2018 He et al.
2018/0101893 A1 4/2018 Dagan et al.
2018/0107917 A1 4/2018 Hewavitharana et al.
2018/0108358 A1 4/2018 Humphreys et al.
2018/0115598 A1 4/2018 Shariat et al.
2018/0121508 A1 5/2018 Halstvedt
2018/0130194 A1 5/2018 Kochura et al.
2018/0146019 A1 5/2018 Chen et al.
2018/0150233 A1 5/2018 Hanzawa et al.
2018/0150280 A1 5/2018 Rhee et al.
2018/0150551 A1 5/2018 Wang et al.
2018/0150739 A1 5/2018 Wu
2018/0157759 A1 6/2018 Zheng et al.
2018/0157981 A1 6/2018 Albertson et al.
2018/0165723 A1 6/2018 Wright et al.
2018/0176614 A1 6/2018 Lin et al.
2018/0189628 A1 7/2018 Kaufmann et al.
2018/0189629 A1 7/2018 Yatziv et al.
2018/0196854 A1 7/2018 Burks
2018/0210874 A1 7/2018 Fuxman et al.
2018/0218428 A1 8/2018 Xie et al.
2018/0232435 A1 8/2018 Papangelis et al.
2018/0232662 A1 8/2018 Solomon et al.
2018/0233139 A1 8/2018 Finkelstein et al.
2018/0233141 A1 8/2018 Solomon et al.
2018/0239837 A1 8/2018 Wang
2018/0240014 A1 8/2018 Strope et al.
2018/0246953 A1 8/2018 Oh et al.
2018/0246983 A1 8/2018 Rathod
2018/0260086 A1 9/2018 Leme et al.
2018/0260481 A1 9/2018 Rathod
2018/0260680 A1 9/2018 Finkelstein et al.
2018/0260856 A1 9/2018 Balasubramanian et al.
2018/0268298 A1 9/2018 Johansen et al.
2018/0287968 A1 10/2018 Koukoumidis et al.
2018/0293221 A1 10/2018 Finkelstein et al.
2018/0293484 A1 10/2018 Wang et al.
2018/0300040 A1 10/2018 Mate et al.
2018/0301151 A1 10/2018 Mont-Reynaud et al.
2018/0309779 A1 10/2018 Benyo et al.
2018/0329512 A1 11/2018 Liao et al.
2018/0329982 A1 11/2018 Patel et al.
2018/0329998 A1 11/2018 Thomson et al.
2018/0330280 A1 11/2018 Erenrich et al.
2018/0330714 A1 11/2018 Paulik et al.
2018/0330721 A1 11/2018 Thomson et al.
2018/0330737 A1 11/2018 Paulik et al.
2018/0332118 A1 11/2018 Phipps et al.
2018/0341871 A1 11/2018 Maitra et al.
2018/0349962 A1 12/2018 Adderly et al.
2018/0350144 A1 12/2018 Rathod
2018/0350377 A1 12/2018 Karazoun
2018/0367483 A1 12/2018 Rodriguez et al.
2019/0005024 A1 1/2019 Somech et al.
2019/0005549 A1 1/2019 Goldshtein et al.
2019/0007208 A1 1/2019 Surla et al.
2019/0034406 A1 1/2019 Singh et al.
2019/0034849 A1 1/2019 Romaine et al.
2019/0035390 A1 1/2019 Howard et al.
2019/0051289 A1 2/2019 Yoneda et al.
2019/0065588 A1 2/2019 Lin et al.
2019/0073363 A1 3/2019 Perez et al.
2019/0080698 A1 3/2019 Miller
2019/0082221 A1 3/2019 Jain et al.
2019/0087491 A1 3/2019 Bax
2019/0095500 A1 3/2019 Pandey et al.
2019/0095785 A1 3/2019 Sarkar et al.
2019/0104093 A1 4/2019 Lim et al.
2019/0115008 A1 4/2019 Jiang et al.
2019/0121907 A1 4/2019 Brunn et al.
2019/0132265 A1 5/2019 Nowak-Przygodzki et al.
2019/0139150 A1 5/2019 Brownhill et al.
2019/0146647 A1 5/2019 Ramchandran et al.
2019/0147849 A1 5/2019 Talwar et al.
2019/0149489 A1 5/2019 Akbulut et al.
2019/0156204 A1 5/2019 Bresch et al.
2019/0156206 A1 5/2019 Graham et al.
2019/0156210 A1 5/2019 He et al.
2019/0163691 A1 5/2019 Brunet et al.
2019/0171655 A1 6/2019 Psota et al.
2019/0182195 A1 6/2019 Avital et al.
2019/0205368 A1 7/2019 Wang et al.
2019/0205464 A1 7/2019 Zhao et al.
2019/0206401 A1 7/2019 Liu et al.
2019/0206412 A1 7/2019 Li et al.
2019/0213490 A1 7/2019 White et al.
2019/0236167 A1 8/2019 Hu et al.
2019/0237068 A1 8/2019 Canim et al.
2019/0242608 A1 8/2019 Laftchiev et al.
2019/0258710 A1 8/2019 Biyani et al.
2019/0266185 A1 8/2019 Rao et al.
2019/0281001 A1 9/2019 Miller et al.
2019/0287526 A1 9/2019 Ren et al.
2019/0311036 A1 10/2019 Shanmugam et al.
2019/0311301 A1 10/2019 Pyati
2019/0311710 A1 10/2019 Eraslan et al.
2019/0313054 A1 10/2019 Harrison et al.
2019/0318729 A1 10/2019 Chao et al.
2019/0318735 A1 10/2019 Chao et al.
2019/0324527 A1 10/2019 Presant et al.
2019/0324553 A1 10/2019 Liu et al.
2019/0324780 A1 10/2019 Zhu et al.
2019/0325042 A1 10/2019 Yu et al.
2019/0325081 A1 10/2019 Liu et al.
2019/0325084 A1 10/2019 Peng et al.
2019/0325864 A1 10/2019 Anders et al.
2019/0327330 A1 10/2019 Natarajan et al.
2019/0327331 A1 10/2019 Natarajan et al.
2019/0332946 A1 10/2019 Han et al.
2019/0341021 A1 11/2019 Shang et al.
2019/0348033 A1 11/2019 Chen et al.
2019/0361408 A1 11/2019 Tokuchi
2019/0385051 A1 12/2019 Wabgaonkar et al.
2020/0012681 A1 1/2020 McInerney et al.
2020/0027443 A1 1/2020 Raux
2020/0035220 A1 1/2020 Liu
2020/0045119 A1 2/2020 Weldemariam et al.
2020/0081736 A1 3/2020 Gopalan et al.
2020/0104427 A1 4/2020 Long et al.
2020/0110928 A1 4/2020 Al Jazaery et al.
2020/0175990 A1 6/2020 Fanty
2020/0184959 A1 6/2020 Yasa et al.
2020/0202171 A1 6/2020 Hughes et al.
2020/0382449 A1 12/2020 Taylor et al.
2020/0388282 A1 12/2020 Secker-Walker et al.
2020/0410012 A1 12/2020 Moon et al.
2021/0011967 A1 1/2021 Rathod
2021/0117214 A1 4/2021 Presant et al.
2021/0117479 A1 4/2021 Liu et al.
2021/0117623 A1 4/2021 Aly et al.
2021/0117624 A1 4/2021 Aghajanyan et al.
2021/0117681 A1 4/2021 Poddar et al.
2021/0117712 A1 4/2021 Huang et al.
2021/0117780 A1 4/2021 Malik et al.
2021/0118440 A1 4/2021 Peng et al.
2021/0118442 A1 4/2021 Poddar et al.
2021/0119955 A1 4/2021 Penov et al.
2021/0120206 A1 4/2021 Liu et al.
2021/0281632 A1 9/2021 Brewer et al.
2021/0303512 A1 9/2021 Barday et al.
2022/0006661 A1 1/2022 Rathod
2022/0038615 A1 2/2022 Chaudhri et al.
2022/0092131 A1 3/2022 Koukoumidis et al.

(56) References Cited

U.S. PATENT DOCUMENTS

| | | | | |
|---|---|---|---|---|
| 2022/0129513 | A1 | 4/2022 | Wu | |
| 2022/0188361 | A1 | 6/2022 | Botros et al. | |
| 2022/0254338 | A1 | 8/2022 | Gruber et al. | |
| 2022/0382376 | A1 | 12/2022 | Wang et al. | |
| 2023/0368812 | A1 | 11/2023 | Marchi et al. | |
| 2024/0054156 | A1 | 2/2024 | Mncent et al. | |
| 2024/0303439 | A1 | 9/2024 | Shaikh et al. | |
| 2024/0386015 | A1* | 11/2024 | Crabtree | G06F 16/9024 |

FOREIGN PATENT DOCUMENTS

| | | | |
|---|---|---|---|
| CN | 101375273 | A | 2/2009 |
| CN | 101465749 | A | 6/2009 |
| CN | 101772792 | A | 7/2010 |
| CN | 103262156 | A | 8/2013 |
| CN | 103294195 | A | 9/2013 |
| CN | 104718765 | A | 6/2015 |
| CN | 104981681 | A | 10/2015 |
| CN | 105830150 | A | 8/2016 |
| CN | 105843801 | A | 8/2016 |
| CN | 105917330 | A | 8/2016 |
| CN | 106055114 | A | 10/2016 |
| CN | 106462909 | A | 2/2017 |
| CN | 106527709 | A | 3/2017 |
| CN | 106997236 | A | 8/2017 |
| CN | 107003723 | A | 8/2017 |
| CN | 107148554 | A | 9/2017 |
| CN | 107210033 | A | 9/2017 |
| CN | 107408324 | A | 11/2017 |
| CN | 107490971 | A | 12/2017 |
| CN | 107633042 | A | 1/2018 |
| CN | 107704559 | A | 2/2018 |
| CN | 107750360 | A | 3/2018 |
| CN | 107909061 | A | 4/2018 |
| CN | 107924552 | A | 4/2018 |
| EP | 2530870 | A1 | 12/2012 |
| EP | 3122001 | A1 | 1/2017 |
| JP | H1173297 | A | 3/1999 |
| JP | 2015095232 | A | 5/2015 |
| JP | 2015191561 | A | 11/2015 |
| JP | 2016151736 | A | 8/2016 |
| KR | 20070043673 | A | 4/2007 |
| KR | 101350712 | B1 | 1/2014 |
| KR | 20170140079 | A | 12/2017 |
| WO | 2012116241 | A2 | 8/2012 |
| WO | 2012116241 | A3 | 11/2012 |
| WO | 2014190297 | A1 | 11/2014 |
| WO | 2016065020 | A2 | 4/2016 |
| WO | 2016195739 | A1 | 12/2016 |
| WO | 2017053208 | A1 | 3/2017 |
| WO | 2017112003 | A1 | 6/2017 |
| WO | 2017116488 | A1 | 7/2017 |
| WO | 2017129149 | A1 | 8/2017 |
| WO | 2018053502 | A1 | 3/2018 |
| WO | 2018067402 | A1 | 4/2018 |
| WO | 2018235191 | A1 | 12/2018 |

OTHER PUBLICATIONS

US 11,915,021 B1, 02/2024, Liu et al. (withdrawn)

Continuation of, U.S. Appl. No. 18/150,737, filed Jan. 5, 2023, now U.S. Pat. No. 11,869,231.

Continuation of, U.S. Appl. No. 17/512,490, filed Oct. 27, 2021, now U.S. Pat. No. 11,694,429.

Continuation-in-part, U.S. Appl. No. 17/010,750, filed Sep. 2, 2020, now U.S. Pat. No. 11,249,773.

Continuation-in-part, U.S. Appl. No. 16/389,708, filed Apr. 19, 2019, now U.S. Pat. No. 10,795,703.

Co-pending U.S. Appl. No. 16/389,634, inventors Crook; Paul Anthony et al., filed Apr. 19, 2019.

Co-pending U.S. Appl. No. 16/389,708, inventors William; Crosby Presant et al., filed Apr. 19, 2019.

Co-pending U.S. Appl. No. 16/389,728, inventors William; Presant et al., filed Apr. 19, 2019.

Co-pending U.S. Appl. No. 16/389,738, inventors Peng; Fuchun et al., filed Apr. 19, 2019.

Co-pending U.S. Appl. No. 16/389,769, inventors Honglei; Liu et al., filed Apr. 19, 2019.

Co-pending U.S. Appl. No. 16/434,010, inventors Dogaru; Sergiu et al., filed Jun. 6, 2019.

Co-pending U.S. Appl. No. 16/557,055, inventors Moon; Seungwhan et al., filed Aug. 30, 2019.

Co-pending U.S. Appl. No. 16/659,070, inventors Lisa; Xiaoyi Huang et al., filed Oct. 21, 2019.

Co-pending U.S. Appl. No. 16/659,203, inventors Huang; Lisa Xiaoyi et al., filed Oct. 21, 2019.

Co-pending U.S. Appl. No. 16/659,419, inventor Huang; Lisa Xiaoyi, filed Oct. 21, 2019.

Co-pending U.S. Appl. No. 16/741,630, inventors Crook; Paul Anthony et al., filed Jan. 13, 2020.

Co-pending U.S. Appl. No. 16/742,769, inventors Liu; Xiaohu et al., filed Jan. 14, 2020.

Co-pending U.S. Appl. No. 16/790,497, inventors Gao; Yang et al., filed Feb. 13, 2020.

Co-pending U.S. Appl. No. 16/815,960, inventors Malik; Kshitiz et al., filed Mar. 11, 2020.

Co-pending U.S. Appl. No. 16/842,366, inventors Sravani; Kamisetty et al., filed Apr. 7, 2020.

Co-pending U.S. Appl. No. 16/914,966, inventor Behar; Noam Yakob, filed Jun. 29, 2020.

Co-pending U.S. Appl. No. 16/917,664, inventors Liu; Xiaohu et al., filed Jun. 30, 2020.

Co-pending U.S. Appl. No. 16/921,665, inventors Liu; Honglei et al., filed Jul. 6, 2020.

Co-pending U.S. Appl. No. 16/998,423, inventors Armen; Aghajanyan et al., filed Aug. 20, 2020.

Co-pending U.S. Appl. No. 17/006,260, inventors William; Presant et al., filed Aug. 28, 2020.

Co-pending U.S. Appl. No. 17/006,339, inventors Shivani; Poddar et al., filed Aug. 28, 2020.

Co-pending U.S. Appl. No. 17/006,377, inventors Shivani; Poddar et al., filed Aug. 28, 2020.

Co-pending U.S. Appl. No. 17/009,542, inventor Kottur; Satwik, filed Sep. 1, 2020.

Co-pending U.S. Appl. No. 17/035,253, inventors Khemka; Piyush et al., filed Sep. 28, 2020.

Co-pending U.S. Appl. No. 17/120,013, inventors Botros; Fadi et al., filed Dec. 11, 2020.

Co-pending U.S. Appl. No. 17/136,636, inventors Greenberg; Michael et al., filed Dec. 29, 2020.

Co-pending U.S. Appl. No. 17/139,363, inventors Daniel; Manhon Cheng et al., filed Dec. 31, 2020.

Co-pending U.S. Appl. No. 17/186,459, inventors Liu; Bing et al., filed Feb. 26, 2021.

Co-pending U.S. Appl. No. 17/336,716, inventors Chaland; Christophe et al., filed Jun. 2, 2021.

Co-pending U.S. Appl. No. 17/351,501, inventors Sethi; Pooja et al., filed Jun. 18, 2021.

Co-pending U.S. Appl. No. 17/391,765, inventors Pu; Yiming et al., filed Aug. 2, 2021.

Co-pending U.S. Appl. No. 17/394,096, inventors Wang; Emily et al., filed Aug. 4, 2021.

Co-pending U.S. Application No. 17/394, 159, inventors Santoro; Elizabeth Kelsey et al., filed Aug. 4, 2021.

Co-pending U.S. Appl. No. 17/407,922, inventors Pu; Yiming et al., filed Aug. 20, 2021.

Co-pending U.S. Appl. No. 17/504,276, inventors Satwik; Kottur et al., filed Oct. 18, 2021.

Co-pending U.S. Appl. No. 17/512,478, inventors Chen; Zhiyu et al., filed Oct. 27, 2021.

Csaky R.K., "Deep Learning Based Chatbot Models," Budapest University of Technology and Economics, Nov. 2017, 69 pages, Retrieved from the Internet: URL: https://www.researchgate.net/publication/323587007_Deep_Learning_Based_Chatbot_Models.

(56) References Cited

OTHER PUBLICATIONS

Dubin R., et al., "Adaptation Logic for HTTP Dynamic Adaptive Streaming using Geo-Predictive Crowdsourcing," Springer, Feb. 5, 2016, 11 Pages.
Dyer C., et al., "Recurrent Neural Network Grammars," Proceedings of NAACL-HLT, San Diego, California, Jun. 12-17, 2016, pp. 199-209.
Germanakos P., et al., "Realizing Comprehensive User Profile as the Core Element of Adaptive and Personalized Communication Environments and Systems," The Computer Journal, Oct. 31, 2009, vol. 52, No. 7, pp. 749-770.
Glass J., "A Brief Introduction to Automatic Speech Recognition," Nov. 13, 2007, 22 Pages, Retrieved from Internet: http://www.cs.columbia.edu/~mcollins/6864/slides/asr.pdf.
Golovin D., et al., "Google Vizier: A Service for Black-Box Optimization," Proceedings of the 23rd ACM International Conference on Knowledge Discovery and Data Mining, Aug. 13-17, 2017, vol. 23, pp. 1487-1495.
Google Allo Makes Conversations Eeasier, Productive, and more Expressive, May 19, 2016 [Retrieved on 2019-07-11], 13 Pages, Retrieved from Internet: URL: https://www.trickyways.com/2016/05/google-allo-makes-conversations-eeasier-productive-expressive/.
Grow your Business with Social Bots, Digital Marketing Institute, Nov. 20, 2017, 14 pages, Retrieved from the Internet: URL: https://digitalmarketinginstitute.com/blog/grow-your-business-with-social-bots.
Guo D.Z., et al., "Joint Semantic Utterance Classification and Slot Filling With Recursive Neural Networks," IEEE Spoken Language Technology Workshop (SLT), 2014, pp. 554-559.
Hazen J.T., et al., "Pronunciation Modeling using a Finite-State Transducer Representation," Speech Communication, vol. 46, Jun. 2005, pp. 189-203.
Honglei L., et al., "Explore-Exploit: A Framework for Interactive and Online Learning," Dec. 1, 2018, 7 pages.
Huang S., "Word2Vec and FastText Word Embedding with Gensim," Towards Data Science [Online], Feb. 4, 2018 [Retrieved on Jun. 14, 2019], 11 Pages, Retrieved from Internet: URL: https://towardsdatascience.com/word-embedding-with-word2vec-and-fasttext-a209c1d3e12c.
Huang Z., et al., "Bidirectional LSTM-CRF Models for Sequence Tagging," arXiv preprint, arXiv:1508.01991, 2015, 10 pages.
International Search Report and Written Opinion for International Application No. PCT/US2018/033116, mailed Jan. 17, 2019, 10 Pages.
International Search Report and Written Opinion for International Application No. PCT/US2018/034604, mailed Jan. 18, 2019, 13 Pages.
International Search Report and Written Opinion for International Application No. PCT/US2018/038396, mailed Jan. 21, 2019, 13 Pages.
International Search Report and Written Opinion for International Application No. PCT/US2018/039268, mailed Jan. 18, 2019, 14 Pages.
International Search Report and Written Opinion for International Application No. PCT/US2018/042906, mailed Feb. 27, 2019, 10 Pages.
International Search Report and Written Opinion for International Application No. PCT/US2018/045177, mailed Jan. 16, 2019, 15 Pages.
International Search Report and Written Opinion for International Application No. PCT/US2018/049568, mailed Feb. 11, 2019, 25 Pages.
International Search Report and Written Opinion for International Application No. PCT/US2018/054322, mailed Feb. 8, 2019, 15 Pages.
International Search Report and Written Opinion for International Application No. PCT/US2019/028187, mailed Aug. 12, 2019, 11 Pages.
International Search Report and Written Opinion for International Application No. PCT/US2019/028387, mailed Aug. 21, 2019, 12 Pages.
Kar R., et al., "Applying Chatbots to the Internet of Things: Opportunities and Architectural Elements," arXiv:1611.03799v1, submitted on Nov. 11, 2016, (2017), 9 pages.
Klopfenstein L.C., et al., "The Rise of Bots: A survey of Conversational Interfaces, Patterns, and Paradigms," DIS 2017 Proceedings of the 2017 Conference on Designing Interactive Systems, Jun. 10, 2017, pp. 555-565.
Komer B., et al., "Hyperopt-Sklearn: Automatic Hyperparameter Configuration for Scikit-Learn," Proceedings of the 13th Python in Science Conference, 2014, vol. 13, pp. 34-40.
Leung K.W-T., et al., "Deriving Concept-Based User Profiles from Search Engine Logs," IEEE Transactions on Knowledge and Data Engineering, Jul. 2010, vol. 22 (7), pp. 969-982.
Li; et al., "A Persona-based Neural Conversation Model," arXiv preprint arXiv: 1603.06155, Jun. 8, 2016, 10 Pages.
Li T., et al., "Ease.ml: Towards Multi-tenant Resource Sharing for Machine Learning Workloads," arXiv: 1708.07308v1, Aug. 24, 2017, pp. 1-17.
Liebman E., et al., "DJ-MC: A Reinforcement-Learning Agent for Music Playlist Recommendation," ArXiv, Mar. 25, 2015, pp. 1-9.
Light M., et al., "Personalized Multimedia Information Access," Communications of the Association for Computing Machinery, May 2002, vol. 45 (5), pp. 54-59.
Mahajan D., et al., "LogUCB: An Explore-Exploit Algorithm for Comments Recommendation," Proceedings of the 21st ACM International Conference on Information and Knowledge Management (CIKM '12), Oct. 2012, pp. 6-15.
McCross T., "Dialog Management," Feb. 15, 2018 [Retrieved on Jun. 14, 2019], 12 Pages, Retrieved from Internet: https://tutorials.botsfloor.com/dialog-management-799c20a39aad.
McInerney J., et al., "Explore, Exploit, and Explain: Personalizing Explainable Recommendations with Bandits," RecSys '18: Proceedings of the 12th ACM Conference on Recommender Systems, Sep. 2018, vol. 12, pp. 31-39.
Mesnil G., et al., "Using Recurrent Neural Networks for Slot Filling in Spoken Language Understanding," IEEE/ACM Transactions on Audio, Speech, and Language Processing, Mar. 2015, vol. 23 (3), pp. 530-539.
Moon T., et al., "Online Learning for Recency Search Ranking Using Real-Time User Feedback," Proceedings of the 19th ACM International Conference on Information and Knowledge Management (CIKM '10), Oct. 2010, pp. 1501-1504.
Mun H., et al., "Accelerating Smart Speaker Service with Content Prefetching and Local Control," In IEEE 17th Annual Consumer Communications Networking Conference (CCNC), Jan. 10-13, 2020, 6 pages.
Nanas N., et al., "Multi-topic Information Filtering with a Single User Profile," Springer-Verlag Berlin Germany, Setn, Lnai 3025, 2004, pp. 400-409.
Office Action mailed Jan. 15, 2024 for Chinese Application No. 201880094857.0, filed Jun. 20, 2018, 18 pages.
Office Action mailed Jan. 17, 2024 for Chinese Application No. 201880094827.X, filed Jul. 19, 2018, 6 pages.
Office Action mailed Dec. 21, 2023 for Chinese Application No. 201880094771.8, filed Jun. 25, 2018, 23 pages.
Office Action mailed Dec. 26, 2023 for Chinese Application No. 201880094305.X, filed May 25, 2018, 7 pages.
Office Action mailed Dec. 29, 2023 for Chinese Application No. 201880094828.4, filed Aug. 3, 2018, 28 pages.
Ostendorf M., et al., "Human Language Technology: Opportunities and Challenges," IEEE International Conference on Acoustics Speech and Signal Processing, Mar. 23, 2005, 5 Pages.
"Overview of Language Technology," Feb. 15, 2018, 1 Page, Retrieved from Internet: URL: https://www.dfki.de/lt/lt-generaL.php.
Patel A., et al., "Cross-Lingual Phoneme Mapping for Language Robust Contextual Speech Recognition," IEEE International Conference on Acoustics, Speech and Signal Processing (ICASSP), Apr. 2018, pp. 5924-5928.

(56) References Cited

OTHER PUBLICATIONS

Poliak A., et al., "Efficient, Compositional, Order-Sensitive n-gram Embeddings," Proceedings of the 15th Conference of the European Chapter of the Association for Computational Linguistics, Apr. 3-7, 2017, vol. 2, pp. 503-508.
Ren H., et al., "Dialog State Tracking using Conditional Random Fields," Proceedings of the SIGDIAL Conference, Association for Computational Linguistics, Aug. 22-24, 2013, pp. 457-461.
So C.F., et al., "Ontological User Profiling and Language Modeling for Personalized Information Services," 2009 IEEE International Conference on e-Business Engineering, Macau, China, 2009, pp. 559-564.
Sood A., et al., "Topic-Focused Summarization of Chat Conversations," ECIR, LNCS 7814, Springer-Verlag, Berlin, Germany, 2013, pp. 800-803.
Takahashi Y., et al., "User and Device Adaptation for Sports Video Content," 2007 IEEE International Conference on Multimedia and Expo, Jul. 5, 2007, pp. 1051-1054.
Tepper N., et al., "Collabot: Personalized Group Chat Summarization," In Proceedings of the Eleventh ACM International Conference on Web Search and Data Mining, Feb. 5, 2018, pp. 771-774.
Trottier D., "A Research Agenda for Social Media Surveillance," Fast Capitalism, Jan. 2011, vol. 8, Issue 1, pp. 59-68.
Turniski F., et al., "Analysis of 3G and 4G Download Throughput in Pedestrian Zones," Proceedings Elmar-2013, Sep. 12, 2016, pp. 9-12, XP032993723.
U.S. Appl. No. 62/660,876, inventors Kumar; Anuj et al., filed Apr. 20, 2018.
U.S. Appl. No. 62/675,090, inventors Hanson; Michael Robert et al., filed May 22, 2018.
U.S. Appl. No. 62/747,628, inventors Liu; Honglei et al., filed Oct. 18, 2018.
U.S. Appl. No. 62/749,608, inventors Challa; Ashwini et al., filed Oct. 23, 2018.
U.S. Appl. No. 62/750,746, inventors Liu; Honglei et al., filed Oct. 25, 2018.
U.S. Appl. No. 62/923,342, inventors Hanson; Michael Robert et al., filed Oct. 18, 2019.
Vanchinathan H.P., et al., "Explore-Exploit in Top-N Recommender Systems via Gaussian Processes," Proceedings of the 8th ACM Conference on Recommender systems (RecSys '14), Oct. 2014, pp. 225-232.
Wang W., et al., "Rafiki: Machine Learning as an Analytics Service System," arXiv: 1804.06087v1, Apr. 17, 2018, pp. 1-13.
Wang X., et al., "Exploration in Interactive Personalized Music Recommendation: A Reinforcement Learning Approach," ACM Transactions on Multimedia Computing, Communications, and Applications, arXiv: 1311.6355v1, Oct. 2013, vol. 2 (3), pp. 1-24.
Wen; et al., "Personalized Language Modeling by Crowd Sourcing with Social Network Data for Voice Access of Cloud Applications," 2012 IEEE Spoken Language Technology Workshop (SLT), Dec. 2, 2012, pp. 188-193.
USTPO—Office Action dated Nov. 12, 2024 for related U.S. Appl. No. 17/870,110, filed Jul. 21, 2022, 35 Pages.
Liu S., "User Intention oriented Social Image Retrieval," Apr. 2016, 102 pages.
Office Action mailed Jul. 25, 2024 for Chinese Application No. 201980040312.6, filed Apr. 19, 2019, 9 pages.
"What is Conversational AI?," Glia Blog [Online], Sep. 13, 2017 [Retrieved on Jun. 14, 2019], 3 Pages, Retrieved from Internet: URL: https://blog.salemove.com/what-is-conversational-ai/.
Wikipedia, "Dialog Manager," Dec. 2, 16006-Mar. 13, 2018 [Retrieved on Jun. 14, 2019], 8 Pages, Retrieved from Internet: https://en.wikipedia.org/wiki/Dialog_manager.
Wikipedia, "Natural-Language Understanding," Nov. 2, 11018-Apr. 3, 2019 [Retrieved on Jun. 14, 2019], 5 Pages, Retrieved from Internet: URL: https://en.wikipedia.org/wiki/Natural-language_understanding.
Wikipedia, "Speech Synthesis," Jan. 2, 24004-Jun. 5, 2019 [Retrieved on Jun. 14, 2019], 19 Pages, Retrieved from Internet: URL: https://en.wikipedia.org/wiki/Speech_synthesis.
Wikipedia, "Question Answering," Feb. 15, 2018 [Retrieved on Jun. 14, 2019], 6 Pages, Retrieved from Internet: URL: https://en.wikipedia.org/wiki/Question_answering.
Wong Y.W., et al., "Scalable Attribute-Value Extraction from Semi-Structured Text," IEEE International Conference on Data Mining Workshops, Dec. 2009, pp. 302-307.
Office Action mailed May 15, 2024 for Chinese Application No. 201880094771.8, filed Jun. 25, 2018, 7 pages.
Sarikaya R., "The Technology Behind Personal Digital Assistants: An Overview of the System Architecture and Key Components," IEEE Signal Processing Magazine, Jan. 1, 2017, vol. 34 (1), pp. 67-81, XP011639190.
Anonymous, "Semantic Parsing," Wikipedia, Mar. 22, 2018, 5 pages, Retrieved from the Internet: URL: https://en.wikipedia.org/w/index.php?title=Semantic_parsingoldid=831890029, [Retrieved on May 24, 2022].
Anonymous, "Semantic Role Labeling," Wikipedia, Jan. 27, 2018, 2 pages, Retrieved from the Internet: URL: https://en.wikipedia.org/w/index.php?title=Semantic_role_labeling oldid=822626564, [Retrieved on May 24, 2022].
Armentano M.G., et al., "A Framework for Attaching Personal Assistants to Existing Applications," Computer Languages, Systems Structures, Dec. 2009, vol. 35(4), pp. 448-463.
Bailey K., "Conversational AI and the Road Ahead," TechCrunch [Online], Feb. 15, 2018 [Retrieved on Jun. 14, 2019], 13 Pages, Retrieved from Internet: URL: https://techcrunch.com/2017/02/25/conversational-ai-and-the-road-ahead/.
Bang J., et al., "Example-Based Chat-Oriented Dialogue System With Personalized Long-Term Memory," International Conference on Big Data and Smart Computing (BIGCOMP), Jeju, South Korea, 2015, pp. 238-243.
Batrinca B., et al., "Social media analytics: a survey of techniques, tools and platforms,", AI Society [Online], Feb. 2015, vol. 30 (1), pp. 89-116, [Retrieved on Mar. 28, 2019], Retrieved from the Internet: URL: https://link. springer.com/article/10.1007/s00146-014-0549-4.
Candito M.H., et al., "Can the TAG Derivation Tree Represent a Semantic Graph? An Answer in the Light of Meaning-Text Theory," Proceedings of the Fourth International Workshop on Tree Adjoining Grammars and Related Frameworks (TAG+ 4), Aug. 1998, 04 pages.
Challa A., et al., "Generate, Filter, and Rank: Grammaticality Classification for Production-Ready NLG Systems," Facebook Conversational AI, Apr. 9, 2019, 10 Pages.
"Chat Extensions," [online], Apr. 18, 2017, 8 Pages, Retrieved from the Internet: URL: https://developers.facebook.com/docs/messenger-platform/guides/chat-extensions/.
Chen Y.N., et al., "Knowledge as a Teacher: Knowledge-Guided Structural Attention Networks," arXiv preprint arXiv: 1609.03286, Sep. 2016, 12 pages.
Chen Y.N., et al., "Matrix Factorization with Domain Knowledge and Behavioral Patterns for Intent Modeling," NIPS Workshop on Machine Learning for SLU and Interaction, 2015, pp. 1-7.
Co-pending U.S. Appl. No. 14/593,723, inventors Colin; Patrick Treseler et al., filed Jan. 9, 2015.
Co-pending U.S. Appl. No. 15/808,638, inventors Ryan; Brownhill et al., filed Nov. 9, 2017.
Co-pending U.S. Appl. No. 15/966,455, inventor Scott; Martin, filed Apr. 30, 2018.
Co-pending U.S. Appl. No. 15/967,193, inventors Testuggine; Davide et al., filed Apr. 30, 2018.
Co-pending U.S. Appl. No. 15/967,239, inventors Vivek; Natarajan et al., filed Apr. 30, 2018.
Co-pending U.S. Appl. No. 15/967,279, inventors Fuchun; Peng et al., filed Apr. 30, 2018.
Co-pending U.S. Appl. No. 15/967,290, inventors Fuchun; Peng et al., filed Apr. 30, 2018.
Co-pending U.S. Appl. No. 15/967,342, inventors Vivek; Natarajan et al., filed Apr. 30, 2018.

(56) References Cited

OTHER PUBLICATIONS

Co-pending U.S. Appl. No. 16/011,062, inventors Jinsong; Yu et al., filed Jun. 18, 2018.
Co-pending U.S. Appl. No. 16/025,317, inventors Gupta; Sonal et al., filed Jul. 2, 2018.
Co-pending U.S. Appl. No. 16/036,827, inventors Emmanouil; Koukoumidis et al., filed Jul. 16, 2018.
Co-pending U.S. Appl. No. 16/038,120, inventors Schissel; Jason et al., filed Jul. 17, 2018.
Co-pending U.S. Appl. No. 16/048,049, inventor Markku; Salkola, filed Jul. 27, 2018.
Co-pending U.S. Appl. No. 16/048,072, inventor Salkola; Markku , filed Jul. 27, 2018.
Co-pending U.S. Appl. No. 16/048,101, inventor Salkola; Markku , filed Jul. 27, 2018.
Co-pending U.S. Appl. No. 16/053,600, inventors Vivek; Natarajan et al., filed Aug. 2, 2018.
Co-pending U.S. Appl. No. 16/057,414, inventors Kahn; Jeremy Gillmor et al., filed Aug. 7, 2018.
Co-pending U.S. Appl. No. 16/103,775, inventors Zheng; Zhou et al., filed Aug. 14, 2018.
Co-pending U.S. Appl. No. 16/107,601, inventor Rajesh; Krishna Shenoy, filed Aug. 21, 2018.
Co-pending U.S. Appl. No. 16/107,847, inventors Rajesh; Krishna Shenoy et al., filed Aug. 21, 2018.
Co-pending U.S. Appl. No. 16/118,169, inventors Baiyang; Liu et al., filed Aug. 30, 2018.
Co-pending U.S. Appl. No. 16/121,393, inventors Zhou; Zheng et al., filed Sep. 4, 2018.
Co-pending U.S. Appl. No. 16/127,173, inventors Zheng; Zhou et al., filed Sep. 10, 2018.
Co-pending U.S. Appl. No. 16/129,638, inventors Vivek; Natarajan et al., filed Sep. 12, 2018.
Co-pending U.S. Appl. No. 16/150,069, inventors Jiedan; Zhu et al., filed Oct. 2, 2018.
Co-pending U.S. Appl. No. 16/151,040, inventors Brian; Nelson et al., filed Oct. 3, 2018.
Co-pending U.S. Appl. No. 16/168,536, inventors Dumoulin; Benoit F et al., filed Oct. 23, 2018.
Co-pending U.S. Appl. No. 16/176,081, inventors Anusha; Balakrishnan et al., filed Oct. 31, 2018.
Co-pending U.S. Appl. No. 16/176,312, inventors Koukoumidis; Emmanouil et al., filed Oct. 31, 2018.
Co-pending U.S. Appl. No. 16/182,542, inventors Michael; Hanson et al., filed Nov. 6, 2018.
Co-pending U.S. Appl. No. 16/183,650, inventors Xiaohu; Liu et al., filed Nov. 7, 2018.
Co-pending U.S. Appl. No. 16/192,538, inventor Koukoumidis; Emmanouil, filed Nov. 15, 2018.
Co-pending U.S. Appl. No. 16/222,923, inventors Jason; Schissel et al., filed Dec. 17, 2018.
Co-pending U.S. Appl. No. 16/222,957, inventors Emmanouil; Koukoumidis et al., filed Dec. 17, 2018.
Co-pending U.S. Appl. No. 16/229,828, inventors Xiaohu; Liu et al., filed Dec. 21, 2018.
Co-pending U.S. Appl. No. 16/247,439, inventors Xiaohu; Liu et al., filed Jan. 14, 2019.
Co-pending U.S. Appl. No. 16/264,173, inventors Ashwini; Challa et al., filed Jan. 31, 2019.
Co-pending U.S. Appl. No. 16/376,832, inventors Liu; Honglei et al., filed Apr. 5, 2019.
Co-pending U.S. Appl. No. 16/388,130, inventors Xiaohu; Liu et al., filed Apr. 18, 2019.
Office Action mailed Jan. 15, 2025 for European Patent Application No. 19722425.6, filed Apr. 19, 2019, 10 pages.
U.S. Appl. No. 62/655,751, inventors Harrison; Jason Francis et al., filed Apr. 10, 2018, 80 pages.
Office Action mailed Sep. 22, 2025 for European Patent Application No. 18915309.1, filed Oct. 4, 2018, 8 pages.
European Search Report for European Patent Application No. 25165346.5, dated Jul. 7, 2025, 8 pages.
Non-Final Office Action mailed Aug. 21, 2025 for U.S. Appl. No. 18/892,786, filed Sep. 23, 2024, 20 pages.
Notice of Allowance mailed Jul. 22, 2025 for U.S. Appl. No. 18/915,864, filed Oct. 15, 2024, 13 pages.
Non-Final Office Action mailed May 22, 2026 for U.S. Appl. No. 18/892,786, filed Sep. 23, 2024, 20 pages.

* cited by examiner

400

800

USING A GAZE AT REAL-WORLD OBJECTS TO SUGGEST AN INPUT USING A DIFFERENT INPUT MODALITY FOR A HEAD-WEARABLE DEVICE

PRIORITY

This application is a continuation under 35 U.S.C. § 120 of U.S. patent application Ser. No. 18/150,737, filed 5 Jan. 2023, which is a continuation under 35 U.S.C. § 120 of U.S. patent application Ser. No. 17/512,490, filed 27 Oct. 2021, which is a continuation under 35 U.S.C. § 120 of U.S. patent application Ser. No. 17/010,750, filed 2 Sep. 2020, which is a continuation under 35 U.S.C. § 120 of U.S. patent application Ser. No. 16/389,708, filed 19 Apr. 2019, which claims the benefit, under 35 U.S.C. § 119(e), of U.S. Provisional Patent Application No. 62/660,876, filed 20 Apr. 2018, each of which is incorporated herein by reference.

TECHNICAL FIELD

This disclosure generally relates to dialog management based on machine-learning techniques within network environments, and in particular relates to hardware and software for smart assistant systems.

BACKGROUND

An assistant system can provide information or services on behalf of a user based on a combination of user input, location awareness, and the ability to access information from a variety of online sources (such as weather conditions, traffic congestion, news, stock prices, user schedules, retail prices, etc.). The user input may include text (e.g., online chat), especially in an instant messaging application or other applications, voice, images, motion, or a combination of them. The assistant system may perform concierge-type services (e.g., making dinner reservations, purchasing event tickets, making travel arrangements) or provide information based on the user input. The assistant system may also perform management or data-handling tasks based on online information and events without user initiation or interaction. Examples of those tasks that may be performed by an assistant system may include schedule management (e.g., sending an alert to a dinner date that a user is running late due to traffic conditions, update schedules for both parties, and change the restaurant reservation time). The assistant system may be enabled by the combination of computing devices, application programming interfaces (APIs), and the proliferation of applications on user devices.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. profile/news feed posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, the assistant system may assist a user to obtain information or services. The assistant system may enable the user to interact with it with multi-modal user input (such as voice, text, image, video, motion) in stateful and multi-turn conversations to get assistance. The assistant system may create and store a user profile comprising both personal and contextual information associated with the user. In particular embodiments, the assistant system may analyze the user input using natural-language understanding. The analysis may be based on the user profile for more personalized and context-aware understanding. The assistant system may resolve entities associated with the user input based on the analysis. In particular embodiments, the assistant system may interact with different agents to obtain information or services that are associated with the resolved entities. The assistant system may generate a response for the user regarding the information or services by using natural-language generation. Through the interaction with the user, the assistant system may use dialog management techniques to manage and forward the conversation flow with the user. In particular embodiments, the assistant system may further assist the user to effectively and efficiently digest the obtained information by summarizing the information. The assistant system may also assist the user to be more engaging with an online social network by providing tools that help the user interact with the online social network (e.g., creating posts, comments, messages). The assistant system may additionally assist the user to manage different tasks such as keeping track of events. In particular embodiments, the assistant system may proactively execute tasks that are relevant to user interests and preferences based on the user profile without a user input. In particular embodiments, the assistant system may check privacy settings to ensure that accessing a user's profile or other user information and executing different tasks are permitted subject to the user's privacy settings.

In particular embodiments, the assistant system may receive an initial input in a first modality executed by a user as an interaction with an assistant-based client system, e.g., a gesture-input to a virtual reality (VR) headset or augment reality (AR) smart glasses, determine candidate continuation-inputs in an auto-completion manner based on the initial input, and recommend these candidate continuation-inputs to the user in one or more second modalities (e.g., text), for which the user may select one of them to trigger the execution of a particular task. The initial input and continuation-inputs may be based on any suitable modality including text, speech, image, video, motion, orientation, etc. In addition, the modality of the initial input and the modalities of the continuation-inputs may be different. As an example and not by way of limitation, a user visiting Paris who wears AR glasses may be looking at Eiffel Tower. Based on the gaze input, the assistant system may suggest a gesture displayed on the virtual screen for taking a picture or suggest the user to speak "take a picture." The user may perform the suggested gesture or speak the sentence to allow the assistant system to execute the task of taking a picture of Eiffel Tower. As a result, the assistant system may have the ability to process a user input in one modality and generate suggested inputs in one or more other modalities, which may be referred as auto-completion for multi-modal user input. Although this disclosure describes generating particular auto-completion for particular multi-modal user inputs via particular systems in particular manners, this disclosure contemplates generating any suitable auto-completion for any suitable multi-modal user input via any suitable system in any suitable manner.

In particular embodiments, the assistant system may receive, from a client system associated with a first user, an initial input from the first user. The initial input may be in a first modality. In particular embodiments, the assistant system may determine, by an intent-understanding module, one or more intents corresponding to the initial input. The assistant system may then generate, based on the one or more intents, one or more candidate continuation-inputs. The one or more candidate continuation-inputs may be in one or more candidate modalities, respectively. The candidate modalities may be different from the first modality. In particular embodiments, the assistant system may further send, to the client system, instructions for presenting one or more suggested inputs corresponding to one or more of the candidate continuation-inputs.

In particular embodiments, the assistant system may receive an incomplete gesture executed by a user as an interaction with an assistant-based client system, e.g., a VR headset or AR smart glasses, determine candidate gestures in an auto-completion manner based on the incomplete gesture, recommend these candidate gestures to the user, for which the user may select one of them to trigger the execution of a particular task. As an example and not by way of limitation, a user wearing AR glasses may not know what gesture to perform to trigger a particular function of the assistant system. The user may start moving his/her hand but pause in the air. Accordingly, the assistant system may analyze the incomplete gesture of the user and determine possible candidate gestures. The assistant system may display these candidate gestures visually via the AR glasses to the user. After the user selects one of them, the assistant system may further execute a task corresponding to that gesture. In summary, the assistant system may use gesture recognition techniques on incomplete gestures to determine the user-intended gestures and suggest the determined gestures as guidance to the user, which may be referred as auto-completion for gesture-input. Although this disclosure describes generating particular auto-completion for particular gesture-inputs via particular systems in particular manners, this disclosure contemplates generating any suitable auto-completion for any suitable gesture-input via any suitable system in any suitable manner.

In particular embodiments, the assistant system may receive, from a client system associated with a first user, a user input from the first user. The user input may comprise an incomplete gesture performed by the first user. In particular embodiments, the assistant system may calculate, by an intent-understanding module, one or more confidences scores for one or more intents corresponding to the incomplete gesture. The assistant system may then determine that the calculated confidence scores associated with each of the intents are below a threshold score. In particular embodiments, the assistant system may select, based on a personalized gesture-recognition model, one or more candidate gestures from a plurality of pre-defined gestures responsive to determining that the calculated confidence scores for each of the intents are below the threshold score. Each of the candidate gestures may be associated with a confidence score representing a likelihood the first user intended to input the respective candidate gesture. In particular embodiments, the assistant system may further send, to the client system, instructions for presenting one or more suggested inputs corresponding to one or more of the candidate gestures.

Certain technical challenges exist for achieving the goal of suggesting multi-modal user input for auto-completion. One technical challenge may include determining candidate continuation-inputs based on the initial input. A solution presented by the embodiments disclosed herein to address the above challenge is determining the candidate continuation-inputs based on the intent of the initial input and the potential entities relevant to the intent, or an object associated with the initial input, as such information may be necessary to determine what continuation-input a user may use to interact with the assistant system to execute tasks that based on the intent and the entities or the object. Another technical challenge may include determining that a user needs suggested inputs. A solution presented by the embodiments disclosed herein to address this challenge is determining whether to suggest candidate continuation-inputs based on different factors including wake-up inputs, gaze information, contextual information, and intents, as such information may reveal a user's requirement for assistance from different perspectives.

Certain embodiments disclosed herein may provide one or more technical advantages. A technical advantage of the embodiments may include enriching user experience with the assistant system as a user may interact with the assistant system with inputs in various modalities. Another technical advantage of the embodiments may include increasing the degree of users engaging with the assistant system by guiding users with sequences of suggested inputs to explore various tasks that the users may request assistance. Certain embodiments disclosed herein may provide none, some, or all of the above technical advantages. One or more other technical advantages may be readily apparent to one skilled in the art in view of the figures, descriptions, and claims of the present disclosure.

Certain technical challenges exist for achieving the goal of suggesting candidate gestures for auto-completion. One technical challenge includes determining similarity levels of candidate gestures with respect to the incomplete gesture. The solution presented by the embodiments disclosed herein to address the above challenge is determining the similarity levels based on different factors including trajectory, orientation, objects, contextual information, and position associated with the incomplete gesture, as such information may provide different informative cues for the assistant system to calculate similarity levels. Another technical challenge includes determining that a user needs suggested inputs for gestures. The solution presented by the embodiments disclosed herein to address this challenge is determining whether to suggest candidate gestures based on different factors including confidence scores of intents, wake-up gestures, temporal information of the incomplete gesture, velocity of the incomplete gesture, and patterns of the incomplete gesture, as such information may reveal a user's requirement for assistance from different perspectives.

Certain embodiments disclosed herein may provide one or more technical advantages. A technical advantage of the embodiments may include improving user experience with the assistant system as the assistant system may understand a user's intent based on an incomplete gesture and teach a user to complete the incomplete gesture to interact with the assistant system. Another technical advantage of the embodiments may include increasing the degree of users engaging with the assistant system by guiding users with sequences of suggested gestures to explore various tasks that the users may request assistance. Certain embodiments disclosed herein may provide none, some, or all of the above technical advantages. One or more other technical advantages may be readily apparent to one skilled in the art in view of the figures, descriptions, and claims of the present disclosure.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
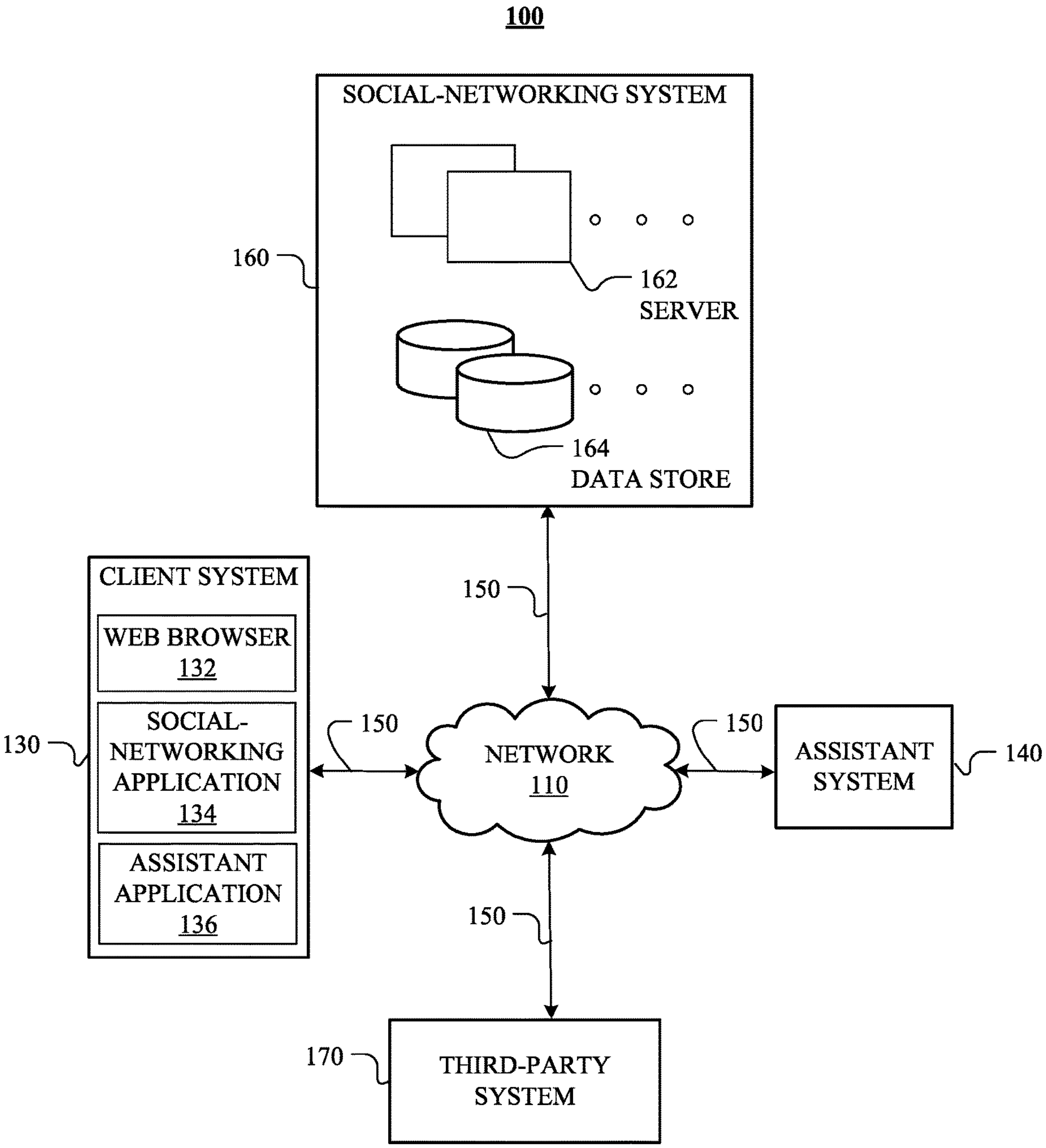
FIG. 1 illustrates an example network environment associated with an assistant system.

FIG. 1 illustrates an example network environment 100 associated with an assistant system. Network environment 100 includes a client system 130, an assistant system 140, a social-networking system 160, and a third-party system 170 connected to each other by a network 110. Although FIG. 1 illustrates a particular arrangement of a client system 130, an assistant system 140, a social-networking system 160, a third-party system 170, and a network 110, this disclosure contemplates any suitable arrangement of a client system 130, an assistant system 140, a social-networking system 160, a third-party system 170, and a network 110. As an example and not by way of limitation, two or more of a client system 130, a social-networking system 160, an assistant system 140, and a third-party system 170 may be connected to each other directly, bypassing a network 110. As another example, two or more of a client system 130, an assistant system 140, a social-networking system 160, and a third-party system 170 may be physically or logically co-located with each other in whole or in part. Moreover, although FIG. 1 illustrates a particular number of client systems 130, assistant systems 140, social-networking systems 160, third-party systems 170, and networks 110, this disclosure contemplates any suitable number of client systems 130, assistant systems 140, social-networking systems 160, third-party systems 170, and networks 110. As an example and not by way of limitation, network environment 100 may include multiple client systems 130, assistant systems 140, social-networking systems 160, third-party systems 170, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, an assistant system 140, a social-networking system 160, and a third-party system 170 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, smart speaker, virtual reality (VR) headset, augment reality (AR) smart glasses, other suitable electronic device, or any suitable combination thereof. In particular embodiments, the client system 130 may be a smart assistant device. More information on smart assistant devices may be found in U.S. patent application Ser. No. 15/949,011, filed 9 Apr. 2018, U.S. patent application Ser. No. 62/655,751, filed 10 Apr. 2018, U.S. Design patent application No. 29/631,910, filed 3 Jan. 2018, U.S. Design patent application No. 29/6317,47, filed 2 Jan. 2018, U.S. Design patent application No. 29/631,913, filed 3 Jan. 2018, and U.S. Design patent application No. 29/631,914, filed 3 Jan. 2018, each of which is incorporated by reference. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a web browser 132, and may have one or more add-ons, plug-ins, or other extensions. A user at a client system 130 may enter a Uniform Resource Locator (URL) or other address directing a web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, a client system 130 may include a social-networking application 134 installed on the client system 130. A user at a client system 130 may use the social-networking application 134 to access on online social network. The user at the client system 130 may use the social-networking application 134 to communicate with the user's social connections (e.g., friends, followers, followed accounts, contacts, etc.). The user at the client system 130 may also use the social-networking application 134 to interact with a plurality of content objects (e.g., posts, news articles, ephemeral content, etc.) on the online social network. As an example and not by way of limitation, the user may browse trending topics and breaking news using the social-networking application 134.

In particular embodiments, a client system 130 may include an assistant application 136. A user at a client system 130 may use the assistant application 136 to interact with the assistant system 140. In particular embodiments, the assistant application 136 may comprise a stand-alone application. In particular embodiments, the assistant application 136 may be integrated into the social-networking application 134 or another suitable application (e.g., a messaging application). In particular embodiments, the assistant application 136 may be also integrated into the client system 130, an assistant hardware device, or any other suitable hardware devices. In particular embodiments, the assistant application 136 may be accessed via the web browser 132. In particular embodiments, the user may provide input via different modalities. As an example and not by way of limitation, the modalities may include audio, text, image, video, motion, orientation, etc. The assistant application 136 may communicate the user input to the assistant system 140. Based on the user input, the assistant system 140 may generate responses. The assistant system 140 may send the generated responses to the assistant application 136. The assistant application 136 may then present the responses to the user at the client system 130. The presented responses may be based on different modalities such as audio, text, image, and video. As an example and not by way of limitation, the user may verbally ask the assistant application 136 about the traffic information (i.e., via an audio modality). The assistant application 136 may then communicate the request to the assistant system 140. The assistant system 140 may accordingly generate the result and send it back to the assistant application 136. The assistant application 136 may further present the result to the user in text.

In particular embodiments, an assistant system 140 may assist users to retrieve information from different sources. The assistant system 140 may also assist user to request services from different service providers. In particular embodiments, the assist system 140 may receive a user request for information or services via the assistant application 136 in the client system 130. The assist system 140 may use natural-language understanding to analyze the user request based on user's profile and other relevant information. The result of the analysis may comprise different entities associated with an online social network. The assistant system 140 may then retrieve information or request services associated with these entities. In particular embodiments, the assistant system 140 may interact with the social-networking system 160 and/or third-party system 170 when retrieving information or requesting services for the user. In particular embodiments, the assistant system 140 may generate a personalized communication content for the user using natural-language generating techniques. The personalized communication content may comprise, for example, the retrieved information or the status of the requested services. In particular embodiments, the assistant system 140 may enable the user to interact with it regarding the information or services in a stateful and multi-turn conversation by using dialog-management techniques. The functionality of the assistant system 140 is described in more detail in the discussion of FIG. 2 below.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using a web browser 132, or a native application associated with the social-networking system 160 (e.g., a mobile social-networking application, a messaging application, another suitable application, or any combination thereof) either directly or via a network 110. In particular embodiments, the social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, the social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, an assistant system 140, or a third-party system 170 to manage, retrieve, modify, add, or delete, the information stored in data store 164.

In particular embodiments, the social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160. In particular embodiments, however, the social-networking system 160 and third-party systems 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof. In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 160 to one or more client systems 130 or one or more third-party systems 170 via a network 110. The web server may include a mail server or other messaging functionality for receiving and routing messages between the social-networking system 160 and one or more client systems 130. An API-request server may allow an assistant system 140 and a third-party system 170 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Assistant Systems

Figure 2:
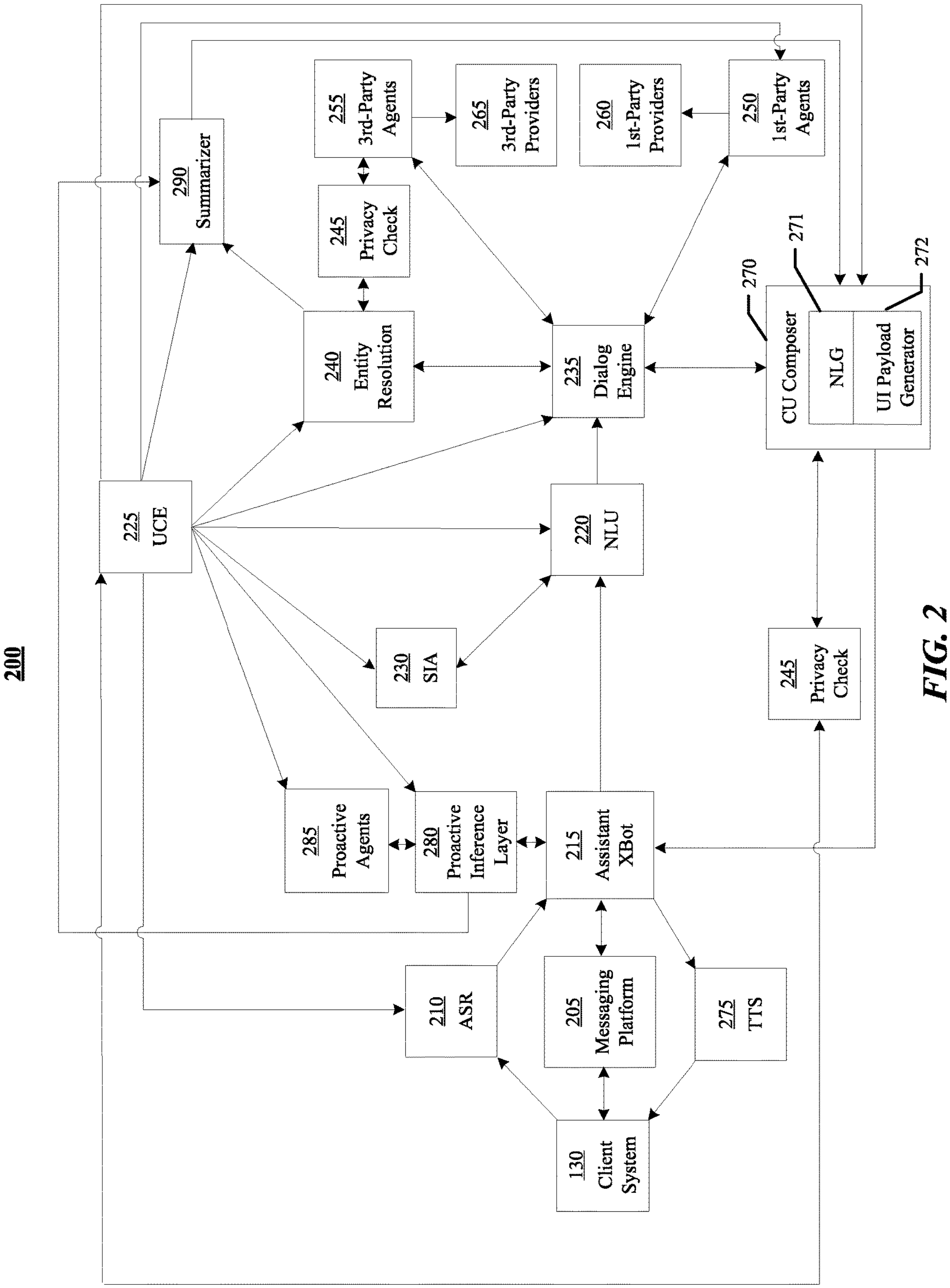
FIG. 2 illustrates an example architecture of the assistant system.

FIG. 2 illustrates an example architecture 200 of the assistant system 140. In particular embodiments, the assistant system 140 may assist a user to obtain information or services. The assistant system 140 may enable the user to interact with it with multi-modal user input (such as voice, text, image, video, motion) in stateful and multi-turn conversations to get assistance. The assistant system 140 may create and store a user profile comprising both personal and contextual information associated with the user. In particular embodiments, the assistant system 140 may analyze the user input using natural-language understanding. The analysis may be based on the user profile for more personalized and context-aware understanding. The assistant system 140 may resolve entities associated with the user input based on the analysis. In particular embodiments, the assistant system 140 may interact with different agents to obtain information or services that are associated with the resolved entities. The assistant system 140 may generate a response for the user regarding the information or services by using natural-language generation. Through the interaction with the user, the assistant system 140 may use dialog management techniques to manage and forward the conversation flow with the user. In particular embodiments, the assistant system 140 may further assist the user to effectively and efficiently digest the obtained information by summarizing the information. The assistant system 140 may also assist the user to be more engaging with an online social network by providing tools that help the user interact with the online social network (e.g., creating posts, comments, messages). The assistant system 140 may additionally assist the user to manage different tasks such as keeping track of events. In particular embodiments, the assistant system 140 may proactively execute pre-authorized tasks that are relevant to user interests and preferences based on the user profile, at a time relevant for the user, without a user input. In particular embodiments, the assistant system 140 may check privacy settings to ensure that accessing a user's profile or other user information and executing different tasks are permitted subject to the user's privacy settings. More information on assisting users subject to privacy settings may be found in U.S. Patent Application No. 62/675,090, filed 22 May 2018, which is incorporated by reference.

In particular embodiments, the assistant system 140 may receive a user input from the assistant application 136 in the client system 130 associated with the user. In particular embodiments, the user input may be a user generated input that is sent to the assistant system 140 in a single turn. If the user input is based on a text modality, the assistant system 140 may receive it at a messaging platform 205. If the user input is based on an audio modality (e.g., the user may speak to the assistant application 136 or send a video including speech to the assistant application 136), the assistant system 140 may process it using an automatic speech recognition (ASR) module 210 to convert the user input into text. If the user input is based on an image or video modality, the assistant system 140 may process it using optical character recognition techniques within the messaging platform 205 to convert the user input into text. The output of the messaging platform 205 or the ASR module 210 may be received at an assistant xbot 215. More information on handling user input based on different modalities may be found in U.S. patent application Ser. No. 16/053,600, filed 2 Aug. 2018, which is incorporated by reference.

In particular embodiments, the assistant xbot 215 may be a type of chat bot. The assistant xbot 215 may comprise a programmable service channel, which may be a software code, logic, or routine that functions as a personal assistant to the user. The assistant xbot 215 may work as the user's portal to the assistant system 140. The assistant xbot 215 may therefore be considered as a type of conversational agent. In particular embodiments, the assistant xbot 215 may send the textual user input to a natural-language understanding (NLU) module 220 to interpret the user input. In particular embodiments, the NLU module 220 may get information from a user context engine 225 and a semantic information aggregator (SIA) 230 to accurately understand the user input. The user context engine 225 may store the user profile of the user. The user profile of the user may comprise user-profile data including demographic information, social information, and contextual information associated with the user. The user-profile data may also include user interests and preferences on a plurality of topics, aggregated through conversations on news feed, search logs, messaging platform 205, etc. The usage of a user profile may be protected behind a privacy check module 245 to ensure that a user's information can be used only for his/her benefit, and not shared with anyone else. More information on user profiles may be found in U.S. patent application Ser. No. 15/967,239, filed 30 Apr. 2018, which is incorporated by reference. The semantic information aggregator 230 may provide ontology data associated with a plurality of pre-defined domains, intents, and slots to the NLU module 220. In particular embodiments, a domain may denote a social context of interaction, e.g., education. An intent may be an element in a pre-defined taxonomy of semantic intentions, which may indicate a purpose of a user interacting with the assistant system 140. In particular embodiments, an intent may be an output of the NLU module 220 if the user input comprises a text/speech input. The NLU module 220 may classify the text/speech input into a member of the pre-defined taxonomy, e.g., for the input "Play Beethoven's 5th," the NLU module 220 may classify the input as having the intent [IN:play_music]. In particular embodiments, a domain may be conceptually a namespace for a set of intents, e.g., music. A slot may be a named sub-string with the user input, representing a basic semantic entity. For example, a slot for "pizza" may be [SL:dish]. In particular embodiments, a set of valid or expected named slots may be conditioned on the classified intent. As an example and not by way of limitation, for [IN:play_music], a slot may be [SL:song_name]. The semantic information aggregator 230 may additionally extract information from a social graph, a knowledge graph, and a concept graph, and retrieve a user's profile from the user context engine 225. The semantic information aggregator 230 may further process information from these different sources by determining what information to aggregate, annotating n-grams of the user input, ranking the n-grams with confidence scores based on the aggregated information, formulating the ranked n-grams into features that can be used by the NLU module 220 for understanding the user input. More information on aggregating semantic information may be found in U.S. patent application Ser. No. 15/967,342, filed 30 Apr. 2018, which is incorporated by reference. Based on the output of the user context engine 225 and the semantic information aggregator 230, the NLU module 220 may identify a domain, an intent, and one or more slots from the user input in a personalized and context-aware manner. As an example and not by way of limitation, a user input may comprise "show me how to get to the coffee shop". The NLU module 220 may identify the particular coffee shop that the user wants to go based on the user's personal information and the associated contextual information. In particular embodiments, the NLU module 220 may comprise a lexicon of language and a parser and grammar rules to partition sentences into an internal representation. The NLU module 220 may also comprise one or more programs that perform naive semantics or stochastic semantic analysis to the use of pragmatics to understand a user input. In particular embodiments, the parser may be based on a deep learning architecture comprising multiple long-short term memory (LSTM) networks. As an example and not by way of limitation, the parser may be based on a recurrent neural network grammar (RNNG) model, which is a type of recurrent and recursive LSTM algorithm. More information on natural-language understanding may be found in U.S. patent application Ser. No. 16/011,062, filed 18 Jun. 2018, U.S. patent application Ser. No. 16/025,317, filed 2 Jul. 2018, and U.S. patent application Ser. No. 16/038,120, filed 17 Jul. 2018, each of which is incorporated by reference.

In particular embodiments, the identified domain, intent, and one or more slots from the NLU module 220 may be sent to a dialog engine 235. In particular embodiments, the dialog engine 235 may manage the dialog state and flow of the conversation between the user and the assistant xbot 215. The dialog engine 235 may additionally store previous conversations between the user and the assistant xbot 215. In particular embodiments, the dialog engine 235 may communicate with an entity resolution module 240 to resolve entities associated with the one or more slots, which supports the dialog engine 235 to forward the flow of the conversation between the user and the assistant xbot 215. In particular embodiments, the entity resolution module 240 may access the social graph, the knowledge graph, and the concept graph when resolving the entities. Entities may include, for example, unique users or concepts, each of which may have a unique identifier (ID). As an example and not by way of limitation, the knowledge graph may comprise a plurality of entities. Each entity may comprise a single record associated with one or more attribute values. The particular record may be associated with a unique entity identifier. Each record may have diverse values for an attribute of the entity. Each attribute value may be associated with a confidence probability. A confidence probability for an attribute value represents a probability that the value is accurate for the given attribute. Each attribute value may be also associated with a semantic weight. A semantic weight for an attribute value may represent how the value semantically appropriate for the given attribute considering all the available information. For example, the knowledge graph may comprise an entity of a movie titled "MovieName", which includes information that has been extracted from multiple content sources (e.g., social media, knowledge bases, movie review sources, media databases, and entertainment content sources), and then deduped, resolved, and fused to generate the single unique record for the knowledge graph. The entity may be associated with a space attribute value which indicates the genre of the movie "MovieName". More information on the knowledge graph may be found in U.S. patent application Ser. No. 16/048,049, filed 27 Jul. 2018, and U.S. patent application Ser. No. 16/048,101, filed 27 Jul. 2018, each of which is incorporated by reference. The entity resolution module 240 may additionally request a user profile of the user associated with the user input from the user context engine 225. In particular embodiments, the entity resolution module 240 may communicate with a privacy check module 245 to guarantee that the resolving of the entities does not violate privacy policies. In particular embodiments, the privacy check module 245 may use an authorization/privacy server to enforce privacy policies. As an example and not by way of limitation, an entity to be resolved may be another user who specifies in his/her privacy settings that his/her identity should not be searchable on the online social network, and thus the entity resolution module 240 may not return that user's identifier in response to a request. Based on the information obtained from the social graph, knowledge graph, concept graph, and user profile, and subject to applicable privacy policies, the entity resolution module 240 may therefore accurately resolve the entities associated with the user input in a personalized and context-aware manner. In particular embodiments, each of the resolved entities may be associated with one or more identifiers hosted by the social-networking system 160. As an example and not by way of limitation, an identifier may comprise a unique user identifier (ID). In particular embodiments, each of the resolved entities may be also associated with a confidence score. More information on resolving entities may be found in U.S. patent application Ser. No. 16/048,049, filed 27 Jul. 2018, and U.S. patent application Ser. No. 16/048,072, filed 27 Jul. 2018, each of which is incorporated by reference.

In particular embodiments, the dialog engine 235 may communicate with different agents based on the identified intent and domain, and the resolved entities. In particular embodiments, an agent may be an implementation that serves as a broker across a plurality of content providers for one domain. A content provider may be an entity responsible for carrying out an action associated with an intent or completing a task associated with the intent. As an example and not by way of limitation, multiple device-specific implementations (e.g., real-time calls for a client system 130 or a messaging application on the client system 130) may be handled internally by a single agent. Alternatively, these device-specific implementations may be handled by multiple agents associated with multiple domains. In particular embodiments, the agents may comprise first-party agents 250 and third-party agents 255. In particular embodiments, first-party agents 250 may comprise internal agents that are accessible and controllable by the assistant system 140 (e.g. agents associated with services provided by the online social network). In particular embodiments, third-party agents 255 may comprise external agents that the assistant system 140 has no control over (e.g., music streams agents, ticket sales agents). The first-party agents 250 may be associated with first-party providers 260 that provide content objects and/or services hosted by the social-networking system 160. The third-party agents 255 may be associated with third-party providers 265 that provide content objects and/or services hosted by the third-party system 170.

In particular embodiments, the communication from the dialog engine 235 to the first-party agents 250 may comprise requesting particular content objects and/or services provided by the first-party providers 260. As a result, the first-party agents 250 may retrieve the requested content objects from the first-party providers 260 and/or execute tasks that command the first-party providers 260 to perform the requested services. In particular embodiments, the communication from the dialog engine 235 to the third-party agents 255 may comprise requesting particular content objects and/or services provided by the third-party providers 265. As a result, the third-party agents 255 may retrieve the requested content objects from the third-party providers 265 and/or execute tasks that command the third-party providers 265 to perform the requested services. The third-party agents 255 may access the privacy check module 245 to guarantee no privacy violations before interacting with the third-party providers 265. As an example and not by way of limitation, the user associated with the user input may specify in his/her privacy settings that his/her profile information is invisible to any third-party content providers. Therefore, when retrieving content objects associated with the user input from the third-party providers 265, the third-party agents 255 may complete the retrieval without revealing to the third-party providers 265 which user is requesting the content objects.

In particular embodiments, each of the first-party agents 250 or third-party agents 255 may be designated for a particular domain. As an example and not by way of limitation, the domain may comprise weather, transportation, music, etc. In particular embodiments, the assistant system 140 may use a plurality of agents collaboratively to respond to a user input. As an example and not by way of limitation, the user input may comprise "direct me to my next meeting." The assistant system 140 may use a calendar agent to retrieve the location of the next meeting. The assistant system 140 may then use a navigation agent to direct the user to the next meeting.

In particular embodiments, each of the first-party agents 250 or third-party agents 255 may retrieve a user profile from the user context engine 225 to execute tasks in a personalized and context-aware manner. As an example and not by way of limitation, a user input may comprise "book me a ride to the airport." A transportation agent may execute the task of booking the ride. The transportation agent may retrieve the user profile of the user from the user context engine 225 before booking the ride. For example, the user profile may indicate that the user prefers taxis, so the transportation agent may book a taxi for the user. As another example, the contextual information associated with the user profile may indicate that the user is in a hurry so the transportation agent may book a ride from a ride-sharing service for the user since it may be faster to get a car from a ride-sharing service than a taxi company. In particular embodiment, each of the first-party agents 250 or third-party agents 255 may take into account other factors when executing tasks. As an example and not by way of limitation, other factors may comprise price, rating, efficiency, partnerships with the online social network, etc.

In particular embodiments, the dialog engine 235 may communicate with a conversational understanding composer (CU composer) 270. The dialog engine 235 may send the requested content objects and/or the statuses of the requested services to the CU composer 270. In particular embodiments, the dialog engine 235 may send the requested content objects and/or the statuses of the requested services as a <k, c, u, d> tuple, in which k indicates a knowledge source, c indicates a communicative goal, u indicates a user model, and d indicates a discourse model. In particular embodiments, the CU composer 270 may comprise a natural-language generator (NLG) 271 and a user interface (UI) payload generator 272. The natural-language generator 271 may generate a communication content based on the output of the dialog engine 235. In particular embodiments, the NLG 271 may comprise a content determination component, a sentence planner, and a surface realization component. The content determination component may determine the communication content based on the knowledge source, communicative goal, and the user's expectations. As an example and not by way of limitation, the determining may be based on a description logic. The description logic may comprise, for example, three fundamental notions which are individuals (representing objects in the domain), concepts (describing sets of individuals), and roles (representing binary relations between individuals or concepts). The description logic may be characterized by a set of constructors that allow the natural-language generator 271 to build complex concepts/roles from atomic ones. In particular embodiments, the content determination component may perform the following tasks to determine the communication content. The first task may comprise a translation task, in which the input to the natural-language generator 271 may be translated to concepts. The second task may comprise a selection task, in which relevant concepts may be selected among those resulted from the translation task based on the user model. The third task may comprise a verification task, in which the coherence of the selected concepts may be verified. The fourth task may comprise an instantiation task, in which the verified concepts may be instantiated as an executable file that can be processed by the natural-language generator 271. The sentence planner may determine the organization of the communication content to make it human understandable. The surface realization component may determine specific words to use, the sequence of the sentences, and the style of the communication content. The UI payload generator 272 may determine a preferred modality of the communication content to be presented to the user. In particular embodiments, the CU composer 270 may communicate with the privacy check module 245 to make sure the generation of the communication content follows the privacy policies. In particular embodiments, the CU composer 270 may retrieve a user profile from the user context engine 225 when generating the communication content and determining the modality of the communication content. As a result, the communication content may be more natural, personalized, and context-aware for the user. As an example and not by way of limitation, the user profile may indicate that the user likes short sentences in conversations so the generated communication content may be based on short sentences. As another example and not by way of limitation, the contextual information associated with the user profile may indicated that the user is using a device that only outputs audio signals so the UI payload generator 272 may determine the modality of the communication content as audio. More information on natural-language generation may be found in U.S. patent application Ser. No. 15/967,279, filed 30 Apr. 2018, and U.S. patent application Ser. No. 15/966,455, filed 30 Apr. 2018, each of which is incorporated by reference.

In particular embodiments, the CU composer 270 may send the generated communication content to the assistant xbot 215. In particular embodiments, the assistant xbot 215 may send the communication content to the messaging platform 205. The messaging platform 205 may further send the communication content to the client system 130 via the assistant application 136. In alternative embodiments, the assistant xbot 215 may send the communication content to a text-to-speech (TTS) module 275. The TTS module 275 may convert the communication content to an audio clip. The TTS module 275 may further send the audio clip to the client system 130 via the assistant application 136.

In particular embodiments, the assistant xbot 215 may interact with a proactive inference layer 280 without receiving a user input. The proactive inference layer 280 may infer user interests and preferences based on the user profile that is retrieved from the user context engine 225. In particular embodiments, the proactive inference layer 280 may further communicate with proactive agents 285 regarding the inference. The proactive agents 285 may execute proactive tasks based on the inference. As an example and not by way of limitation, the proactive tasks may comprise sending content objects or providing services to the user. In particular embodiments, each proactive task may be associated with an agenda item. The agenda item may comprise a recurring item such as a daily digest. The agenda item may also comprise a one-time item. In particular embodiments, a proactive agent 285 may retrieve the user profile from the user context engine 225 when executing the proactive task. Therefore, the proactive agent 285 may execute the proactive task in a personalized and context-aware manner. As an example and not by way of limitation, the proactive inference layer may infer that the user likes the band "BandName" and the proactive agent 285 may generate a recommendation of BandName's new song/album to the user.

In particular embodiments, the proactive agent 285 may generate candidate entities associated with the proactive task based on a user profile. The generation may be based on a straightforward backend query using deterministic filters to retrieve the candidate entities from a structured data store. The generation may be alternatively based on a machine-learning model that is trained based on the user profile, entity attributes, and relevance between users and entities. As an example and not by way of limitation, the machine-learning model may be based on support vector machines (SVM). As another example and not by way of limitation, the machine-learning model may be based on a regression model. As another example and not by way of limitation, the machine-learning model may be based on a deep convolutional neural network (DCNN). In particular embodiments, the proactive agent 285 may also rank the generated candidate entities based on the user profile and the content associated with the candidate entities. The ranking may be based on the similarities between a user's interests and the candidate entities. As an example and not by way of limitation, the assistant system 140 may generate a feature vector representing a user's interest and feature vectors representing the candidate entities. The assistant system 140 may then calculate similarity scores (e.g., based on cosine similarity) between the feature vector representing the user's interest and the feature vectors representing the candidate entities. The ranking may be alternatively based on a ranking model that is trained based on user feedback data.

In particular embodiments, the proactive task may comprise recommending the candidate entities to a user. The proactive agent 285 may schedule the recommendation, thereby associating a recommendation time with the recommended candidate entities. The recommended candidate entities may be also associated with a priority and an expiration time. In particular embodiments, the recommended candidate entities may be sent to a proactive scheduler. The proactive scheduler may determine an actual time to send the recommended candidate entities to the user based on the priority associated with the task and other relevant factors (e.g., clicks and impressions of the recommended candidate entities). In particular embodiments, the proactive scheduler may then send the recommended candidate entities with the determined actual time to an asynchronous tier. The asynchronous tier may temporarily store the recommended candidate entities as a job. In particular embodiments, the asynchronous tier may send the job to the dialog engine 235 at the determined actual time for execution. In alternative embodiments, the asynchronous tier may execute the job by sending it to other surfaces (e.g., other notification services associated with the social-networking system 160). In particular embodiments, the dialog engine 235 may identify the dialog intent, state, and history associated with the user. Based on the dialog intent, the dialog engine 235 may select some candidate entities among the recommended candidate entities to send to the client system 130. In particular embodiments, the dialog state and history may indicate if the user is engaged in an ongoing conversation with the assistant xbot 215. If the user is engaged in an ongoing conversation and the priority of the task of recommendation is low, the dialog engine 235 may communicate with the proactive scheduler to reschedule a time to send the selected candidate entities to the client system 130. If the user is engaged in an ongoing conversation and the priority of the task of recommendation is high, the dialog engine 235 may initiate a new dialog session with the user in which the selected candidate entities may be presented. As a result, the interruption of the ongoing conversation may be prevented. When it is determined that sending the selected candidate entities is not interruptive to the user, the dialog engine 235 may send the selected candidate entities to the CU composer 270 to generate a personalized and context-aware communication content comprising the selected candidate entities, subject to the user's privacy settings. In particular embodiments, the CU composer 270 may send the communication content to the assistant xbot 215 which may then send it to the client system 130 via the messaging platform 205 or the TTS module 275. More information on proactively assisting users may be found in U.S. patent application Ser. No. 15/967,193, filed 30 Apr. 2018, and U.S. patent application Ser. No. 16/036,827, filed 16 Jul. 2018, each of which is incorporated by reference.

In particular embodiments, the assistant xbot 215 may communicate with a proactive agent 285 in response to a user input. As an example and not by way of limitation, the user may ask the assistant xbot 215 to set up a reminder. The assistant xbot 215 may request a proactive agent 285 to set up such reminder and the proactive agent 285 may proactively execute the task of reminding the user at a later time.

In particular embodiments, the assistant system 140 may comprise a summarizer 290. The summarizer 290 may provide customized news feed summaries to a user. In particular embodiments, the summarizer 290 may comprise a plurality of meta agents. The plurality of meta agents may use the first-party agents 250, third-party agents 255, or proactive agents 285 to generated news feed summaries. In particular embodiments, the summarizer 290 may retrieve user interests and preferences from the proactive inference layer 280. The summarizer 290 may then retrieve entities associated with the user interests and preferences from the entity resolution module 240. The summarizer 290 may further retrieve a user profile from the user context engine 225. Based on the information from the proactive inference layer 280, the entity resolution module 240, and the user context engine 225, the summarizer 290 may generate personalized and context-aware summaries for the user. In particular embodiments, the summarizer 290 may send the summaries to the CU composer 270. The CU composer 270 may process the summaries and send the processing results to the assistant xbot 215. The assistant xbot 215 may then send the processed summaries to the client system 130 via the messaging platform 205 or the TTS module 275. More information on summarization may be found in U.S. patent application Ser. No. 15/967,290, filed 30 Apr. 2018, which is incorporated by reference.

Figure 3:
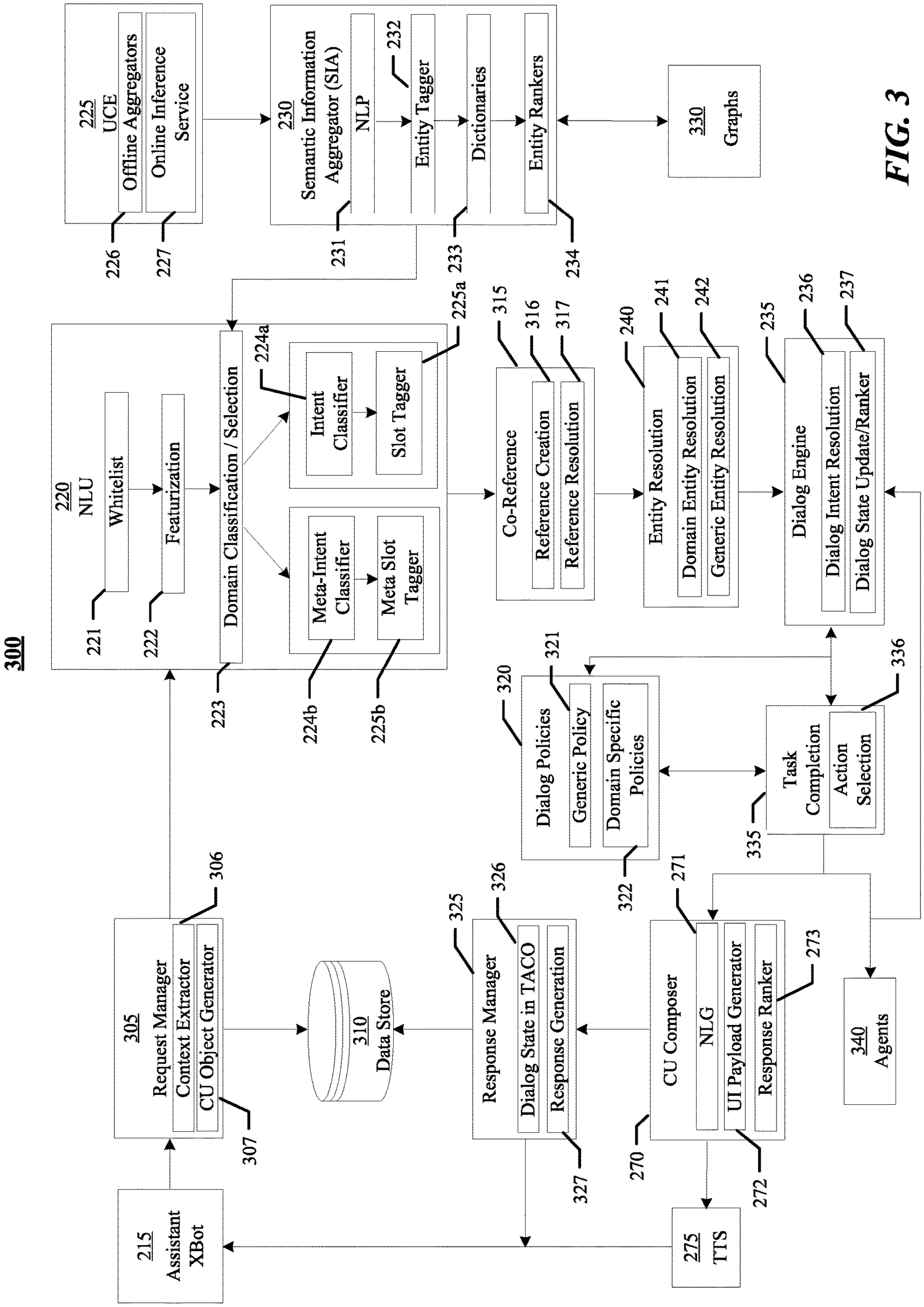
FIG. 3 illustrates an example diagram flow of responding to a user request by the assistant system.

FIG. 3 illustrates an example diagram flow 300 of responding to a user request by the assistant system 140. In particular embodiments, the assistant xbot 215 may access a request manager 305 upon receiving the user request. The request manager 305 may comprise a context extractor 306 and a conversational understanding object generator (CU object generator) 307. The context extractor 306 may extract contextual information associated with the user request. The context extractor 306 may also update contextual information based on the assistant application 136 executing on the client system 130. As an example and not by way of limitation, the update of contextual information may comprise content items are displayed on the client system 130. As another example and not by way of limitation, the update of contextual information may comprise whether an alarm is set on the client system 130. As another example and not by way of limitation, the update of contextual information may comprise whether a song is playing on the client system 130. The CU object generator 307 may generate particular content objects relevant to the user request. The content objects may comprise dialog-session data and features associated with the user request, which may be shared with all the modules of the assistant system 140. In particular embodiments, the request manager 305 may store the contextual information and the generated content objects in data store 310 which is a particular data store implemented in the assistant system 140.

In particular embodiments, the request manger 305 may send the generated content objects to the NLU module 220. The NLU module 220 may perform a plurality of steps to process the content objects. At step 221, the NLU module 220 may generate a whitelist for the content objects. In particular embodiments, the whitelist may comprise interpretation data matching the user request. At step 222, the NLU module 220 may perform a featurization based on the whitelist. At step 223, the NLU module 220 may perform domain classification/selection on user request based on the features resulted from the featurization to classify the user request into predefined domains. The domain classification/selection results may be further processed based on two related procedures. At step **224*a*, the NLU module 220 may process the domain classification/selection result using an intent classifier. The intent classifier may determine the user's intent associated with the user request. In particular embodiments, there may be one intent classifier for each domain to determine the most possible intents in a given domain. As an example and not by way of limitation, the intent classifier may be based on a machine-learning model that may take the domain classification/selection result as input and calculate a probability of the input being associated with a particular predefined intent. At step 224*b*, the NLU module may process the domain classification/selection result using a meta-intent classifier. The meta-intent classifier may determine categories that describe the user's intent. In particular embodiments, intents that are common to multiple domains may be processed by the meta-intent classifier. As an example and not by way of limitation, the meta-intent classifier may be based on a machine-learning model that may take the domain classification/selection result as input and calculate a probability of the input being associated with a particular predefined meta-intent. At step 225*a*, the NLU module 220 may use a slot tagger to annotate one or more slots associated with the user request. In particular embodiments, the slot tagger may annotate the one or more slots for the n-grams of the user request. At step 225*b*, the NLU module 220** may use a meta slot tagger to annotate one or more slots for the classification result from the meta-intent classifier. In particular embodiments, the meta slot tagger may tag generic slots such as references to items (e.g., the first), the type of slot, the value of the slot, etc. As an example and not by way of limitation, a user request may comprise "change 500 dollars in my account to Japanese yen." The intent classifier may take the user request as input and formulate it into a vector. The intent classifier may then calculate probabilities of the user request being associated with different predefined intents based on a vector comparison between the vector representing the user request and the vectors representing different predefined intents. In a similar manner, the slot tagger may take the user request as input and formulate each word into a vector. The intent classifier may then calculate probabilities of each word being associated with different predefined slots based on a vector comparison between the vector representing the word and the vectors representing different predefined slots.

The intent of the user may be classified as "changing money". The slots of the user request may comprise "500", "dollars", "account", and "Japanese yen". The meta-intent of the user may be classified as "financial service". The meta slot may comprise "finance".

In particular embodiments, the NLU module 220 may improve the domain classification/selection of the content objects by extracting semantic information from the semantic information aggregator 230. In particular embodiments, the semantic information aggregator 230 may aggregate semantic information in the following way. The semantic information aggregator 230 may first retrieve information from the user context engine 225. In particular embodiments, the user context engine 225 may comprise offline aggregators 226 and an online inference service 227. The offline aggregators 226 may process a plurality of data associated with the user that are collected from a prior time window. As an example and not by way of limitation, the data may include news feed posts/comments, interactions with news feed posts/comments, Instagram posts/comments, search history, etc. that are collected from a prior 90-day window. The processing result may be stored in the user context engine 225 as part of the user profile. The online inference service 227 may analyze the conversational data associated with the user that are received by the assistant system 140 at a current time. The analysis result may be stored in the user context engine 225 also as part of the user profile. In particular embodiments, both the offline aggregators 226 and online inference service 227 may extract personalization features from the plurality of data. The extracted personalization features may be used by other modules of the assistant system 140 to better understand user input. In particular embodiments, the semantic information aggregator 230 may then process the retrieved information, i.e., a user profile, from the user context engine 225 in the following steps. At step 231, the semantic information aggregator 230 may process the retrieved information from the user context engine 225 based on natural-language processing (NLP). In particular embodiments, the semantic information aggregator 230 may tokenize text by text normalization, extract syntax features from text, and extract semantic features from text based on NLP. The semantic information aggregator 230 may additionally extract features from contextual information, which is accessed from dialog history between a user and the assistant system 140. The semantic information aggregator 230 may further conduct global word embedding, domain-specific embedding, and/or dynamic embedding based on the contextual information. At step 232, the processing result may be annotated with entities by an entity tagger. Based on the annotations, the semantic information aggregator 230 may generate dictionaries for the retrieved information at step 233. In particular embodiments, the dictionaries may comprise global dictionary features which can be updated dynamically offline. At step 234, the semantic information aggregator 230 may rank the entities tagged by the entity tagger. In particular embodiments, the semantic information aggregator 230 may communicate with different graphs 330 including social graph, knowledge graph, and concept graph to extract ontology data that is relevant to the retrieved information from the user context engine 225. In particular embodiments, the semantic information aggregator 230 may aggregate the user profile, the ranked entities, and the information from the graphs 330. The semantic information aggregator 230 may then send the aggregated information to the NLU module 220 to facilitate the domain classification/selection.

In particular embodiments, the output of the NLU module 220 may be sent to a co-reference module 315 to interpret references of the content objects associated with the user request. In particular embodiments, the co-reference module 315 may be used to identify an item to which the user request refers. The co-reference module 315 may comprise reference creation 316 and reference resolution 317. In particular embodiments, the reference creation 316 may create references for entities determined by the NLU module 220. The reference resolution 317 may resolve these references accurately. As an example and not by way of limitation, a user request may comprise "find me the nearest supermarket and direct me there". The co-reference module 315 may interpret "there" as "the nearest supermarket". In particular embodiments, the co-reference module 315 may access the user context engine 225 and the dialog engine 235 when necessary to interpret references with improved accuracy.

In particular embodiments, the identified domains, intents, meta-intents, slots, and meta slots, along with the resolved references may be sent to the entity resolution module 240 to resolve relevant entities. The entity resolution module 240 may execute generic and domain-specific entity resolution. In particular embodiments, the entity resolution module 240 may comprise domain entity resolution 241 and generic entity resolution 242. The domain entity resolution 241 may resolve the entities by categorizing the slots and meta slots into different domains. In particular embodiments, entities may be resolved based on the ontology data extracted from the graphs 330. The ontology data may comprise the structural relationship between different slots/meta-slots and domains. The ontology may also comprise information of how the slots/meta-slots may be grouped, related within a hierarchy where the higher level comprises the domain, and subdivided according to similarities and differences. The generic entity resolution 242 may resolve the entities by categorizing the slots and meta slots into different generic topics. In particular embodiments, the resolving may be also based on the ontology data extracted from the graphs 330. The ontology data may comprise the structural relationship between different slots/meta-slots and generic topics. The ontology may also comprise information of how the slots/meta-slots may be grouped, related within a hierarchy where the higher level comprises the topic, and subdivided according to similarities and differences. As an example and not by way of limitation, in response to the input of an inquiry of the advantages of a Tesla car, the generic entity resolution 242 may resolve a Tesla car as vehicle and the domain entity resolution 241 may resolve the Tesla car as electric car.

In particular embodiments, the output of the entity resolution module 240 may be sent to the dialog engine 235 to forward the flow of the conversation with the user. The dialog engine 235 may comprise dialog intent resolution 236 and dialog state update/ranker 237. In particular embodiments, the dialog intent resolution 236 may resolve the user intent associated with the current dialog session based on dialog history between the user and the assistant system 140. The dialog intent resolution 236 may map intents determined by the NLU module 220 to different dialog intents. The dialog intent resolution 236 may further rank dialog intents based on signals from the NLU module 220, the entity resolution module 240, and dialog history between the user and the assistant system 140. In particular embodiments, the dialog state update/ranker 237 may update/rank the dialog state of the current dialog session. As an example and not by way of limitation, the dialog state update/ranker 237 may update the dialog state as "completed" if the dialog session is over. As another example and not by way of limitation, the dialog state update/ranker 237 may rank the dialog state based on a priority associated with it.

In particular embodiments, the dialog engine 235 may communicate with a task completion module 335 about the dialog intent and associated content objects. In particular embodiments, the task completion module 335 may rank different dialog hypotheses for different dialog intents. The task completion module 335 may comprise an action selection component 336. In particular embodiments, the dialog engine 235 may additionally check against dialog policies 320 regarding the dialog state. In particular embodiments, a dialog policy 320 may comprise a data structure that describes an execution plan of an action by an agent 340. An agent 340 may select among registered content providers to complete the action. The data structure may be constructed by the dialog engine 235 based on an intent and one or more slots associated with the intent. A dialog policy 320 may further comprise multiple goals related to each other through logical operators. In particular embodiments, a goal may be an outcome of a portion of the dialog policy and it may be constructed by the dialog engine 235. A goal may be represented by an identifier (e.g., string) with one or more named arguments, which parameterize the goal. As an example and not by way of limitation, a goal with its associated goal argument may be represented as {confirm_artist, args: {artist: "ArtistName"}}. In particular embodiments, a dialog policy may be based on a tree-structured representation, in which goals are mapped to leaves of the tree. In particular embodiments, the dialog engine 235 may execute a dialog policy 320 to determine the next action to carry out. The dialog policies 320 may comprise generic policy 321 and domain specific policies 322, both of which may guide how to select the next system action based on the dialog state. In particular embodiments, the task completion module 335 may communicate with dialog policies 320 to obtain the guidance of the next system action. In particular embodiments, the action selection component 336 may therefore select an action based on the dialog intent, the associated content objects, and the guidance from dialog policies 320.

In particular embodiments, the output of the task completion module 335 may be sent to the CU composer 270. In alternative embodiments, the selected action may require one or more agents 340 to be involved. As a result, the task completion module 335 may inform the agents 340 about the selected action. Meanwhile, the dialog engine 235 may receive an instruction to update the dialog state. As an example and not by way of limitation, the update may comprise awaiting agents' response. In particular embodiments, the CU composer 270 may generate a communication content for the user using the NLG 271 based on the output of the task completion module 335. In particular embodiments, the NLG 271 may use different language models and/or language templates to generate natural language outputs. The generation of natural language outputs may be application specific. The generation of natural language outputs may be also personalized for each user. The CU composer 270 may also determine a modality of the generated communication content using the UI payload generator 272. Since the generated communication content may be considered as a response to the user request, the CU composer 270 may additionally rank the generated communication content using a response ranker 273. As an example and not by way of limitation, the ranking may indicate the priority of the response.

In particular embodiments, the output of the CU composer 270 may be sent to a response manager 325. The response manager 325 may perform different tasks including storing/updating the dialog state 326 retrieved from data store 310 and generating responses 327. In particular embodiments, the output of CU composer 270 may comprise one or more of natural-language strings, speech, or actions with parameters. As a result, the response manager 325 may determine what tasks to perform based on the output of CU composer 270. In particular embodiments, the generated response and the communication content may be sent to the assistant xbot 215. In alternative embodiments, the output of the CU composer 270 may be additionally sent to the TTS module 275 if the determined modality of the communication content is audio. The speech generated by the TTS module 275 and the response generated by the response manager 325 may be then sent to the assistant xbot 215.

Gesture-Input Workflow

Figure 4:
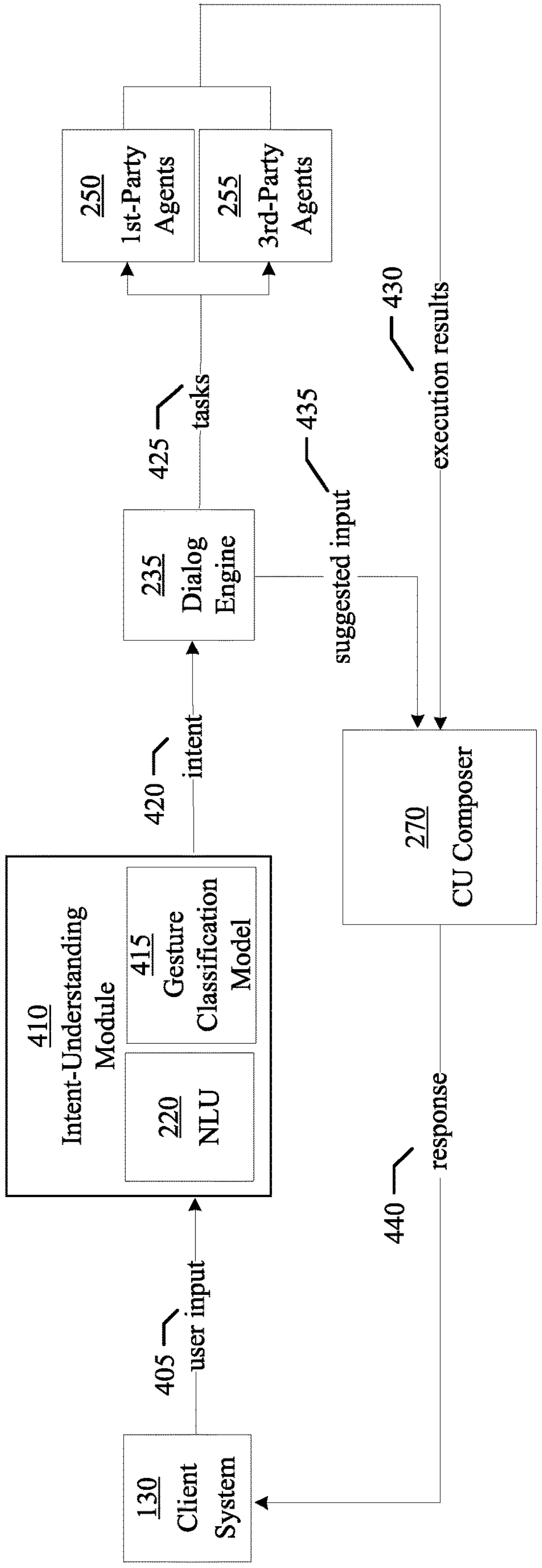
FIG. 4 illustrates an example workflow of processing a user input comprising a gesture-input.

FIG. 4 illustrates an example workflow 400 of processing a user input comprising a gesture-input. A gesture-input may be an input which is based on a movement of part of the body, especially a hand or the head, to express an idea or meaning. The gesture-inputs may be in the form of image information, video information, motion information, or any combination thereof. In particular embodiments, the assistant system 140 may receive a user input 405 by a user from a client system 130. The assistant system 140 may send the user input 405 to an intent-understanding module 410. The intent-understanding module 410 may comprise a natural-language understanding (NLU) module 220 and a gesture-classification model 415. The gesture-classification model 415 may be a machine-learning model trained offline to recognize different categories of gestures performed by users. As an example and not by way of limitation, a gesture classification model 415 may be based on one or more of convolutional neural networks, tensor flow, or hidden Markov models. Based on the user input 405, the intent-understanding module 410 may use different components to determine an intent 420 associated with the user input 405. If the user input 405 comprises a text-input or a speech-input, the intent-understanding module 410 may use the NLU module 220 to determine the intent 420. If the user input 405 comprises a gesture-input, the intent-understanding module 410 may use the gesture-classification model 415 to determine the intent 420. The determined intent 420 may be associated with a confidence score indicating how confident the assistant system 140 is in determining the user's intent 420. In particular embodiments, the confidence score may be determined based on how closely the user's text-input or speech-input matches a known input for a given intent 420. As an example and not by way of limitation, the closeness may be based on string similarity between the text-input and the known input (text). The assistant system 140 may then send the intent 420 with its confidence score to the dialog engine 235. If the confidence score is above a threshold score, the dialog engine 235 may determine one or more tasks 425 corresponding to the intent 420 and send them to either 1st-party agents 250 or 3rd-party agents 255 for executing the tasks 425. The execution results 430 may be sent to the CU composer 270. If the confidence score is below a threshold score, the dialog engine 235 may determine one or more suggested inputs 435 for the user, which may help the assistant system 140 determine the user's intent with a higher confidence score. The dialog engine 235 may send the suggested inputs 435 to the CU composer 270. Based on the execution results 430 or the suggested inputs 435, the CU composer 270 may generate a response 440. The response 440 may be in different modalities comprising one or more of a text, an image, a video, or an animation of a gesture. The CU composer 270 may further send the response 440 to the client system 130. Although this disclosure describes processing a user input via particular systems in particular manners, this disclosure contemplates describes processing any suitable user input via any suitable system in any suitable manner.

Auto-Completion for Multi-Modal User Input in Assistant Systems

In particular embodiments, the assistant system 140 may receive an initial input in a first modality executed by a user as an interaction with an assistant-based client system 130, e.g., a gesture-input to a virtual reality (VR) headset or augment reality (AR) smart glasses, determine candidate continuation-inputs in an auto-completion manner based on the initial input, and recommend these candidate continuation-inputs to the user in one or more second modalities (e.g., text), for which the user may select one of them to trigger the execution of a particular task 425. The initial input and continuation-inputs may be based on any suitable modality including text, speech, image, video, motion, orientation, etc. In addition, the modality of the initial input and the modalities of the continuation-inputs may be different. As an example and not by way of limitation, a user visiting Paris who wears AR glasses may be looking at Eiffel Tower. Based on the gaze input, the assistant system 140 may suggest a gesture displayed on the virtual screen for taking a picture or suggest the user to speak "take a picture." The user may perform the suggested gesture or speak the sentence to allow the assistant system 140 to execute the task of taking a picture of Eiffel Tower. As a result, the assistant system 140 may have the ability to process a user input 405 in one modality and generate suggested inputs in one or more other modalities, which may be referred as auto-completion for multi-modal user input. Although this disclosure describes generating particular auto-completion for particular multi-modal user inputs via particular systems in particular manners, this disclosure contemplates generating any suitable auto-completion for any suitable multi-modal user input via any suitable system in any suitable manner.

In particular embodiments, the assistant system 140 may receive, from a client system 130 associated with a first user, an initial input from the first user. The initial input may be in a first modality. In particular embodiments, the assistant system 140 may determine, by an intent-understanding module, one or more intents 420 corresponding to the initial input. The assistant system 140 may then generate, based on the one or more intents 420, one or more candidate continuation-inputs. The one or more candidate continuation-inputs may be in one or more candidate modalities, respectively. The candidate modalities may be different from the first modality. In particular embodiments, the assistant system 140 may further send, to the client system 130, instructions for presenting one or more suggested inputs corresponding to one or more of the candidate continuation-inputs.

In particular embodiments, the first modality may comprise one of audio, text, image, video, motion, or orientation. As an example and not by way of limitation, the first modality may comprise motion, and correspondingly the initial input may comprise a gesture. As another example and not by way of limitation, the first modality may comprise orientation, and correspondingly the initial input may comprise a gaze on an object. In particular embodiments, the first modality and the candidate modalities for the candidate continuation-inputs may be different. As an example and not by way of limitation, a user may be wearing AR glasses and his/her initial input may be a framing gesture by two hands for locating an object in front of him/her. The assistant system 140 may suggest the user to say "click" as a candidate continuation-input which is displayed as text on the screen of the AR glasses. Once the user says "click" the assistant system 140 may further execute the task of taking a picture of the object in the frame. As a result, the assistant system 140 may have technical advantage of enriching user experience with the assistant system 140 as a user may interact with the assistant system 140 with inputs in various modalities. Although this disclosure describes particular modalities in particular manners, this disclosure contemplates any suitable modality in any suitable manner.

In particular embodiments, the assistant system 140 may determine the candidate continuation-inputs based on the intent of the initial input and the potential entities relevant to the intent 420. The assistant system 140 may first identify one or more entities associated with the one or more intents 420. The assistant system 140 may then generate the one or more candidate continuation-inputs further based the one or more entities. As an example and not by way of limitation, a user may perform a calling gesture as an initial input. The assistant system 140 may determine a calling intent and possible entities (e.g., contacts) associated with the calling intent. The entities may be suggested to the user as text and the assistant system 140 may additionally ask the user to say the name of the entity that the user intended to call. Determining the candidate continuation-inputs based on the intent 420 of the initial input and the potential entities relevant to the intent 420 may be an effective solution for addressing the technical challenge of determining candidate continuation-inputs based on the initial input, as the intent 420 and the potential entities may be necessary to determine what continuation-input a user may use to interact with the assistant system 140 to execute tasks that based on them. Although this disclosure describes determining particular inputs in particular manners, this disclosure contemplates determining any suitable input in any suitable manner.

In particular embodiments, the assistant system 140 may determine that the first user needs one or more suggested inputs. The assistant system 140 may determine whether to suggest candidate continuation-inputs based on different factors. In particular embodiments, determining that the first user needs one or more suggested inputs may be based on a wake-up input from the first user. The wake-up input may comprise one or more of a voice utterance, a character string, an image, a video clip, a gesture, or a gaze. As an example and not by way of limitation, the wake-up input may be a voice command saying "assistant!" or a gesture such as snapping fingers. Once the assistant system 140 receives a wake-up input, it may initiate the process for suggesting candidate continuation-inputs. The assistant system 140 may be constantly in an active status for suggesting candidate continuation-inputs. In addition, whether to suggest continuation-inputs may be based on user attention, i.e., gaze information, detected by the assistant system 140. In particular embodiments, the initial input may comprise a gaze on an object and determining that the first user needs one or more suggested inputs may be further based on the gaze on the object. On the other hand, generating the one or more candidate continuation-inputs may be further based on the object. Determining the candidate continuation-inputs based on the object associated with the initial input may be an effective solution for addressing the technical challenge of determining candidate continuation-inputs based on the initial input, as the object may be necessary to determine what continuation-input a user may use to interact with the assistant system to execute tasks that based on it. As an example and not by way of limitation, if a user who wears AR glasses is staring at a pair of shoes at a store, the assistant system 140 may determine that the user needs suggested inputs and generate suggested inputs such as "taking a picture" and "checking the reviews," etc. The suggested inputs may be based on any suitable modality. For example, the suggested inputs may be presented as gestures displayed in the screen of the AR glasses, which the user can follow to perform. As another example, the suggested inputs may be audio-based, which the user can listen to. As another example and not by way of limitation, a user is having a video call on the AR glasses and then the user turned around and looked at a TV for a threshold amount of time. The assistant system 140 may then determine that the user needs suggested inputs. The assistant system 140 may present a suggested input that instructs the user to point to the TV if the user wants the video call to be mirrored to the TV. In particular embodiments, determining that the first user needs one or more suggested inputs may be further based on contextual information associated with the initial input. In particular embodiments, contextual information may comprise one or more of temporal information, location information, presence information, or social information. As an example and not by way of limitation, the user may input only a few letters and then stopped inputting text for over a certain amount of time. The assistant system 140 may then determine that the user needs suggested inputs as the user may be having difficulty inputting the intended text. As another example and not by way of limitation, the user may be at a self-service restaurant and send an image of a dish to the assistant system 140. The assistant system 140 may then determine that user needs suggested inputs such as the name of the dish or a request to order that dish. In particular embodiments, determining that the first user needs one or more suggested inputs may be further based on the one or more intents 420. As an example and not by way of limitation, a user' s initial input may indicate that the user wants to buy a movie ticket but the user did not provide any additional information. The assistant system 140 may then determine that the user needs suggested inputs such as names of recent popular movies. Although this disclosure describes determining whether to suggest particular inputs in particular manners, this disclosure contemplates determining whether to suggest any suitable input in any suitable manner.

In particular embodiments, the assistant system 140 may further receive, from the client system 130, a user-selected input from the first user. The user-selected input may comprise one of the suggested inputs. The assistant system 140 may then execute one or more tasks 425 based on the user-selected input. In particular embodiments, the assistant system 140 may suggest candidate continuation-inputs for more than once. In other words, the assistant system 140 may guide the user through a sequence of candidate continuation-inputs, in which each of the candidate continuation-inputs may be mapped to a specific intent 420. To be more specific, the assistant system 140 may receive, from the client system 130, a first user-selected input from the first user. The first user-selected input may comprise one of the suggested inputs and the first user-selected input may be associated with a first intent 420. The assistant system 140 may then generate, based on the first user-selected input, one or more additional candidate continuation-inputs. Each of the one or more additional candidate continuation-inputs may be associated with the first intent 420. The assistant system 140 may then send, to the client system 130, instructions for presenting one or more additional suggested inputs corresponding to one or more of the additional candidate continuation-inputs. The assistant system 140 may then receive, from the client system 130, a second user-selected input from the first user. The second user-selected input may comprise one of the additional suggested inputs. The assistant system 140 may further execute one or more tasks 425 based on the second user-selected input. The one or more tasks 425 may correspond to the first intent 420. In particular embodiments, the assistant system 140 may continue the aforementioned process until one or more tasks 425 that require a whole sequence of inputs are executed. As an example and not by way of limitation, a user wearing AR glasses may want to set a reminder by performing a "reminder" gesture. The assistant system 140 may recognize such gesture and generate suggestions of what events the reminder is for. The assistant system 140 may present three suggested events in text, e.g., "mow the lawn", "feed the dog", and "buy a gift for Mom". The user may tap "feeding the dog". The assistant system 140 may further generate suggested time (e.g., 10 am, 3 pm, and 7 pm) and ask the user to select the time either by tapping or speaking. After the user selects the time (e.g., by speaking "7 pm"), the assistant system 140 may set the reminder accordingly. As a result, the assistant system 140 may have a technical advantage of increasing the degree of users engaging with the assistant system 140 by guiding users with sequences of suggested inputs to explore various tasks that the users may request assistance. Although this disclosure describes generating particular sequences of inputs in particular manners, this disclosure contemplates generating any suitable sequence of input in any suitable manner.

Auto-Completion for Gesture-Input in Assistant Systems

In particular embodiments, the assistant system 140 may receive an incomplete gesture executed by a user as an interaction with an assistant-based client system 130, e.g., a VR headset or AR smart glasses, determine candidate gestures in an auto-completion manner based on the incomplete gesture, recommend these candidate gestures to the user, for which the user may select one of them to trigger the execution of a particular task 425. As an example and not by way of limitation, a user wearing AR glasses may not know what gesture to perform to trigger a particular function of the assistant system 140. The user may start moving his/her hand but pause in the air. Accordingly, the assistant system 140 may analyze the incomplete gesture of the user and determine possible candidate gestures. The assistant system 140 may display these candidate gestures visually via the AR glasses to the user. After the user selects one of them, the assistant system 140 may further execute a task 425 corresponding to that gesture. In summary, the assistant system 140 may use gesture recognition techniques on incomplete gestures to determine the user-intended gestures and suggest the determined gestures as guidance to the user, which may be referred as auto-completion for gesture-input. Although this disclosure describes generating particular auto-completion for particular gesture-inputs via particular systems in particular manners, this disclosure contemplates generating any suitable auto-completion for any suitable gesture-input via any suitable system in any suitable manner.

In particular embodiments, the assistant system 140 may receive, from a client system associated with a first user, a user input 405 from the first user. The user input 405 may comprise an incomplete gesture performed by the first user. In particular embodiments, the assistant system 140 may calculate, by an intent-understanding module, one or more confidences scores for one or more intents 420 corresponding to the incomplete gesture. The assistant system 140 may then determine that the calculated confidence scores associated with each of the intents 420 are below a threshold score. In particular embodiments, the assistant system 140 may select, based on a personalized gesture-recognition model, one or more candidate gestures from a plurality of pre-defined gestures responsive to determining that the calculated confidence scores for each of the intents 420 are below the threshold score. Each of the candidate gestures may be associated with a confidence score representing a likelihood the first user intended to input the respective candidate gesture. In particular embodiments, the assistant system 140 may further send, to the client system 130, instructions for presenting one or more suggested inputs corresponding to one or more of the candidate gestures.

In particular embodiments, the assistant system 140 may recognize an incomplete gesture of a user input 405. An incomplete gesture may comprise the onset of a gesture, which may indicate that the user has not completed the whole gesture yet. As an example and not by way of limitation, an open hand pausing in the air may be an incomplete gesture for the waving gesture. In particular embodiments, the assistant system 140 may suggest a list of pre-defined gestures, one of which may be the gesture that the user intended to perform. As an example and not by way of limitation, each pre-defined gesture may comprise one or more of pointing, poking, tapping, waving, or swiping. As a result, the assistant system 140 may have a technical advantage of improving user experience with the assistant system 140 as the assistant system 140 may understand a user's intent 420 based on an incomplete gesture and teach a user to complete the incomplete gesture to interact with the assistant system 140. Although this disclosure describes particular gestures in particular manners, this disclosure contemplates any suitable gesture in any suitable manner.

In particular embodiments, the assistant system 140 may determine a user's intended gesture based on similarity evaluation with respect to a list of pre-defined gestures. The assistant system 140 may calculate, for each of the one or more candidate gestures, a similarity level of the candidate gesture with respect to the incomplete gesture. As an example and not by way of limitation, if a user's hand is in a particular position, the assistant system 140 may determine how similar this incomplete gesture is to the pre-defined gestures. After determining which pre-defined gestures this uncompleted gesture is most similar to, the assistant system 140 may select them as candidate gestures. In particular embodiments, the assistant system 140 may determine whether to present candidate gestures to a user based on similarity levels. As an example and not by way of limitation, if the similarity levels for all the candidate gestures with respect to the incomplete gesture are below a pre-defined threshold level, the assistant system 140 may present them to the user for selection. As another example and not by way of limitation, if two or more candidate gestures have similar similarity levels which are greater than the pre-defined threshold level, the assistant system 140 may still present them to the user for disambiguation. In particular embodiments, selecting the one or more candidate gestures may be further based on the one or more intents 420. As an example and not by way of limitation, the intents 420 may comprise locating an object or interacting with another user on social media. Correspondingly, the candidate gestures may comprise pointing or poking. In particular embodiments, the assistant system 140 may further suggest inputs which may guide the user to complete the candidate gestures. Although this disclosure describes determining particular candidate gestures in particular manners, this disclosure contemplates determining any suitable candidate gesture in any suitable manner.

In particular embodiments, the assistant system 140 may determine the similarity level in different ways. In particular embodiments, the similarly level of each candidate gesture with respect to the incomplete gesture may be based on a trajectory of the incomplete gesture with respect to the client system. As an example and not by way of limitation, if a user moved his/her hand from left to right and paused, most likely the assistant system 140 may determine some gestures that continue the motion in a relatively similar trajectory, e.g., swiping. But if the user moved his/her hand from the bottom to the top, the trajectory is different, for which the assistant system 140 may determine different gestures, e.g., pointing. In particular embodiments, the similarly level of each candidate gesture with respect to the incomplete gesture may be based on an orientation of the incomplete gesture with respect to the client system 130. As an example and not by way of limitation, if the orientation is parallel to the client system 130, the gestures of waving or swiping may have higher similarity level with respect to the incomplete gesture. As another example and not by way of limitation, if the orientation is perpendicular to the client system 130, the gestures of pointing or poking may have higher similarity level with respect to the incomplete gesture. In particular embodiments, the similarly level of each candidate gesture with respect to the incomplete gesture may be based on an object associated with the incomplete gesture. As an example and not by way of limitation, the determined gestures corresponding to a phone may be different from those corresponding to a TV. In particular embodiments, the similarly level of each candidate gesture with respect to the incomplete gesture may be based on contextual information associated with the incomplete gesture. As an example and not by way of limitation, if the contextual information indicates that the user is browsing another user's social media profile, the candidate gesture may be more likely poking rather than pointing. In particular embodiments, the similarly level of each candidate gesture with respect to the incomplete gesture may be based on a position of the incomplete gesture with respect to the client system 130. As an example and not by way of limitation, if the incomplete gesture is very close to the client system 130, the candidate gesture may be more likely tapping. One technical challenge includes determining similarity levels of candidate gestures with respect to the incomplete gesture. Determining the similarity levels based on different factors including trajectory, orientation, objects, contextual information, and position associated with the incomplete gesture may be an effective solution for addressing the technical challenge of determining similarity levels of candidate gestures with respect to the incomplete gesture, as such information may provide different informative cues for the assistant system 140 to calculate similarity levels. Although this disclosure describes determining particular similarity levels in particular manners, this disclosure contemplates determining any suitable similarity level in any suitable manner.

In particular embodiments, the assistant system 140 may determine whether the first user needs suggestions to complete the incomplete gesture based on the calculated confidence scores for the intents 420 corresponding to the incomplete gesture. If the confidence scores are below a threshold score, it may indicate that the assistant system 140 cannot determine the user's intent 420. Such difficulty in determining the user's intent 420 may be caused by the fact that the incomplete gesture is uninformative, which further indicates that the user does not know how to perform the intended gesture and may need suggestions. In particular embodiments, the threshold score may be based on a wake-up gesture performed by the first user. The wake-up gesture may indicate that the user clearly needs suggestions. As a result, the assistant system 140 may set a high threshold score, which results in the calculated confidence scores being below the threshold score. The assistant system 140 may then generate candidate gestures accordingly. In summary, once a user has made a wake-up gesture, the assistant system 140 may initiate the process for gesture suggestion. The assistant system may be constantly in an active status for gesture suggestion. In particular embodiments, calculating the one or more confidence scores for the one or more intents 420 corresponding to the incomplete gesture may be based on temporal information associated with the incomplete gesture. The temporal information may comprise a pause in the user input 405. As an example and not by way of limitation, the calculated confidence scores may be low when there is a pause in the user input 405. Accordingly, the assistant system 140 may determine that the user needs suggestions to complete the incomplete gesture. In particular embodiments, calculating the one or more confidence scores for the one or more intents 420 corresponding to the incomplete gesture may be based on a velocity associated with the incomplete gesture. As an example and not by way of limitation, the assistant system 140 may monitor how fast a user's movement is. If the user is moving fairly confident and fast the user probably already knew the gesture that he/she wants to perform, for which the assistant system 140 may calculate high confidence scores and not suggest any gestures. If the assistant system 140 detects that the user is hesitant of performing a gesture (e.g., moving slow), the assistant system 140 may infer that the user is trying to figure out what gestures he/she can do, calculate low confidence scores, and suggest gestures accordingly. In particular embodiments, determining the first user needs suggestions to complete the incomplete gesture may be further based on patterns of the incomplete gesture. As an example and not by way of limitation, if a user is repeating the same incomplete gesture, the assistant system 140 may determine a suggested gesture to complete the user's intended gesture. Determining whether to suggest candidate gestures based on different factors including confidence scores of intents, wake-up gestures, temporal information of the incomplete gesture, velocity of the incomplete gesture, and patterns of the incomplete gesture may be an effective solution for addressing the technical challenge of determining that a user needs suggested inputs for gestures, as such information may reveal a user's requirement for assistance from different perspectives. Although this disclosure describes determining whether a user needs particular suggested gestures in particular manners, this disclosure contemplates determining whether a user needs any suitable suggested gestures in any suitable manner.

In particular embodiments, the assistant system 140 may receive, from the client system 130, a user-selected input from the first user. The user-selected input may comprise one of the suggested inputs. The assistant system 140 may then execute one or more tasks based on the user-selected input. In particular embodiments, the assistant system 140 may suggest candidate gestures for more than once. In other words, the assistant system 140 may guide the user through a sequence of candidate gestures, in which each of the candidate gestures may be mapped to a specific intent 420. To be more specific, the assistant system 140 may receive, from the client system 130, a first user-selected input from the first user. The first user-selected input may comprise one of the suggested inputs and the first user-selected input may be associated with a first intent 420. The assistant system 140 may then generate, based on the first user-selected input, one or more additional candidate gestures. Each of the one or more additional candidate gestures may be associated with the first intent 420. The assistant system 140 may then send, to the client system 130, instructions for presenting one or more additional suggested inputs corresponding to one or more of the additional candidate gestures. The assistant system 140 may then receive, from the client system 130, a second user-selected input from the first user. The second user-selected input may comprise one of the additional suggested inputs. The assistant system 140 may further execute one or more tasks 425 based on the second user-selected input. The one or more tasks 425 may correspond to the first intent 420. In particular embodiments, the assistant system 140 may continue the aforementioned process until one or more tasks 425 that require a whole sequence of gestures are executed. As an example and not by way of limitation, a user wearing AR glasses may want to make a call and have performed an incomplete gesture. The assistant system 140 may suggest a few candidate gestures including the "call" gesture. The user may then complete the "call" gesture based on the suggestion. The assistant system 140 may then display three different people (e.g., names or photos) on the virtual screen of the VR glasses and suggest additional gestures (e.g., pointing or tapping) to the user. Accordingly, the user may perform one of the additional suggested gestures on someone he/she wants to call. Finally, the assistant system 140 may execute the task 425 of calling the intended person. As another example and not by way of limitation, a user may want to take a picture of a friend and have performed an incomplete gesture. The assistant system 140 may suggest a few candidate gestures including the "taking-pictures" gesture to the user. The user may then complete the "taking-pictures" gesture based on the suggestion. After the picture is taken, the assistant system 140 may further suggest some additional gestures that the user could perform on the picture. For example, one gesture may be a gesture for sending this picture to the friend. The user may thus perform such gesture to finish a sequence of gestures and the assistant system 140 may send the picture to the friend subsequently. As a result, the assistant system 140 may have a technical advantage of increasing the degree of users engaging with the assistant system 140 by guiding users with sequences of suggested gestures to explore various tasks that the users may request assistance. Although this disclosure describes suggesting particular sequence of gestures in particular manners, this disclosure contemplates suggesting any suitable sequence of gestures in any suitable manner.

In particular embodiments, determining candidate gestures responsive to a user's incomplete gesture may be applied to user education in assistant-based AR/VR systems. As an example and not by way of limitation, when a user initially puts on the AR glasses he may not know what gestures he can use to interact with the assistant system 140. The user may raise his/her hand wondering what to do. In this case, the assistant system 140 may analyze the user's current incomplete gesture and determine what gestures may be similar gestures that the user can perform. Accordingly, the assistant system 140 may suggest the determined gestures by displaying them virtually on the screen of the AR glasses. In particular embodiments, determining candidate gestures responsive to a user's incomplete gesture may be suitable when only gestures are available for interacting with the assistant system 140. As an example and not by way of limitation, a user cannot speak and does not have a keyboard for texting. In this case, if the user starts his/her interaction with the assistant system 140 with an incomplete gesture, the assistant system 140 may suggest the user to perform one or more gestures to complete a particular task 425. Although this disclosure describes particular applications of the embodiments disclosed herein in particular manners, this disclosure contemplates any suitable application of the embodiments disclosed herein in any suitable manner.

Figure 5:
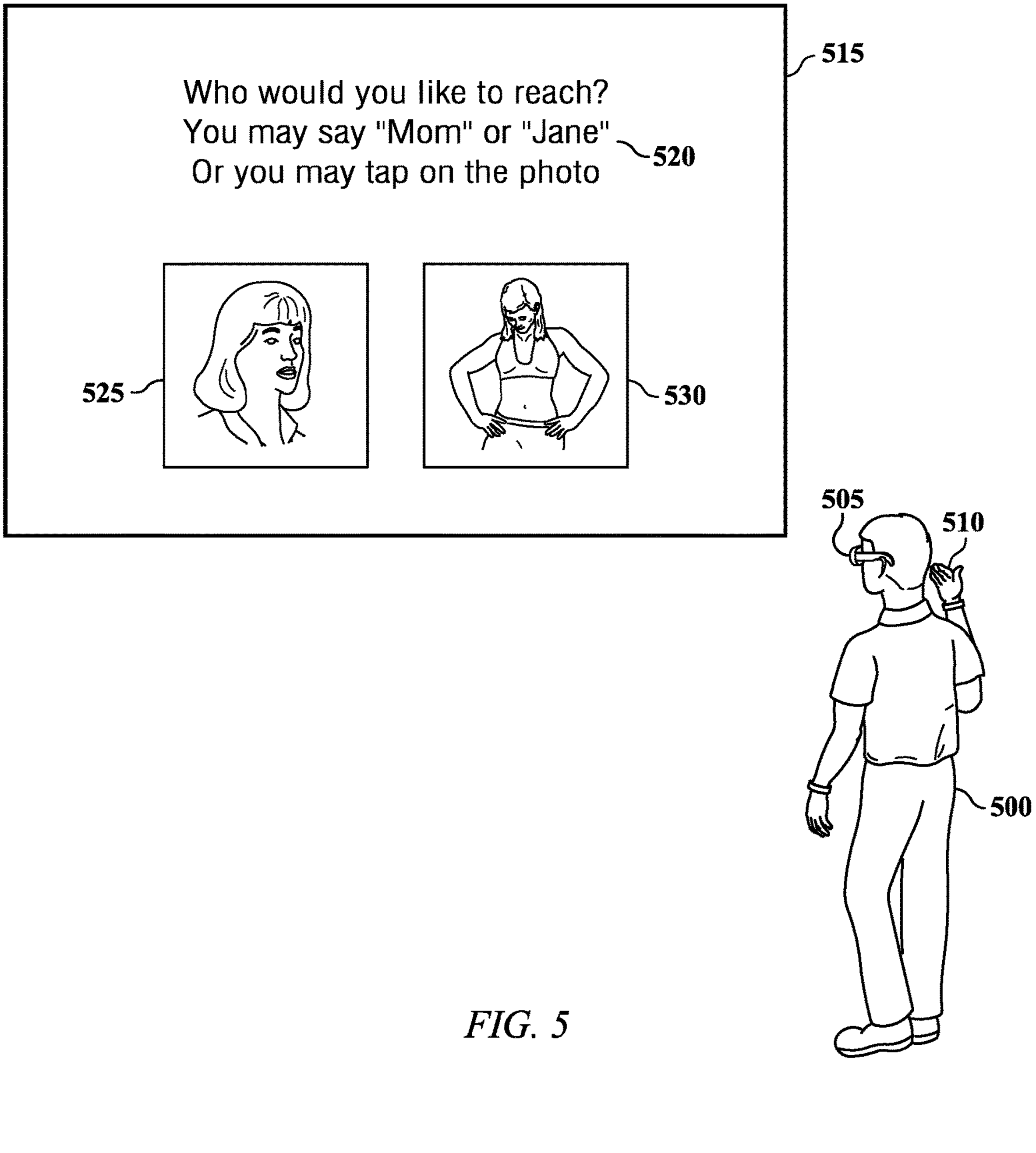
FIG. 5 illustrates an example scenario of auto-completion for multi-modal user input.

FIG. 5 illustrates an example scenario of auto-completion for multi-modal user input 405. As displayed in FIG. 5, a user 500 may be wearing a pair of AR glasses 505. The AR glasses 505 may function as a client system 130 for the user 500 to interact with the assistant system 140. The user 500 may provide an initial input, which may be a "call" gesture 510. The assistant system 140 may determine the user's intent 420 to call a contact corresponding to the "call" gesture 510. The assistant system 140 may identify two contacts that the user 500 may want to call, e.g., his Mom and his wife Jane. Based on the identified contacts, the assistant system 140 may generate two candidate continuation-inputs including selecting a contact by voice and selecting a contact by gesture. The assistant system 140 may further generate suggested inputs which may be displayed on the screen 515 of the VR glasses 505. In FIG. 5, the suggested inputs are presented as "who would you like to reach? You may say 'Mom' or 'Jane' or you may tap on the photo" 520. In addition, a photo of "Mom" 525 and a photo of "Jane" 530 may be presented in association with the suggested inputs. Although this disclosure describes particular scenarios of auto-completion for particular multi-modal user input in particular manners, this disclosure contemplates any suitable scenario of auto-completion for any suitable multi-modal user input in any suitable manner.

Figure 6:
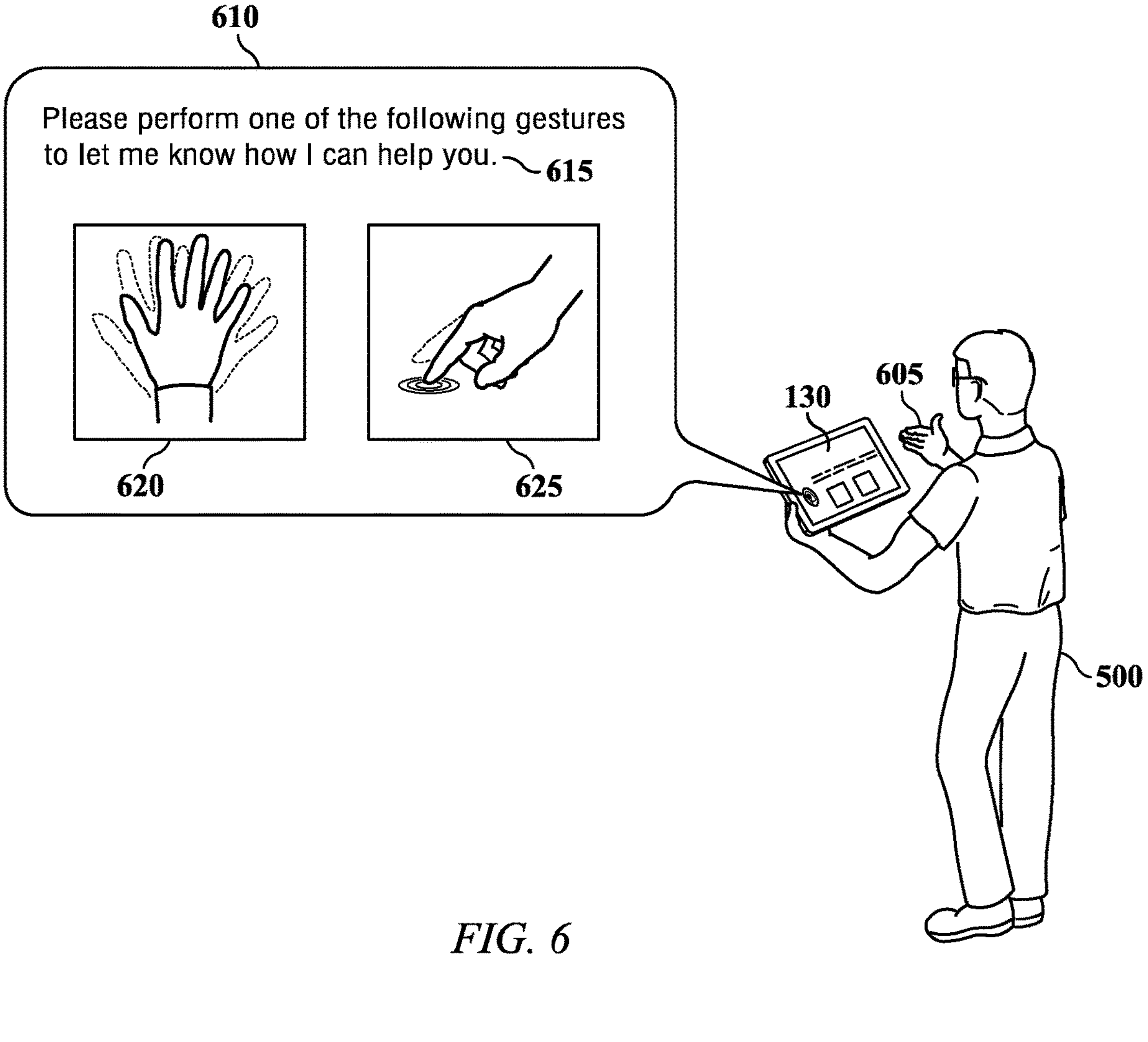
FIG. 6 illustrates an example scenario of auto-completion for gesture-input.

FIG. 6 illustrates an example scenario of auto-completion for gesture-input. As displayed in FIG. 6, a user 500 may be interacting with the assistant system 140 via a client system 130. The user 500 may want to perform a gesture to interact with the assistant system 140 but does not really know what gestures he could perform. Therefore, the user 500 may hold his hand in the air, which may have formed an incomplete gesture 605. Based on the incomplete gesture 605, the assistant system 140 may determine one or more candidate gestures using a personalized gesture-recognition model. As an example and not by way of limitation, the one or more candidate gestures may comprise two gestures, i.e., waving and tapping. The assistant system 140 may further generate suggested inputs which may be displayed on the screen 610 of the client system 130. In FIG. 6, the suggested inputs are presented as "please perform one of the following gestures to let me know how I can help you" 615. In addition, an animation of the waving gesture 620 and an animation of the tapping gesture 625 may be presented in association with the suggested inputs. Although this disclosure describes particular scenarios of auto-completion for particular gesture-input in particular manners, this disclosure contemplates any suitable scenario of auto-completion for any suitable gesture-input in any suitable manner.

Figure 7A:
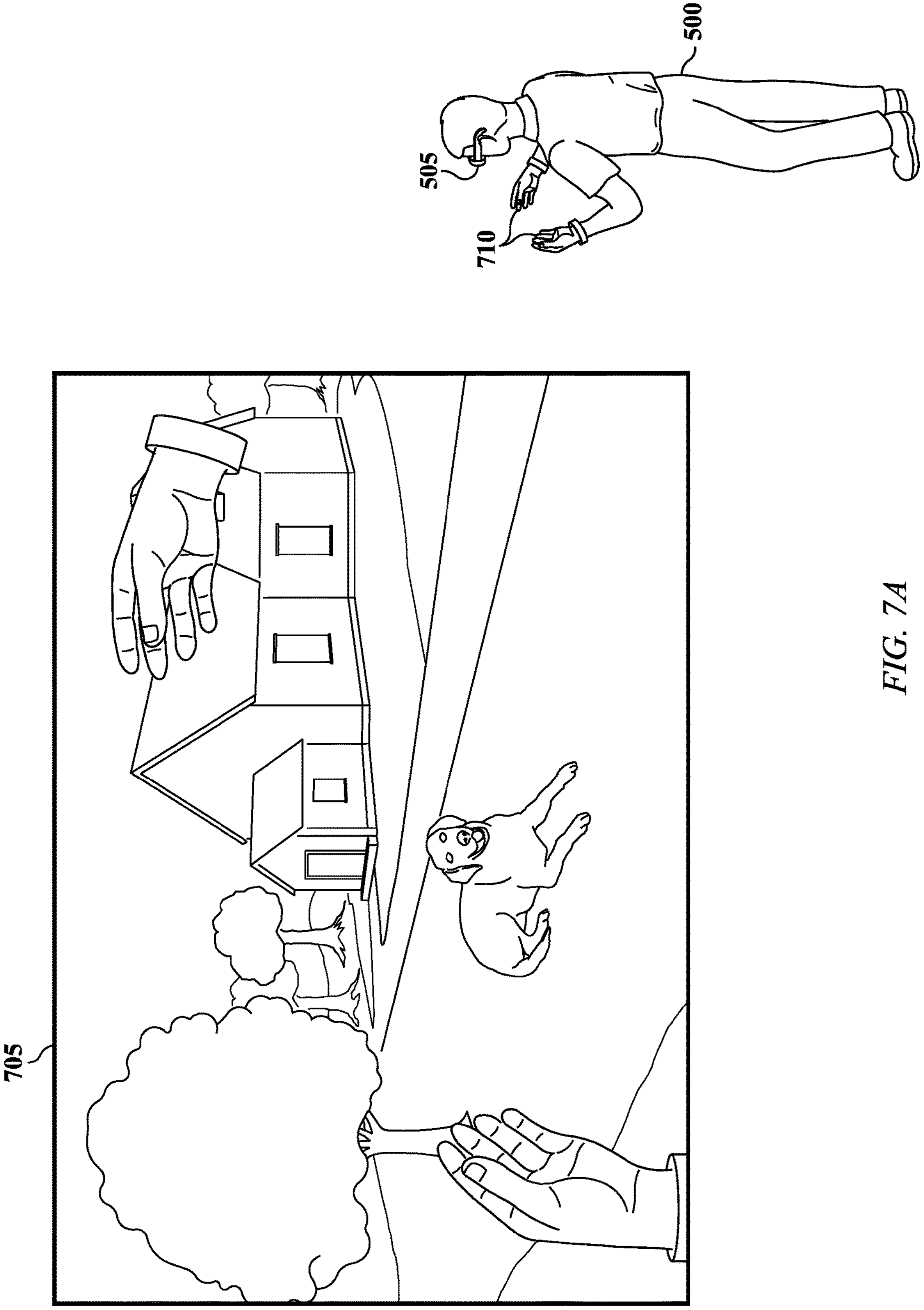
FIG. 7A illustrates an example scenario of an incomplete gesture in AR/VR setting.
Figure 7B:
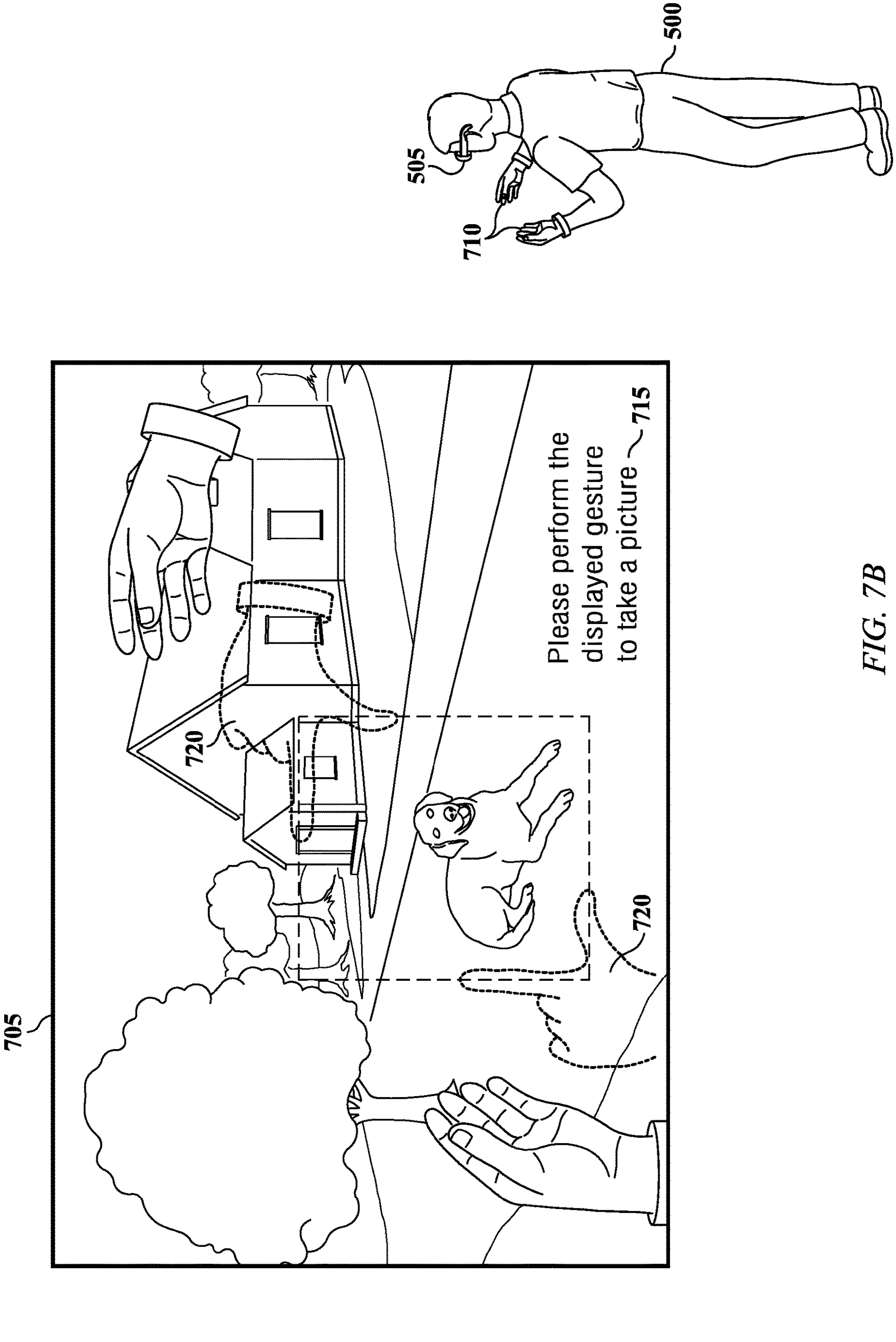
FIG. 7B illustrates an example scenario of suggested gesture-input in AR/VR setting.

FIGS. 7A-7B illustrate another example scenario of auto-completion for gesture-input. FIG. 7A illustrates an example scenario of an incomplete gesture in AR/VR setting. As displayed in FIG. 7A, a user 500 may be wearing a pair of AR glasses 505. The AR glasses 505 may function as a client system 130 for the user 500 to interact with the assistant system 140. The user 500 may see a dog on the screen 705 of the AR glasses 505. The user 500 may want to perform a gesture to interact with the assistant system 140 but does not really know what gestures he could perform. Therefore, the user 500 may hold his hands in the air, which may have formed an incomplete gesture 710. Based on the incomplete gesture 710 and the focus of the user's attention (i.e., the dog), the assistant system 140 may determine one or more candidate gestures using a personalized gesture-recognition model. The assistant system 140 may further generate suggested inputs which may be displayed on the screen 705 of the AR glasses 505. FIG. 7B illustrates an example scenario of suggested gesture-input in AR/VR setting. In FIG. 7B, the suggested inputs are presented as "please perform the displayed gesture to take a picture" 715. In addition, a "taking a picture" gesture 720 (i.e., in dotted lines) may be presented in association with the suggested inputs. Although this disclosure describes particular scenarios of auto-completion for particular gesture-inputs in particular manners, this disclosure contemplates any suitable scenario of auto-completion for any suitable gesture-input in any suitable manner.

Figure 8:
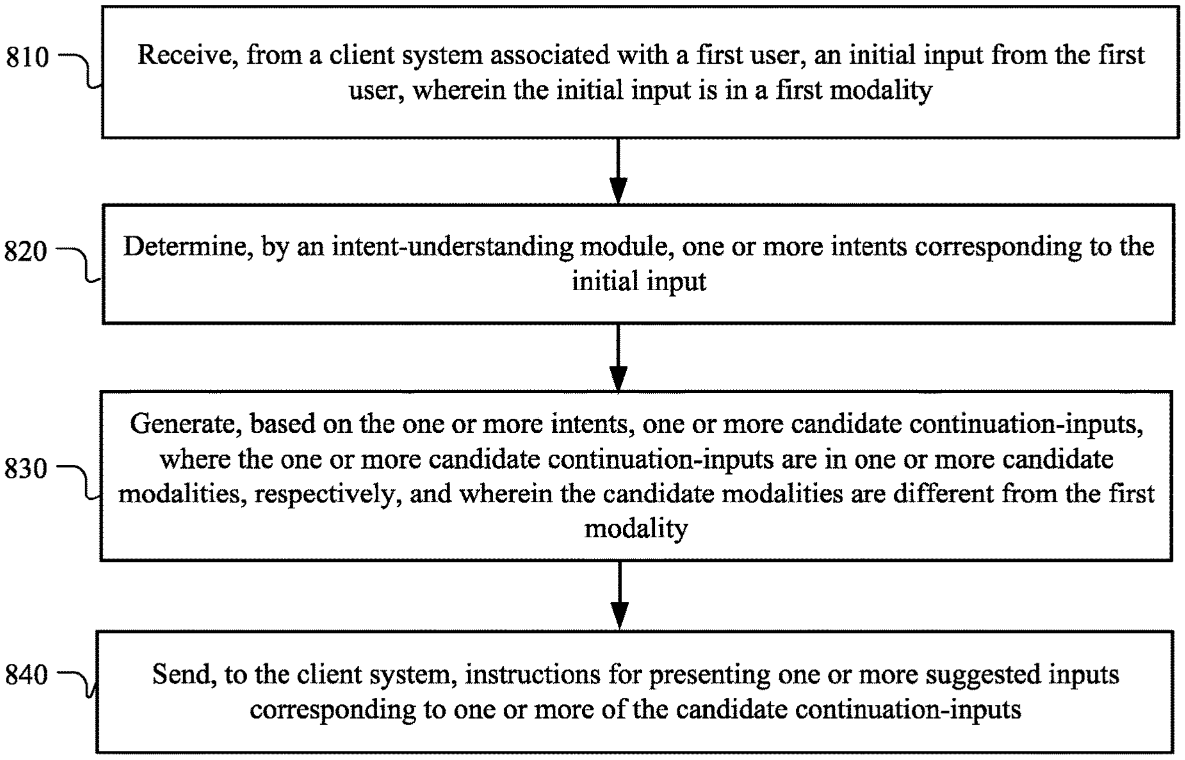
FIG. 8 illustrates an example method for suggesting multi-modal user input for auto-completion.

FIG. 8 illustrates an example method 800 for suggesting multi-modal user input 405 for auto-completion. The method may begin at step 810, where the assistant system 140 may receive, from a client system 130 associated with a first user, an initial input from the first user, wherein the initial input is in a first modality. At step 820, the assistant system 140 may determine, by an intent-understanding module 410, one or more intents 420 corresponding to the initial input. At step 830, the assistant system 140 may generate, based on the one or more intents 420, one or more candidate continuation-inputs, where the one or more candidate continuation-inputs are in one or more candidate modalities, respectively, and wherein the candidate modalities are different from the first modality. At step 840, the assistant system 140 may send, to the client system 130, instructions for presenting one or more suggested inputs corresponding to one or more of the candidate continuation-inputs. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for suggesting multi-modal user input for auto-completion, including the particular steps of the method of FIG. 8, this disclosure contemplates any suitable method for suggesting multi-modal user input for auto-completion, including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
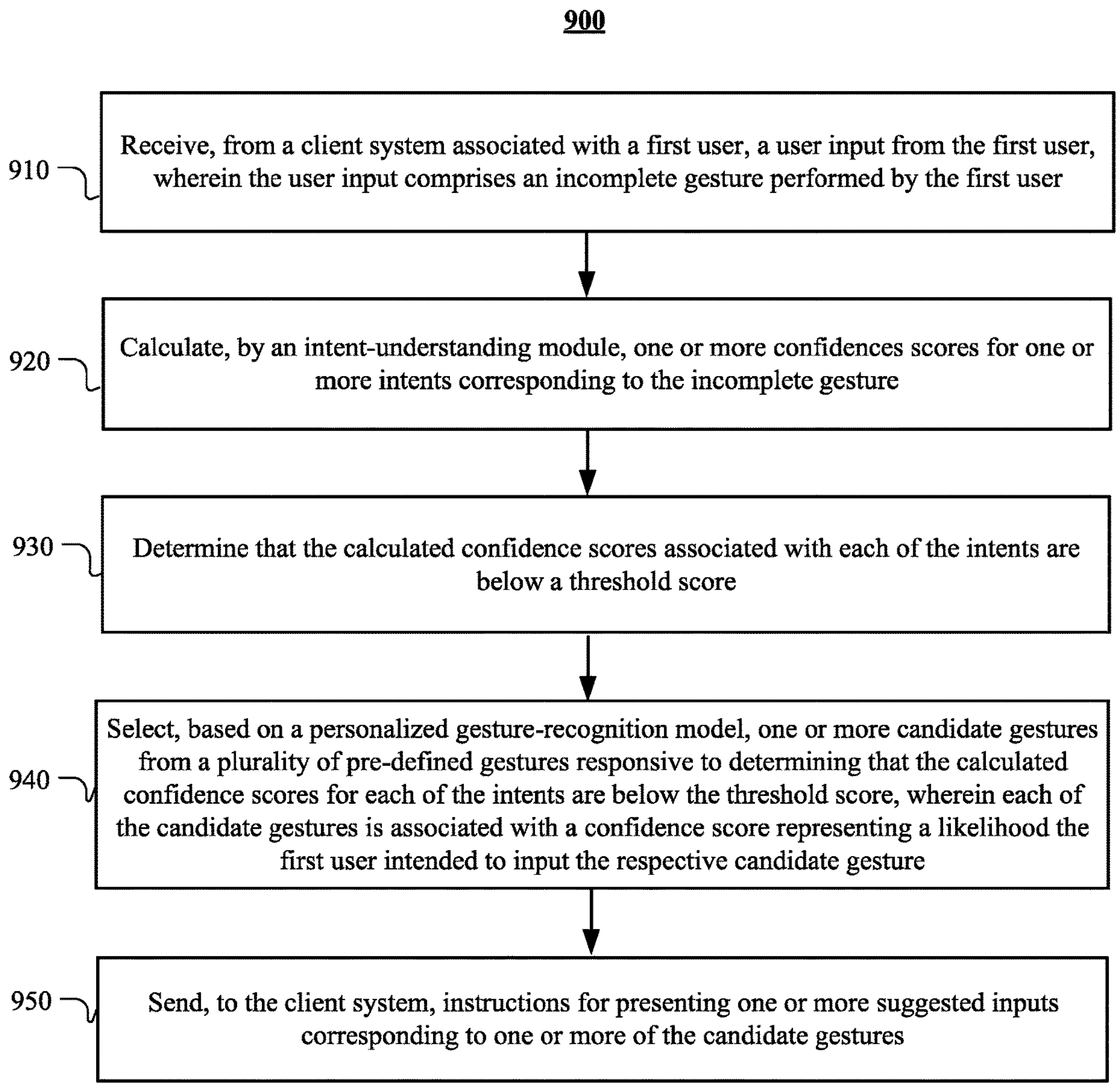
FIG. 9 illustrates an example method for suggesting candidate gestures for auto-completion.

FIG. 9 illustrates an example method 900 for suggesting candidate gestures for auto-completion. The method may begin at step 910, where the assistant system 140 may receive, from a client system 130 associated with a first user, a user input 405 from the first user, wherein the user input 405 comprises an incomplete gesture performed by the first user. At step 920, the assistant system 140 may calculate, by an intent-understanding module 410, one or more confidence scores for one or more intents 420 corresponding to the incomplete gesture. At step 930, the assistant system 140 may determine that the calculated confidence scores associated with each of the intents 420 are below a threshold score. At step 940, the assistant system 140 may select, based on a personalized gesture-recognition model, one or more candidate gestures from a plurality of pre-defined gestures responsive to determining that the calculated confidence scores for each of the intents 420 are below the threshold score, wherein each of the candidate gestures is associated with a confidence score representing a likelihood the first user intended to input the respective candidate gesture. At step 950, the assistant system 140 may send, to the client system 130, instructions for presenting one or more suggested inputs corresponding to one or more of the candidate gestures. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for suggesting candidate gestures for auto-completion, including the particular steps of the method of FIG. 9, this disclosure contemplates any suitable method for suggesting candidate gestures for auto-completion, including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Social Graphs

Figure 10:
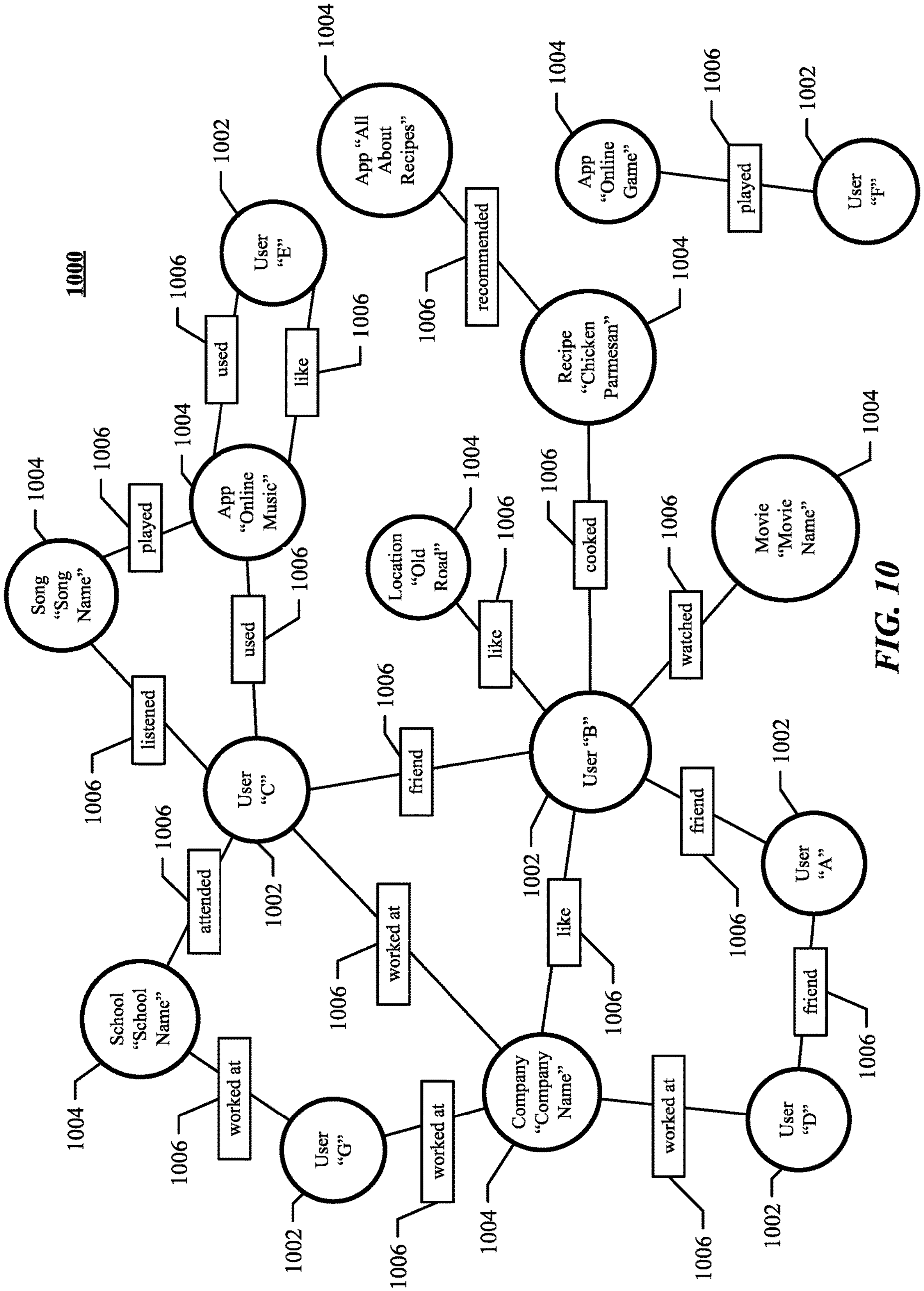
FIG. 10 illustrates an example social graph.

FIG. 10 illustrates an example social graph 1000. In particular embodiments, the social-networking system 160 may store one or more social graphs 1000 in one or more data stores. In particular embodiments, the social graph 1000 may include multiple nodes—which may include multiple user nodes 1002 or multiple concept nodes 1004—and multiple edges 1006 connecting the nodes. Each node may be associated with a unique entity (i.e., user or concept), each of which may have a unique identifier (ID), such as a unique number or username. The example social graph 1000 illustrated in FIG. 10 is shown, for didactic purposes, in a two-dimensional visual map representation. In particular embodiments, a social-networking system 160, a client system 130, an assistant system 140, or a third-party system 170 may access the social graph 1000 and related social-graph information for suitable applications. The nodes and edges of the social graph 1000 may be stored as data objects, for example, in a data store (such as a social-graph database). Such a data store may include one or more searchable or queryable indexes of nodes or edges of the social graph 1000.

In particular embodiments, a user node 1002 may correspond to a user of the social-networking system 160 or the assistant system 140. As an example and not by way of limitation, a user may be an individual (human user), an entity (e.g., an enterprise, business, or third-party application), or a group (e.g., of individuals or entities) that interacts or communicates with or over the social-networking system 160 or the assistant system 140. In particular embodiments, when a user registers for an account with the social-networking system 160, the social-networking system 160 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with the social-networking system 160. In particular embodiments, a user node 1002 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 1002 may be associated with one or more data objects corresponding to information associated with a user. In particular embodiments, a user node 1002 may correspond to one or more web interfaces.

In particular embodiments, a concept node 1004 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including the social-networking system 160 and the assistant system 140. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more web interfaces.

In particular embodiments, a node in the social graph 1000 may represent or be represented by a web interface (which may be referred to as a "profile interface"). Profile interfaces may be hosted by or accessible to the social-networking system 160 or the assistant system 140. Profile interfaces may also be hosted on third-party websites associated with a third-party system 170. As an example and not by way of limitation, a profile interface corresponding to a particular external web interface may be the particular external web interface and the profile interface may correspond to a particular concept node 1004. Profile interfaces may be viewable by all or a selected subset of other users. As an example and not by way of limitation, a user node 1002 may have a corresponding user-profile interface in which the corresponding user may add content, make declarations, or otherwise express himself or herself. As another example and not by way of limitation, a concept node 1004 may have a corresponding concept-profile interface in which one or more users may add content, make declarations, or express themselves, particularly in relation to the concept corresponding to concept node 1004.

In particular embodiments, a concept node 1004 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 1002 corresponding to the user and a concept node 1004 corresponding to the third-party web interface or resource and store edge 1006 in one or more data stores.

In particular embodiments, a pair of nodes in the social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 1006 connecting the first user's user node 1002 to the second user's user node 1002 in the social graph 1000 and store edge 1006 as social-graph information in one or more of data stores 164. In the example of FIG. 10, the social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to an edge type or subtype. A concept-profile interface corresponding to a concept node 1004 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("SongName") using a particular application (an online music application). In this case, the social-networking system 160 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, the social-networking system 160 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (the online music application) on an external audio file (the song "SongName"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for the online music application).

In particular embodiments, the social-networking system 160 may create an edge 1006 between a user node 1002 and a concept node 1004 in the social graph 1000. As an example and not by way of limitation, a user viewing a concept-profile interface (such as, for example, by using a web browser or a special-purpose application hosted by the user's client system 130) may indicate that he or she likes the concept represented by the concept node 1004 by clicking or selecting a "Like" icon, which may cause the user's client system 130 to send to the social-networking system 160 a message indicating the user's liking of the concept associated with the concept-profile interface. In response to the message, the social-networking system 160 may create an edge 1006 between user node 1002 associated with the user and concept node 1004, as illustrated by "like" edge 1006 between the user and concept node 1004. In particular embodiments, the social-networking system 160 may store an edge 1006 in one or more data stores. In particular embodiments, an edge 1006 may be automatically formed by the social-networking system 160 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

Vector Spaces and Embeddings

Figure 11:
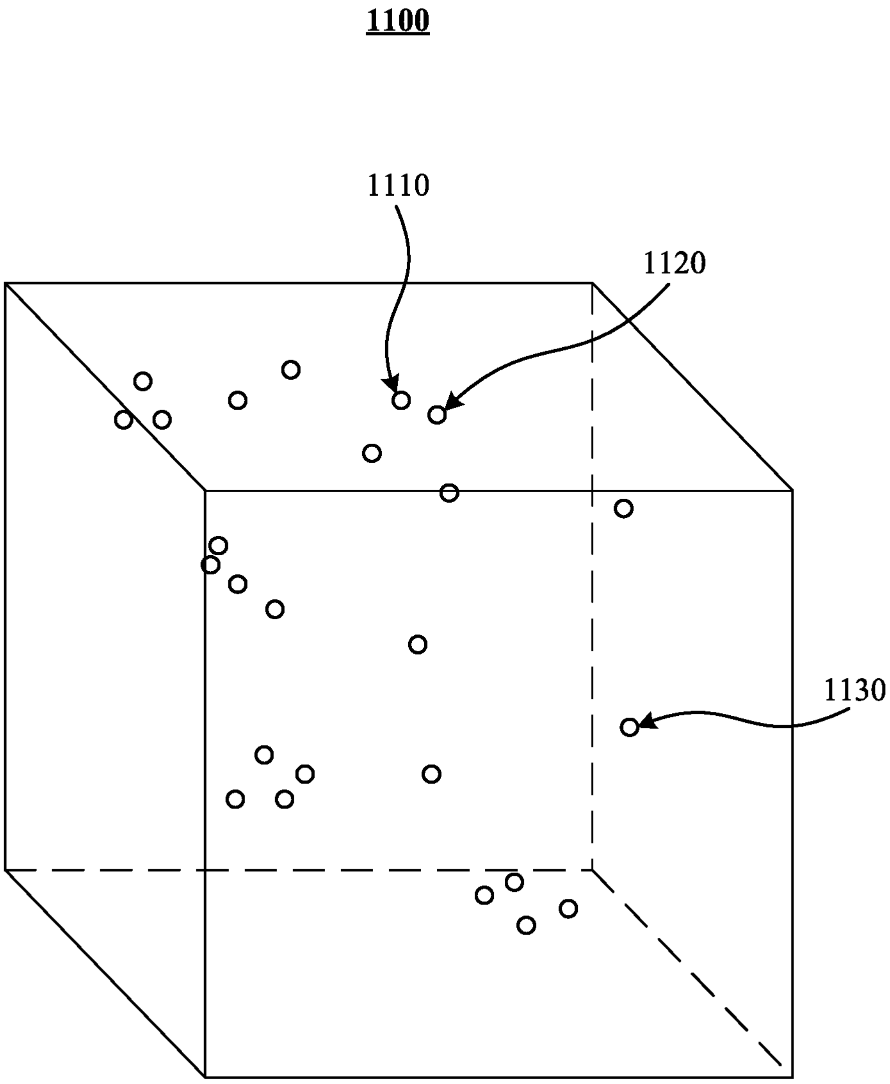
FIG. 11 illustrates an example view of an embedding space.

FIG. 11 illustrates an example view of a vector space 1100. In particular embodiments, an object or an n-gram may be represented in a d-dimensional vector space, where d denotes any suitable number of dimensions. Although the vector space 1100 is illustrated as a three-dimensional space, this is for illustrative purposes only, as the vector space 1100 may be of any suitable dimension. In particular embodiments, an n-gram may be represented in the vector space 1100 as a vector referred to as a term embedding. Each vector may comprise coordinates corresponding to a particular point in the vector space 1100 (i.e., the terminal point of the vector). As an example and not by way of limitation, vectors 1110, 1120, and 1130 may be represented as points in the vector space 1100, as illustrated in FIG. 11. An n-gram may be mapped to a respective vector representation. As an example and not by way of limitation, n-grams $t_1$ and $t_2$ may be mapped to vectors $\overrightarrow{v_1}$ and $\overrightarrow{v_2}$ in the vector space 1100, respectively, by applying a function $\vec{\pi}$ defined by a dictionary, such that $\overrightarrow{v_1}=\vec{\pi}(t_1)$ and $\overrightarrow{v_2}=\vec{\pi}(t_2)$. As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 1100. In particular embodiments, an n-gram may be mapped to a vector representation in the vector space 1100 by using a machine leaning model (e.g., a neural network). The machine learning model may have been trained using a sequence of training data (e.g., a corpus of objects each comprising n-grams).

In particular embodiments, an object may be represented in the vector space 1100 as a vector referred to as a feature vector or an object embedding. As an example and not by way of limitation, objects $e_1$ and $e_2$ may be mapped to vectors $\overrightarrow{v_1}$ and $\overrightarrow{v_2}$ in the vector space 1100, respectively, by applying a function $\vec{\pi}$, such that $\overrightarrow{v_1}=\vec{\pi}(e_1)$ and $\overrightarrow{v_2}=\vec{\pi}(e_2)$. In particular embodiments, an object may be mapped to a vector based on one or more properties, attributes, or features of the object, relationships of the object with other objects, or any other suitable information associated with the object. As an example and not by way of limitation, a function $\vec{\pi}$ may map objects to vectors by feature extraction, which may start from an initial set of measured data and build derived values (e.g., features). As an example and not by way of limitation, an object comprising a video or an image may be mapped to a vector by using an algorithm to detect or isolate various desired portions or shapes of the object. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. In particular embodiments, when an object has data that is either too large to be efficiently processed or comprises redundant data, a function $\vec{\pi}$ may map the object to a vector using a transformed reduced set of features (e.g., feature selection). In particular embodiments, a function $\vec{\pi}$ may map an object e to a vector $\vec{\pi}(e)$ based on one or more n-grams associated with object e. Although this disclosure describes representing an n-gram or an object in a vector space in a particular manner, this disclosure contemplates representing an n-gram or an object in a vector space in any suitable manner.

In particular embodiments, the social-networking system 160 may calculate a similarity metric of vectors in vector space 1100. A similarity metric may be a cosine similarity, a Minkowski distance, a Mahalanobis distance, a Jaccard similarity coefficient, or any suitable similarity metric. As an example and not by way of limitation, a similarity metric of $\overrightarrow{v_1}$ and $\overrightarrow{v_2}$ may be a cosine similarity $$\frac{\overrightarrow{v_1}\cdot\overrightarrow{v_2}}{\|\overrightarrow{v_1}\|\|\overrightarrow{v_2}\|}.$$

As another example and not by way of limitation, a similarity metric of $\overrightarrow{v_1}$ and $\overrightarrow{v_2}$ may be a Euclidean distance $\|\overrightarrow{v_1}-\overrightarrow{v_2}\|$. A similarity metric of two vectors may represent how similar the two objects or n-grams corresponding to the two vectors, respectively, are to one another, as measured by the distance between the two vectors in the vector space 1100. As an example and not by way of limitation, vector 1110 and vector 1120 may correspond to objects that are more similar to one another than the objects corresponding to vector 1110 and vector 1130, based on the distance between the respective vectors. Although this disclosure describes calculating a similarity metric between vectors in a particular manner, this disclosure contemplates calculating a similarity metric between vectors in any suitable manner.

More information on vector spaces, embeddings, feature vectors, and similarity metrics may be found in U.S. patent application Ser. No. 14/949,436, filed 23 Nov. 2015, U.S. patent application Ser. No. 15/286,315, filed 5 Oct. 2016, and U.S. patent application Ser. No. 15/365,789, filed 30 Nov. 2016, each of which is incorporated by reference.

Artificial Neural Networks

Figure 12:
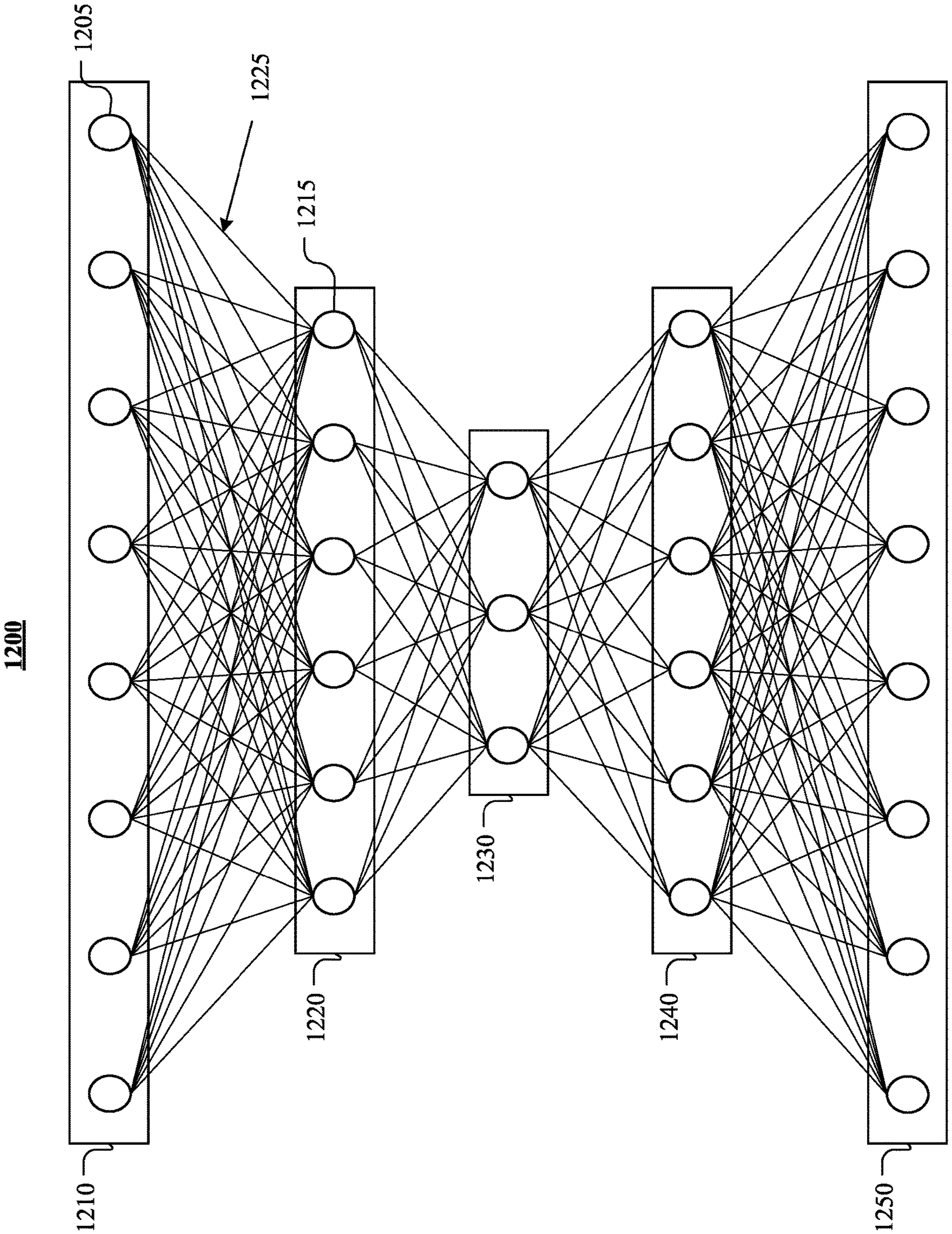
FIG. 12 illustrates an example artificial neural network.

FIG. 12 illustrates an example artificial neural network ("ANN") 1200. In particular embodiments, an ANN may refer to a computational model comprising one or more nodes. Example ANN 1200 may comprise an input layer 1210, hidden layers 1220, 1230, 1240, and an output layer 1250. Each layer of the ANN 1200 may comprise one or more nodes, such as a node 1205 or a node 1215. In particular embodiments, each node of an ANN may be connected to another node of the ANN. As an example and not by way of limitation, each node of the input layer 1210 may be connected to one of more nodes of the hidden layer 1220. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 12 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 12 depicts a connection between each node of the input layer 1210 and each node of the hidden layer 1220, one or more nodes of the input layer 1210 may not be connected to one or more nodes of the hidden layer 1220.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 1220 may comprise the output of one or more nodes of the input layer 1210. As another example and not by way of limitation, the input to each node of the output layer 1250 may comprise the output of one or more nodes of the hidden layer 1240. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N−1, x may be the input into residual block N−1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function. As another example and not by way of limitation, an activation function for a node k may be the sigmoid function $$F_k(s_k) = \frac{1}{1 + e^{-s_k}},$$

the hyperbolic tangent function $$F_k(s_k) = \frac{e^{s_k} - e^{-s_k}}{e^{s_k} + e^{-s_k}},$$

the rectifier $F_k(s_k)=\max(0, s_k)$, or any other suitable function $F_k(s_k)$, where $s_k$ may be the effective input to node k. In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 1225 between the node 1205 and the node 1215 may have a weighting coefficient of 0.4, which may indicate that 0.4 multiplied by the output of the node 1205 is used as an input to the node 1215. As another example and not by way of limitation, the output $y_k$ of node k may be $y_k=F_k(s_k)$, where $F_k$ may be the activation function corresponding to node k, $s_k=\Sigma_j(w_{jk}x_j)$ may be the effective input to node k, $x_j$ may be the output of a node j connected to node k, and $w_{jk}$ may be the weighting coefficient between node j and node k. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, an ANN may be trained using training data. As an example and not by way of limitation, training data may comprise inputs to the ANN 1200 and an expected output. As another example and not by way of limitation, training data may comprise vectors each representing a training object and an expected label for each training object. In particular embodiments, training an ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, an ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training an ANN in a particular manner, this disclosure contemplates training an ANN in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, an assistant system 140, a third-party system 170, a social-networking application, an assistant application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 1004 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 160 or assistant system 140 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 1000. A privacy setting may be specified for one or more edges 1006 or edge-types of the social graph 1000, or with respect to one or more nodes 1002, 1004 or node-types of the social graph 1000. The privacy settings applied to a particular edge 1006 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 1004 connected to a user node 1002 of the first user by an edge 1006. The first user may specify privacy settings that apply to a particular edge 1006 connecting to the concept node 1004 of the object, or may specify privacy settings that apply to all edges 1006 connecting to the concept node 1004. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 160 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 160 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 160, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 160 or assistant system 140 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 160 or assistant system 140 may access such information in order to provide a particular function or service to the first user, without the social-networking system 160 or assistant system 140 having access to that information for any other purposes. Before accessing, storing, or using such objects or information, the social-networking system 160 or assistant system 140 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160 or assistant system 140.

In particular embodiments, a user may specify whether particular types of objects or information associated with the first user may be accessed, stored, or used by the social-networking system 160 or assistant system 140. As an example and not by way of limitation, the first user may specify that images sent by the first user through the social-networking system 160 or assistant system 140 may not be stored by the social-networking system 160 or assistant system 140. As another example and not by way of limitation, a first user may specify that messages sent from the first user to a particular second user may not be stored by the social-networking system 160 or assistant system 140. As yet another example and not by way of limitation, a first user may specify that all objects sent via a particular application may be saved by the social-networking system 160 or assistant system 140.

In particular embodiments, privacy settings may allow a first user to specify whether particular objects or information associated with the first user may be accessed from particular client systems 130 or third-party systems 170. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 160 or assistant system 140 may provide default privacy settings with respect to each device, system, or application, and/or the first user may be prompted to specify a particular privacy setting for each context. As an example and not by way of limitation, the first user may utilize a location-services feature of the social-networking system 160 or assistant system 140 to provide recommendations for restaurants or other places in proximity to the user. The first user's default privacy settings may specify that the social-networking system 160 or assistant system 140 may use location information provided from a client device 130 of the first user to provide the location-based services, but that the social-networking system 160 or assistant system 140 may not store the location information of the first user or provide it to any third-party system 170. The first user may then update the privacy settings to allow location information to be used by a third-party image-sharing application in order to geo-tag photos.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 160 or assistant system 140 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 160 or assistant system 140. The user's privacy settings may specify that such information may be used only for particular processes, such as authentication, and further specify that such information may not be shared with any third-party system 170 or used for other processes or applications associated with the social-networking system 160 or assistant system 140. As another example and not by way of limitation, the social-networking system 160 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 170 or used by other processes or applications associated with the social-networking system 160. As another example and not by way of limitation, the social-networking system 160 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such image may be used only for a limited purpose (e.g., authentication, tagging the user in photos), and further specify that such image may not be shared with any third-party system 170 or used by other processes or applications associated with the social-networking system 160.

Systems and Methods

Figure 13:
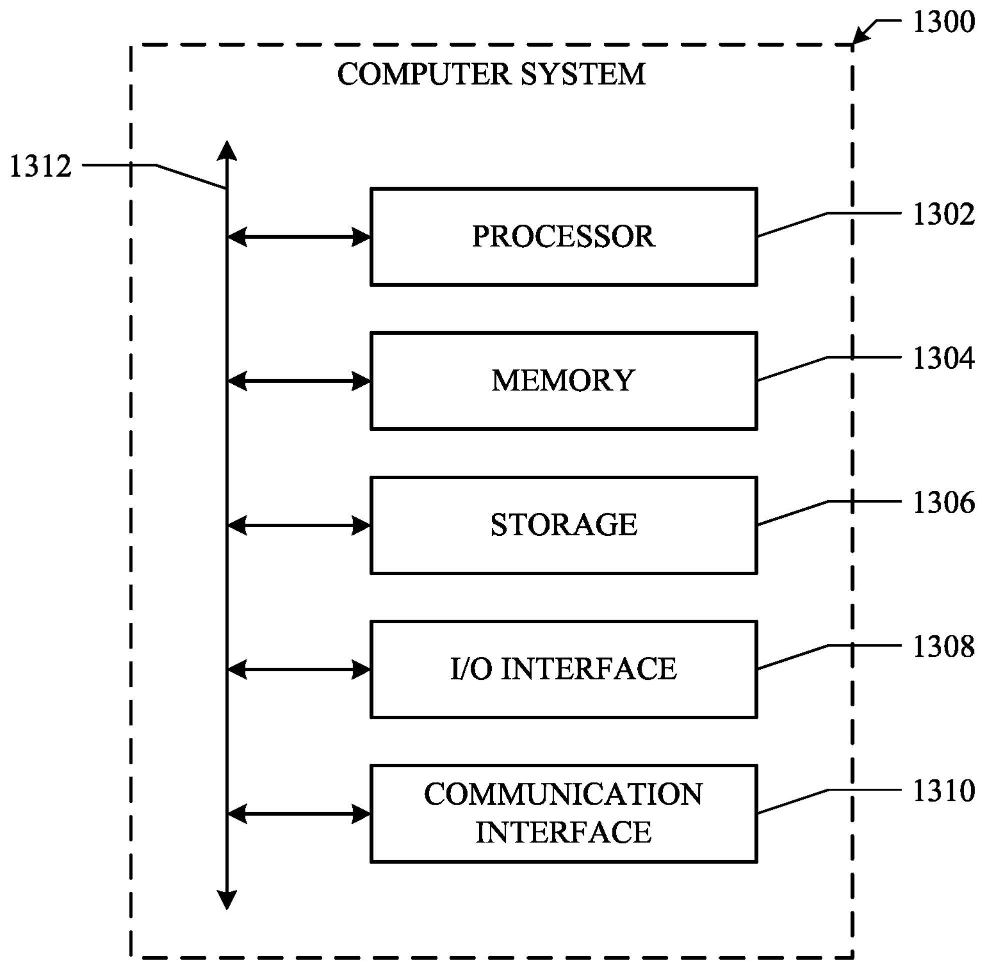
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:

receiving, at a head-wearable device, an initial input of a first input modality from a user, comprising a gaze at a real-world object;

in accordance with a determination that the gaze remains at the real-world object for a threshold amount of time:

generating, based on the real-world object, one or more suggested inputs of a second input modality, distinct from the first input modality, wherein the suggested inputs are associated with an operation at the head-wearable device; and outputting, at the head-wearable device, an indication to perform the one or more suggested inputs to cause the operation at the head-wearable device; and in accordance with a determination that the gaze no longer remains at the real-world object:

ceasing to output the indication to perform the one or more suggested inputs.

2. The method of claim 1, further comprising:

receiving, at the head-wearable device, a user-selected input from the user, wherein the user-selected input comprises one of the suggested inputs in the second input modality; and causing the operation at the head-wearable device.

3. The method of claim 1, further comprising:

receiving, at the head-wearable device, a subsequent user input;

in accordance with a determination that the subsequent user input corresponds to a suggested input of the one or more suggested inputs:

causing performance of the operation at the head-wearable device associated with the suggested input;

generating, based on the operation associated with the suggested input, one or more additional suggested operations; and outputting, at the head-wearable device, an indication to select the one or more additional suggested operations.

4. The method of claim 3, further comprising:

receiving, at the head-wearable device, a second subsequent user input;

in accordance with a determination that the second subsequent user input corresponds to a selection of the one or more additional suggested operations:

causing performance of the selected one or more additional suggested operations at the head-wearable device;

generating, based on the selected one or more additional suggested operations, one or more second suggested operations; and outputting, at the head-wearable device, a second indication to perform the one or more second suggested operations.

5. The method of claim 4, wherein, the operation is associated with generating a new reminder, and the method further comprising:

in response to the operation to generate a new reminder, determining one or more events associated with the new reminder; and wherein:

the one or more second suggested operations include generating a title for the reminder based on one or more events; and the one or more second suggested operations include generating a reminder time for the new reminder.

6. The method of claim 1, further comprising:

in accordance with a determination that a user input corresponds to a suggested input of the one or more suggested inputs:

causing performance of the operation at the head-wearable device associated with the suggested input;

generating, based on the operation associated with the suggested input, one or more further suggested inputs of a third input modality, distinct from the first input modality and the second input modality, wherein the one or more further suggested inputs are associated with a second operation at the head-wearable device; and outputting, at the head-wearable device, a second indication to perform the one or more further suggested inputs to cause the second operation at the head-wearable device.

7. The method of claim 1, further comprising:

receiving, at the head-wearable device, a second input of the first input modality from the user, comprising a second gaze at a second real-world object distinct from the real-world object;

in accordance with a determination that the second gaze remains at the second real-world object for the threshold amount of time:

generating, based on the second real-world object, a second set of one or more suggested inputs of the second input modality associated with a second operation at the head-wearable device, the second operation being distinct from the operation; and outputting, at the head-wearable device, a second indication to perform the second set of one or more suggested inputs to cause the second operation at the head-wearable device.

8. The method of claim 1, further comprising:

in accordance with a determination that the user cannot perform the one or more suggested inputs, generating one or more additional suggested operations; and outputting, at the head-wearable device, an indication to perform the one or more additional suggested operations.

9. The method of claim 1, wherein outputting the indication to perform the one or more suggested inputs is delayed based on a determination that the operation is low priority to the user.

10. The method of claim 1, further comprising:

before receiving the initial input, receiving a wake-up input from the user, the wake-up input being in a wake-up input modality, distinct from the first input modality; and in response to the wake-up input, recording the amount of time the user gazes at the real-world object.

11. One or more computer-readable non-transitory storage media embodying software that is operable when executed to:

receive, at a head-wearable device, an initial input of a first input modality from a user, comprising a gaze at a real-world object;

in accordance with a determination that the gaze remains at the real-world object for a threshold amount of time:

generate, based on the real-world object, one or more suggested inputs of a second input modality, distinct from the first input modality, wherein the suggested inputs are associated with an operation at the head-wearable device; and output, at the head-wearable device, an indication to perform the one or more suggested inputs to cause the operation at the head-wearable device; and in accordance with a determination that the gaze no longer remains at the real-world object for the threshold amount of time:

cease to output the indication to perform the one or more suggested inputs.

12. The one or more computer-readable non-transitory storage media embodying software of claim 11, further operable when executed to:

receive, at the head-wearable device, a subsequent user input;

in accordance with a determination that the subsequent user input corresponds to a suggested input of the one or more suggested inputs:

cause performance of the operation at the head-wearable device associated with the suggested input;

generate, based on the operation associated with the suggested input, one or more additional suggested operations; and output, at the head-wearable device, an indication to select the one or more additional suggested operations.

13. The one or more computer-readable non-transitory storage media embodying software of claim 12, further operable when executed to:

receive, at the head-wearable device, a second subsequent user input;

in accordance with a determination that the second subsequent user input corresponds to a selection of the one or more additional suggested operations:

cause performance of the selected one or more additional suggested operations at the head-wearable device;

generate, based on the selected one or more additional suggested operations, one or more second suggested operations; and output, at the head-wearable device, a second indication to perform the one or more second suggested operations.

14. The one or more computer-readable non-transitory storage media embodying software of claim 11, further operable when executed to:

in accordance with a determination that a user input corresponds to a suggested input of the one or more suggested inputs:

cause performance of the operation at the head-wearable device associated with the suggested input;

generate, based on the operation associated with the suggested input, one or more further suggested inputs of a third input modality, distinct from the first input modality and the second input modality, wherein the one or more further suggested inputs are associated with a second operation at the head-wearable device; and output, at the head-wearable device, a second indication to perform the one or more further suggested inputs to cause the second operation at the head-wearable device.

15. The one or more computer-readable non-transitory storage media embodying software of claim 11, further operable when executed to:

receive, at the head-wearable device, a second input of the first input modality from the user, comprising a second gaze at a second real-world object distinct from the real-world object;

in accordance with a determination that the second gaze remains at the second real-world object for the threshold amount of time:

generate, based on the second real-world object, a second set of one or more suggested inputs of the second input modality associated with a second operation at the head-wearable device, the second operation being distinct from the operation; and output, at the head-wearable device, a second indication to perform the second set of one or more suggested inputs to cause the second operation at the head-wearable device.

16. A system comprising: one or more processors; and a non-transitory memory coupled to the one or more processors comprising instructions executable by the one or more processors, the one or more processors operable when executing the instructions to:

receive, at a head-wearable device, an initial input of a first input modality from a user, comprising a gaze at a real-world object;

in accordance with a determination that the gaze remains at the real-world object for a threshold amount of time:

generate, based on the real-world object, one or more suggested inputs of a second input modality, distinct from the first input modality, wherein the suggested inputs are associated with an operation at the head-wearable device; and output, at the head-wearable device, an indication to perform the one or more suggested inputs to cause the operation at the head-wearable device; and in accordance with a determination that the gaze no longer remains at the real-world object for the threshold amount of time:

cease to output the indication to perform the one or more suggested inputs.

17. The system of claim 16, the instructions further causing the one or more processors to:

receive, at the head-wearable device, a subsequent user input;

in accordance with a determination that the subsequent user input corresponds to a suggested input of the one or more suggested inputs:

cause performance of the operation at the head-wearable device associated with the suggested input;

generate, based on the operation associated with the suggested input, one or more additional suggested operations; and output, at the head-wearable device, an indication to select the one or more additional suggested operations.

18. The system of claim 17, the instructions further causing the one or more processors to:

receive, at the head-wearable device, a second subsequent user input;

in accordance with a determination that the second subsequent user input corresponds to a selection of the one or more additional suggested operations:

cause performance of the selected one or more additional suggested operations at the head-wearable device;

generate, based on the selected one or more additional suggested operations, one or more second suggested operations; and output, at the head-wearable device, a second indication to perform the one or more second suggested operations.

19. The system of claim 16, the instructions further causing the one or more processors to:

in accordance with a determination that a user input corresponds to a suggested input of the one or more suggested inputs:

cause performance of the operation at the head-wearable device associated with the suggested input;

generate, based on the operation associated with the suggested input, one or more further suggested inputs of a third input modality, distinct from the first input modality and the second input modality, wherein the one or more further suggested inputs are associated with a second operation at the head-wearable device; and output, at the head-wearable device, a second indication to perform the one or more further suggested inputs to cause the second operation at the head-wearable device.

20. The system of claim 16, the instructions further causing the one or more processors to:

receive, at the head-wearable device, a second input of the first input modality from the user, comprising a second gaze at a second real-world object distinct from the real-world object;

in accordance with a determination that the second gaze remains at the second real-world object for the threshold amount of time:

generate, based on the second real-world object, a second set of one or more suggested inputs of the second input modality associated with a second operation at the head-wearable device, the second operation being distinct from the operation; and output, at the head-wearable device, a second indication to perform the second set of one or more suggested inputs to cause the second operation at the head-wearable device.

* * * * *